United States Patent
Machida et al.

(10) Patent No.: US 11,906,716 B2
(45) Date of Patent: *Feb. 20, 2024

(54) ZOOM OPTICAL SYSTEM, OPTICAL APPARATUS AND METHOD FOR MANUFACTURING THE ZOOM OPTICAL SYSTEM

(71) Applicant: Nikon Corporation, Tokyo (JP)

(72) Inventors: Kosuke Machida, Tokyo (JP); Osamu Gomibuchi, Kawasaki (JP); Kenichi Kitano, Tokyo (JP); Mizuki Wayu, Yokohama (JP); Tsuneo Watanabe, Tokyo (JP); Makoto Horikoshi, Kawasaki (JP); Ichiro Imaei, Tokyo (JP)

(73) Assignee: Nikon Corporation, Tokyo (JP)

( * ) Notice: Subject to any disclaimer, the term of this patent is extended or adjusted under 35 U.S.C. 154(b) by 218 days.

This patent is subject to a terminal disclaimer.

(21) Appl. No.: 17/311,683

(22) PCT Filed: Dec. 26, 2018

(86) PCT No.: PCT/JP2018/047781
§ 371 (c)(1),
(2) Date: Jun. 7, 2021

(87) PCT Pub. No.: WO2020/136749
PCT Pub. Date: Jul. 2, 2020

(65) Prior Publication Data
US 2022/0026692 A1 Jan. 27, 2022

(51) Int. Cl.
*G02B 15/14* (2006.01)
*G02B 3/04* (2006.01)
(Continued)

(52) U.S. Cl.
CPC ........... *G02B 15/1461* (2019.08); *G02B 3/04* (2013.01); *G02B 13/18* (2013.01); *G02B 2003/0093* (2013.01)

(58) Field of Classification Search
CPC ...... G02B 15/1461; G02B 3/04; G02B 13/18; G02B 7/102; G02B 7/021; G02B 7/09; G02B 15/20; G02B 7/022
See application file for complete search history.

(56) References Cited

U.S. PATENT DOCUMENTS 5,559,571 A * 9/1996 Miyamoto ............. G03B 17/00
396/529
9,176,307 B2 * 11/2015 Hayakawa ............. G02B 15/20
(Continued)

FOREIGN PATENT DOCUMENTS

JP 2012-053444 A 3/2012
JP 2013-160944 A 8/2013
(Continued)

OTHER PUBLICATIONS

International Preliminary Report on Patentability from International Patent Application No. PCT/JP2018/047781, dated Jul. 8, 2021.
(Continued)

*Primary Examiner* — Alicia M Harrington
(74) *Attorney, Agent, or Firm* — Potomac Law Group, PLLC

(57) ABSTRACT

A zoom optical system includes a plurality of lens groups, and upon zooming distances between adjacent lens groups change. The zoom optical system has a focusing lens group that moves upon focusing and an image-side lens group disposed adjacent to an image side of the focusing lens group. The zoom optical system satisfies the conditional expression 0.000<dL0t/dL1t<1.000, where dL0t denotes a distance on an optical axis between the focusing lens group and the image-side lens group upon focusing on an infinity (Continued)

object in a telephoto end state, and dL1t denotes a distance on the optical axis between the focusing lens group and the image-side lens group upon focusing on a short-distance object in the telephoto end state.

20 Claims, 55 Drawing Sheets

(51) Int. Cl.
 *G02B 13/18* (2006.01)
 *G02B 3/00* (2006.01)

(56) References Cited

U.S. PATENT DOCUMENTS

| | | |
|---|---|---|
| 2012/0026602 A1 | 2/2012 | Uchida et al. |
| 2013/0201370 A1 | 8/2013 | Hatada |
| 2014/0139722 A1 | 5/2014 | Sugita |
| 2014/0240554 A1 | 8/2014 | Uchida et al. |
| 2017/0192212 A1* | 7/2017 | Yamamoto ............. G02B 15/20 |
| 2019/0179109 A1 | 6/2019 | Sakai et al. |
| 2022/0019063 A1* | 1/2022 | Machida ................ G02B 15/20 |

FOREIGN PATENT DOCUMENTS

| | | |
|---|---|---|
| JP | 2014-102462 A | 6/2014 |
| JP | 2015-215438 A | 12/2015 |
| JP | 2018-092185 A | 6/2018 |
| WO | WO 2018/221723 A1 | 12/2018 |

OTHER PUBLICATIONS

International Search Report from International Patent Application No. PCT/JP2018/047781, dated Apr. 2, 2019.
Office Action dated Mar. 15, 2022, in Japanese Patent Application No. 2020-562012.
Office Action dated Nov. 1, 2022, in Japanese Patent Application No. 2020-562012.

* cited by examiner

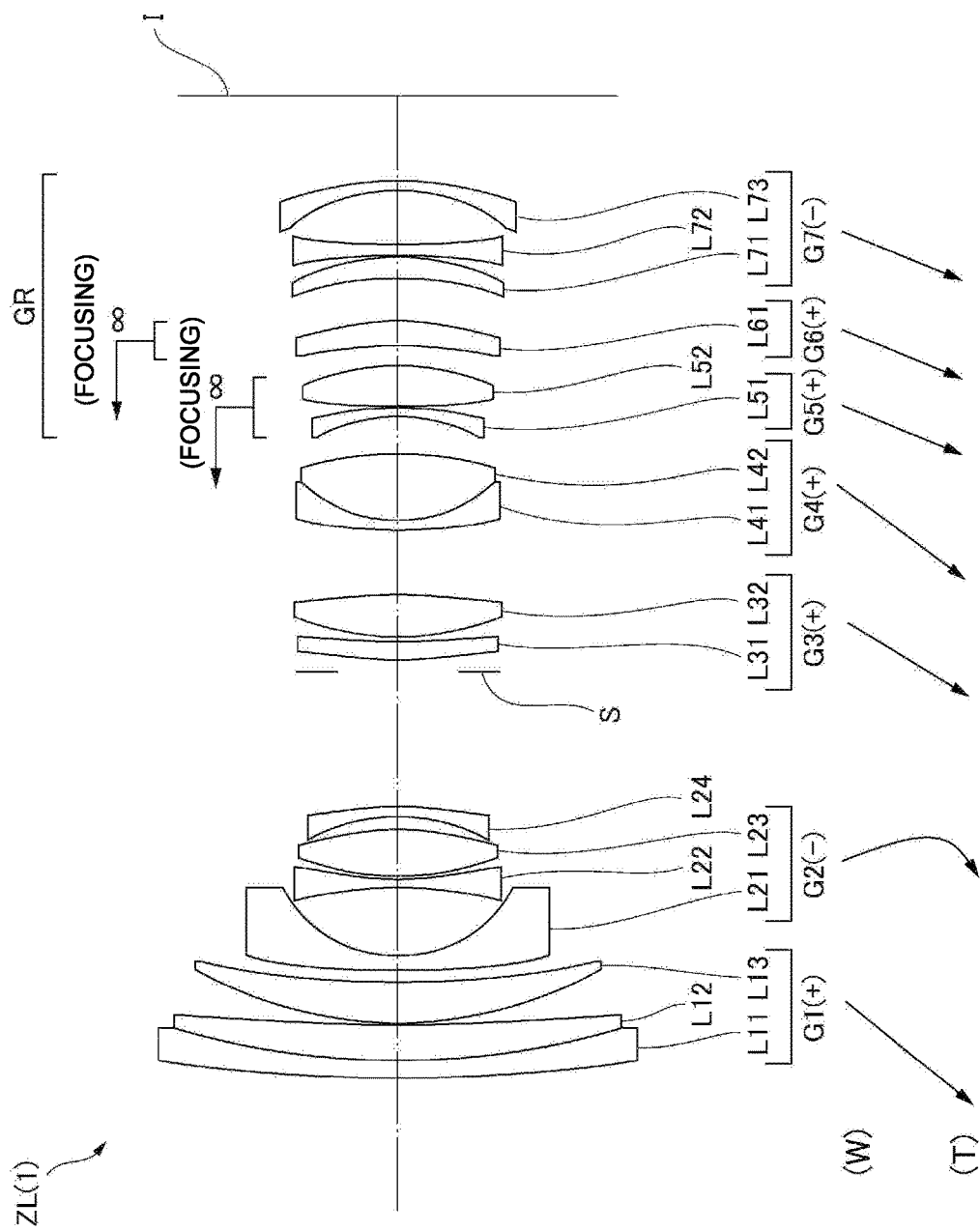

FIG.5B
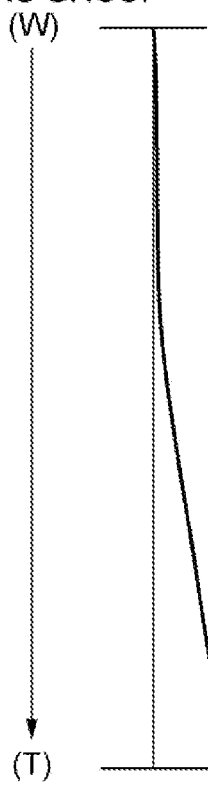
RELATIVE MOVEMENT TRAJECTORY OF FIFTH LENS GROUP
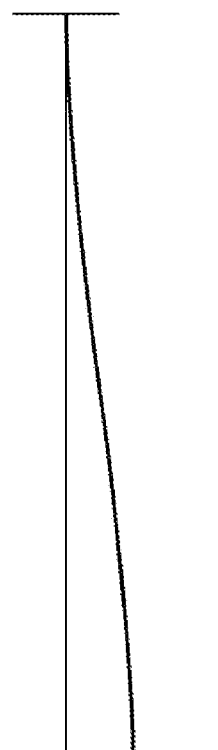
RELATIVE MOVEMENT TRAJECTORY OF SIXTH LENS GROUP

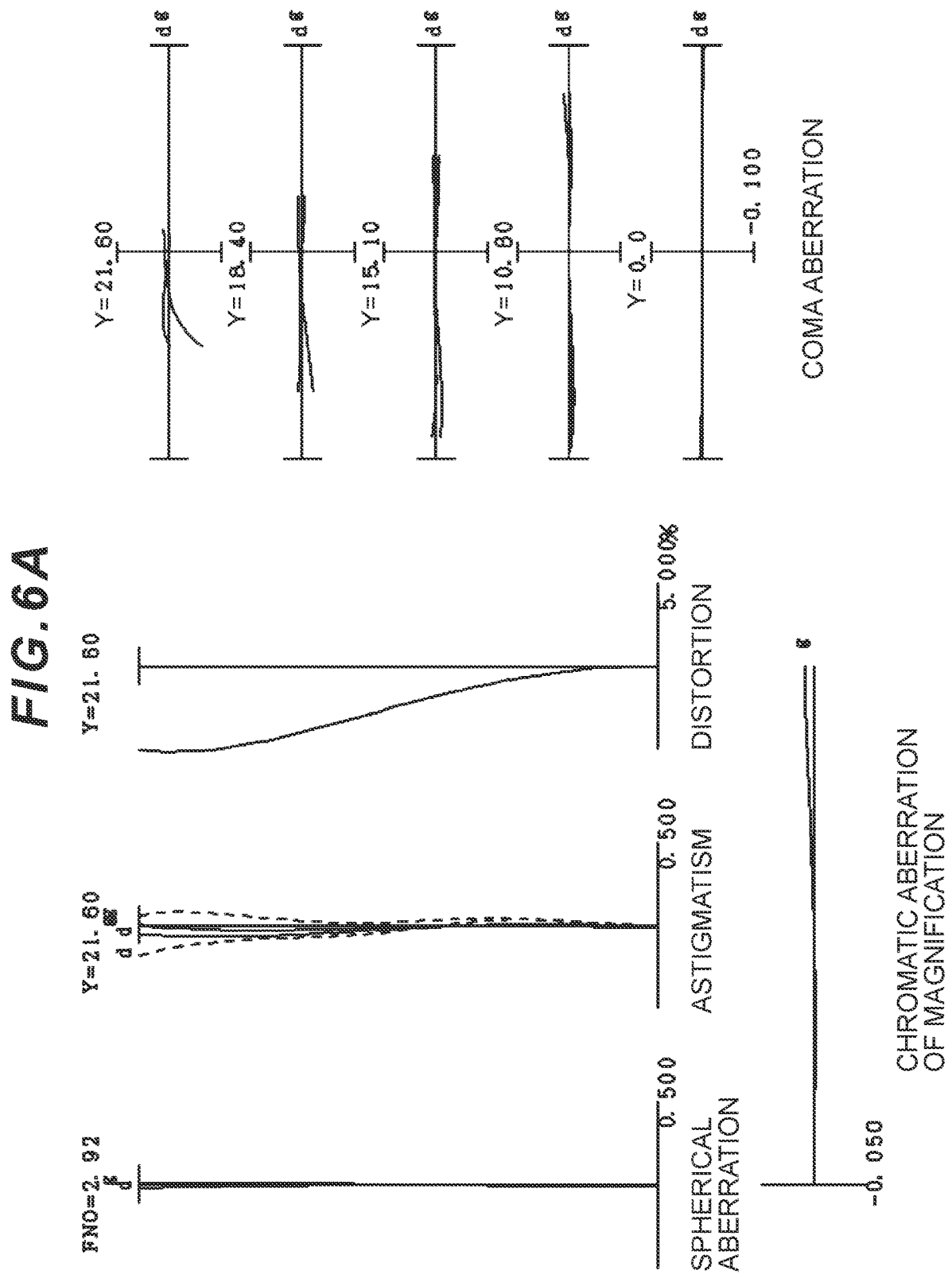

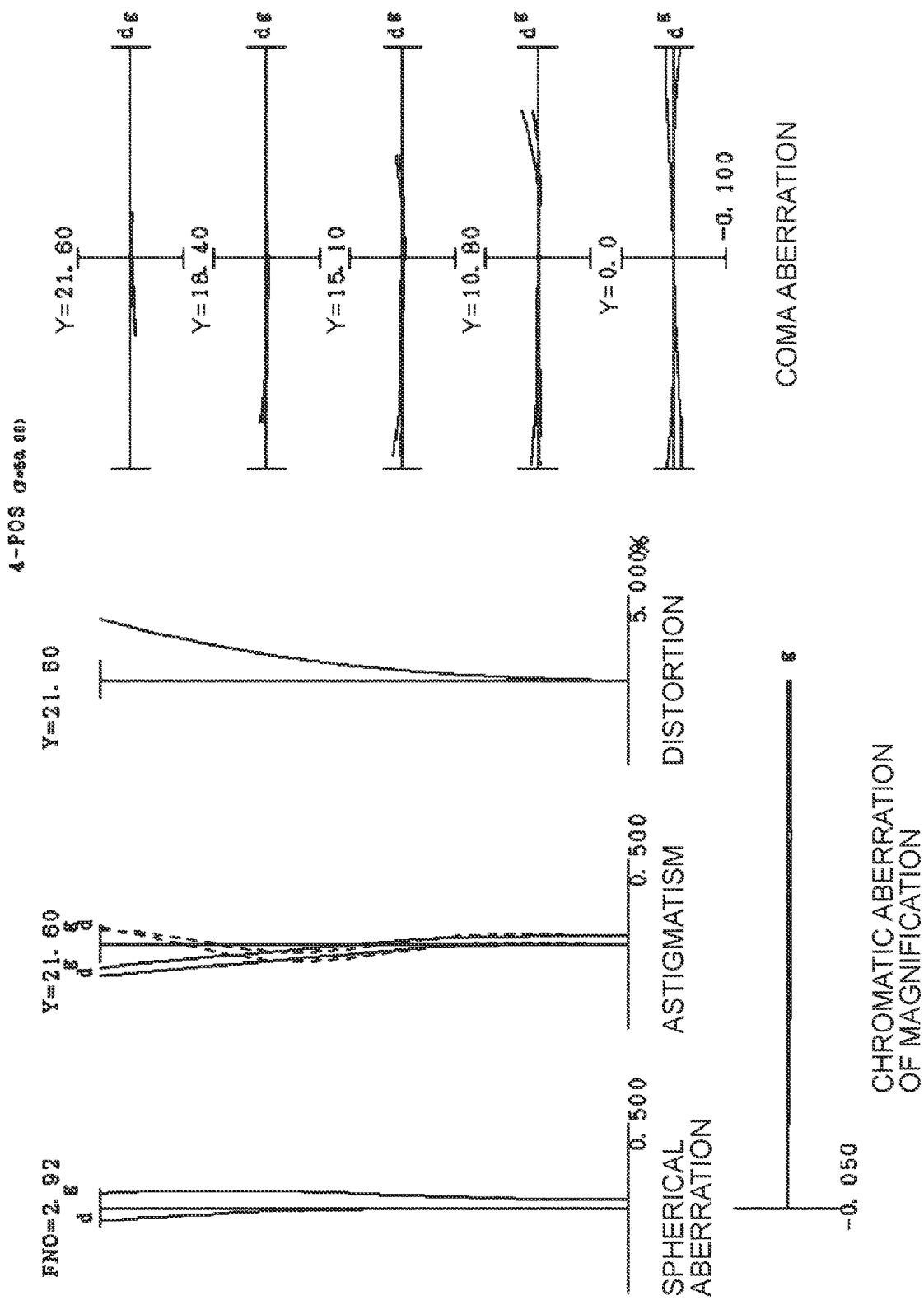

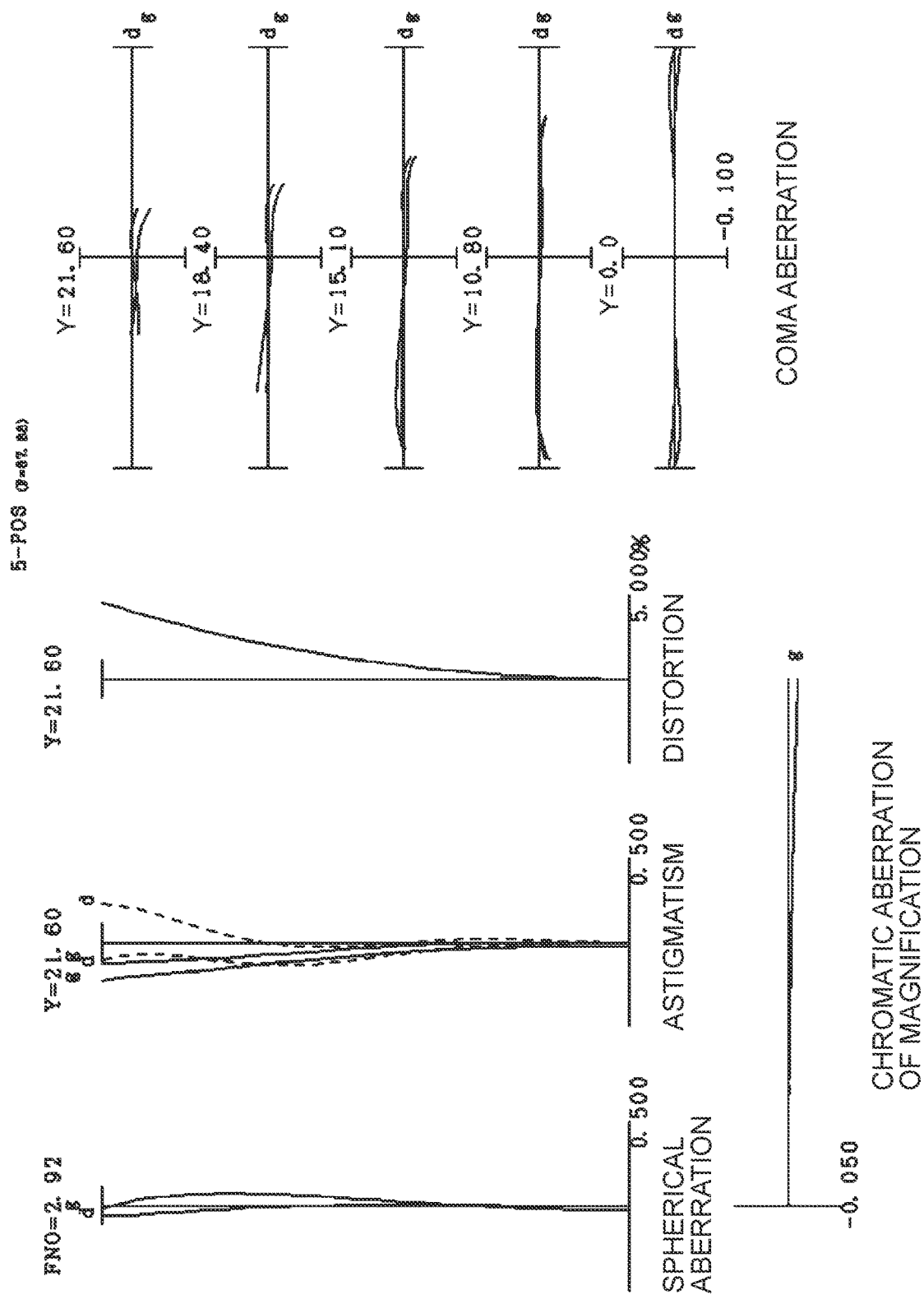

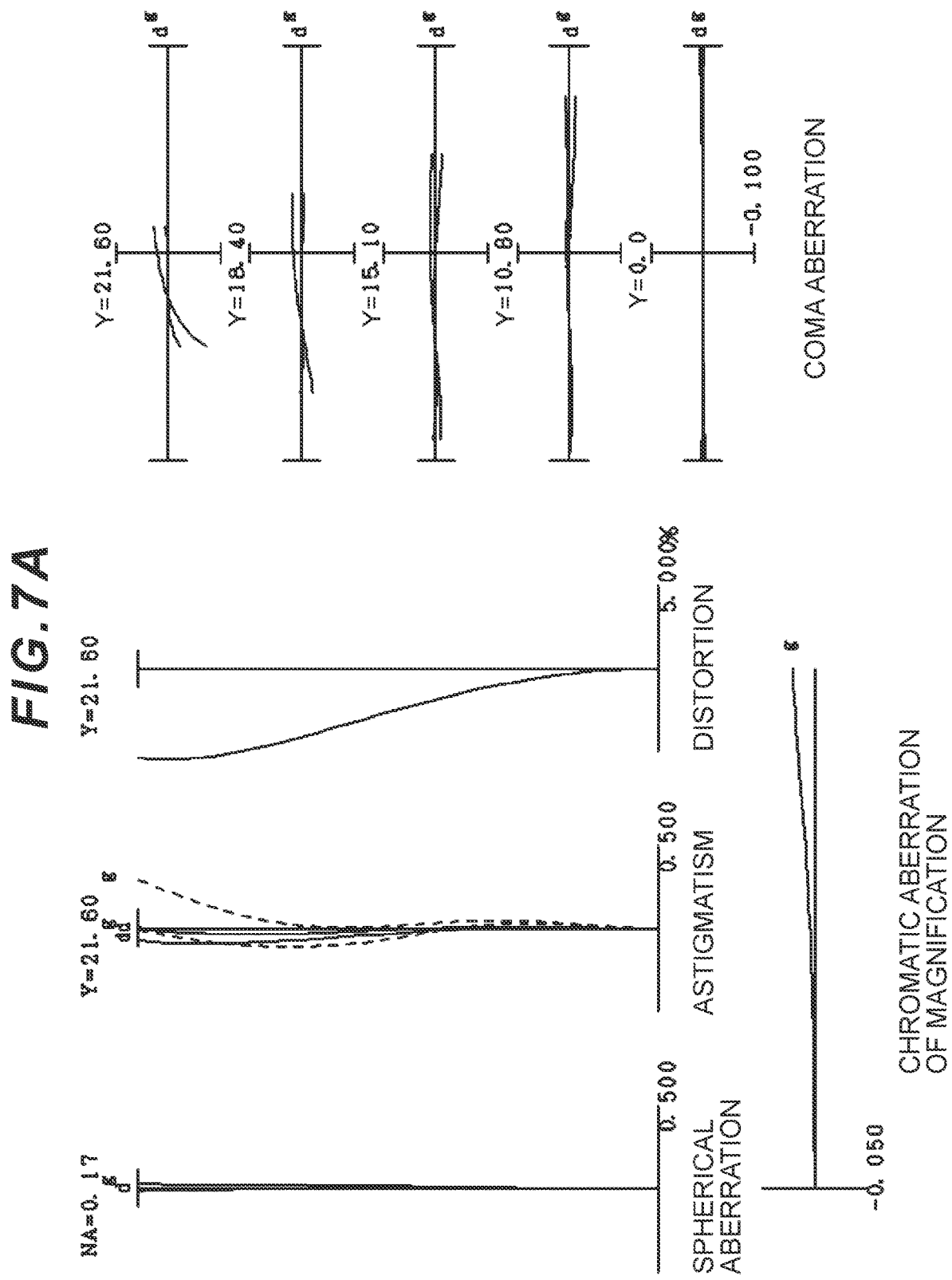

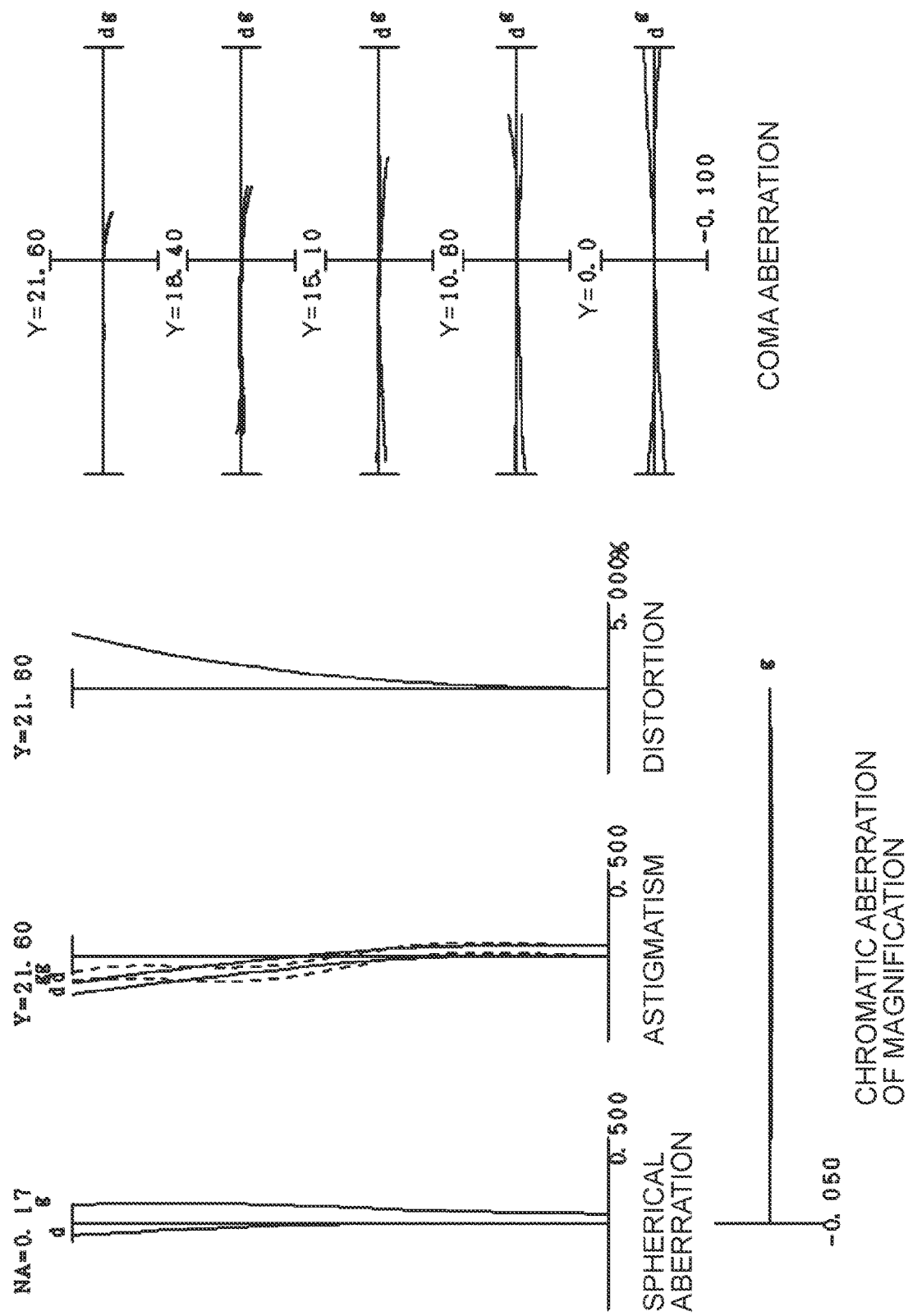

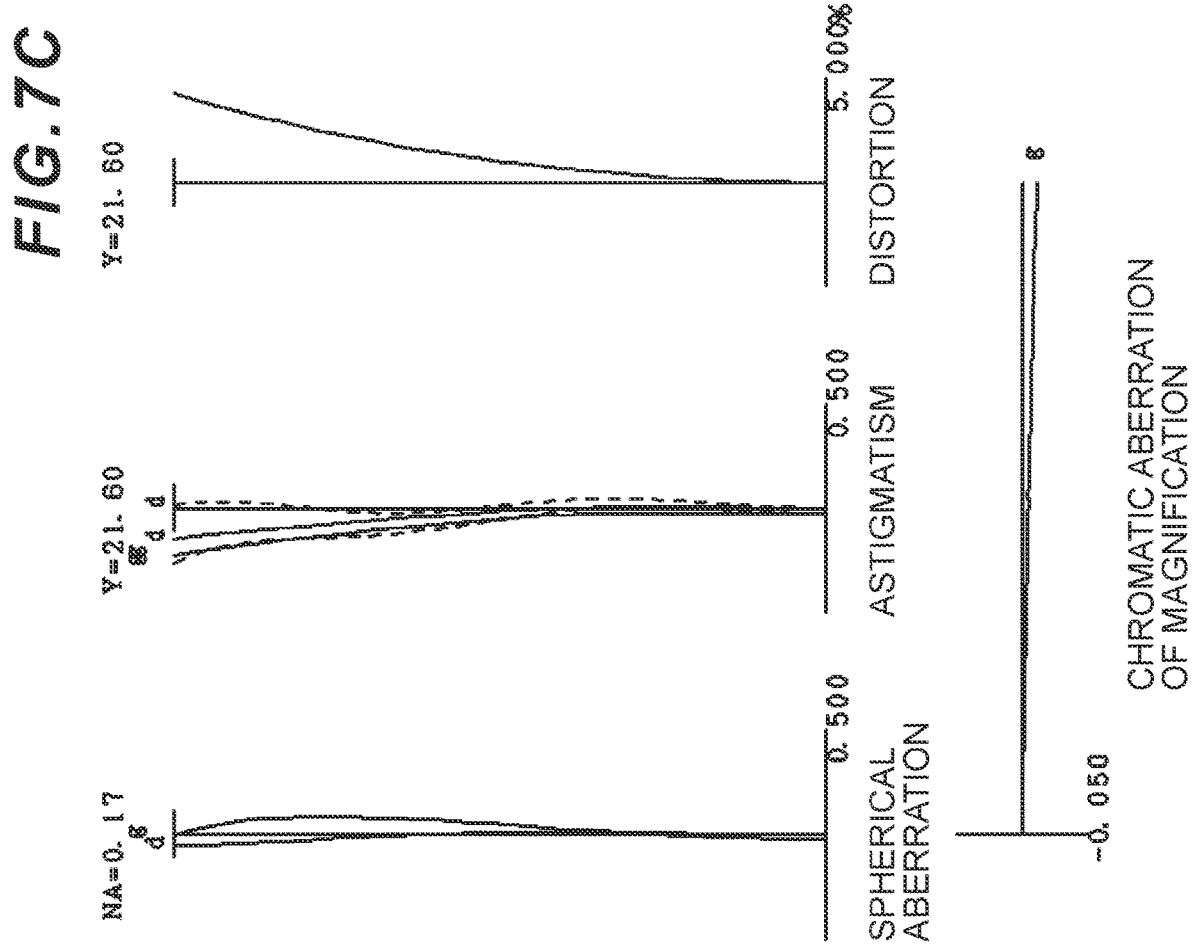

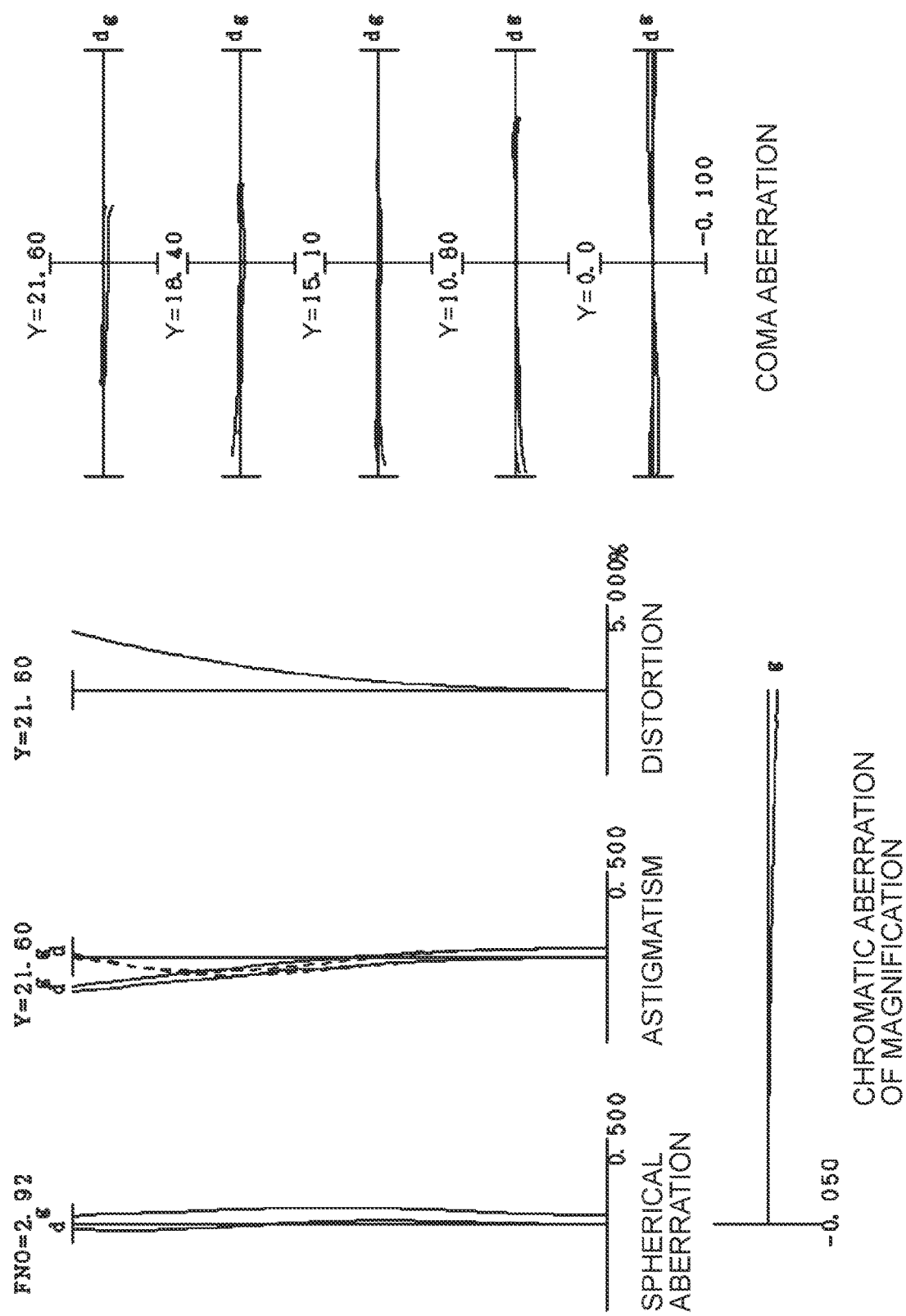

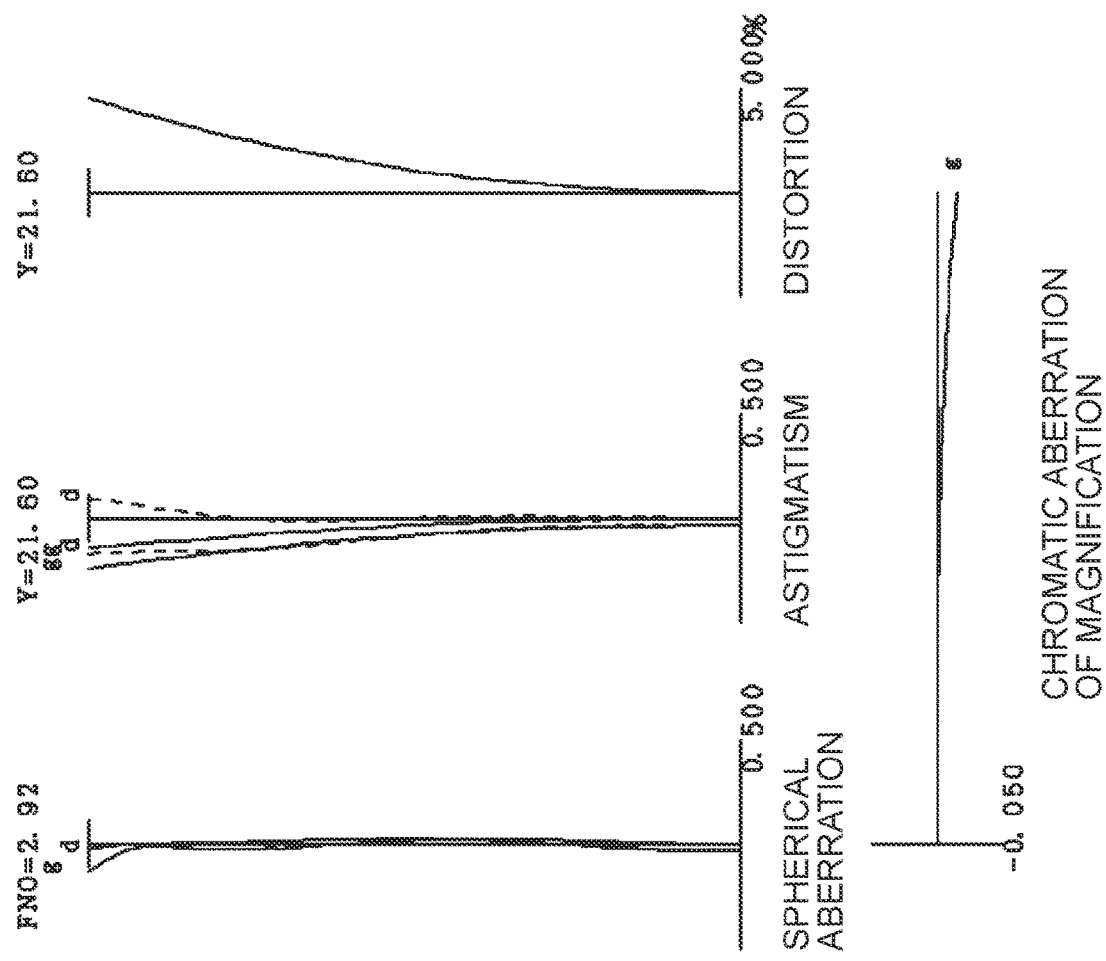

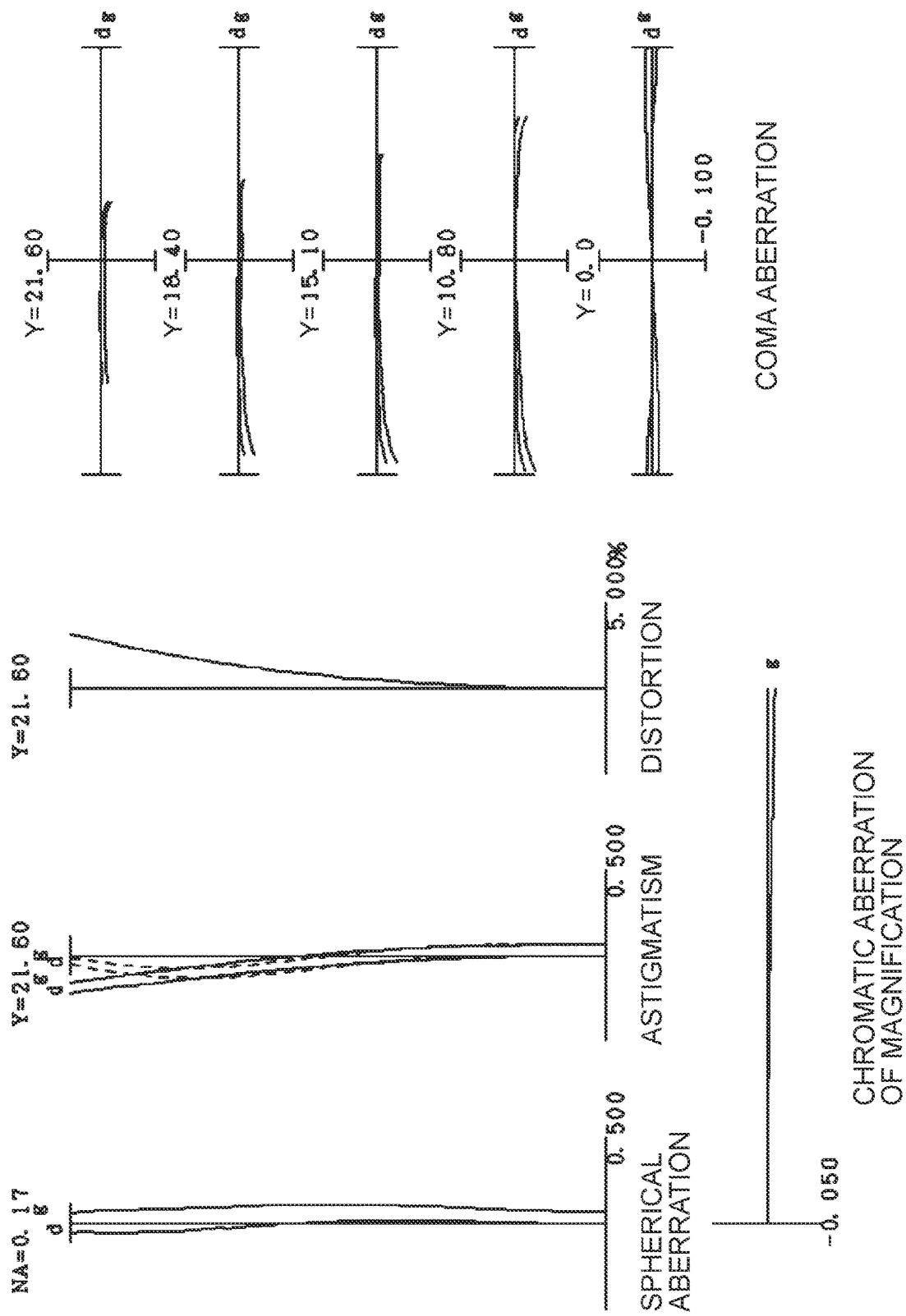

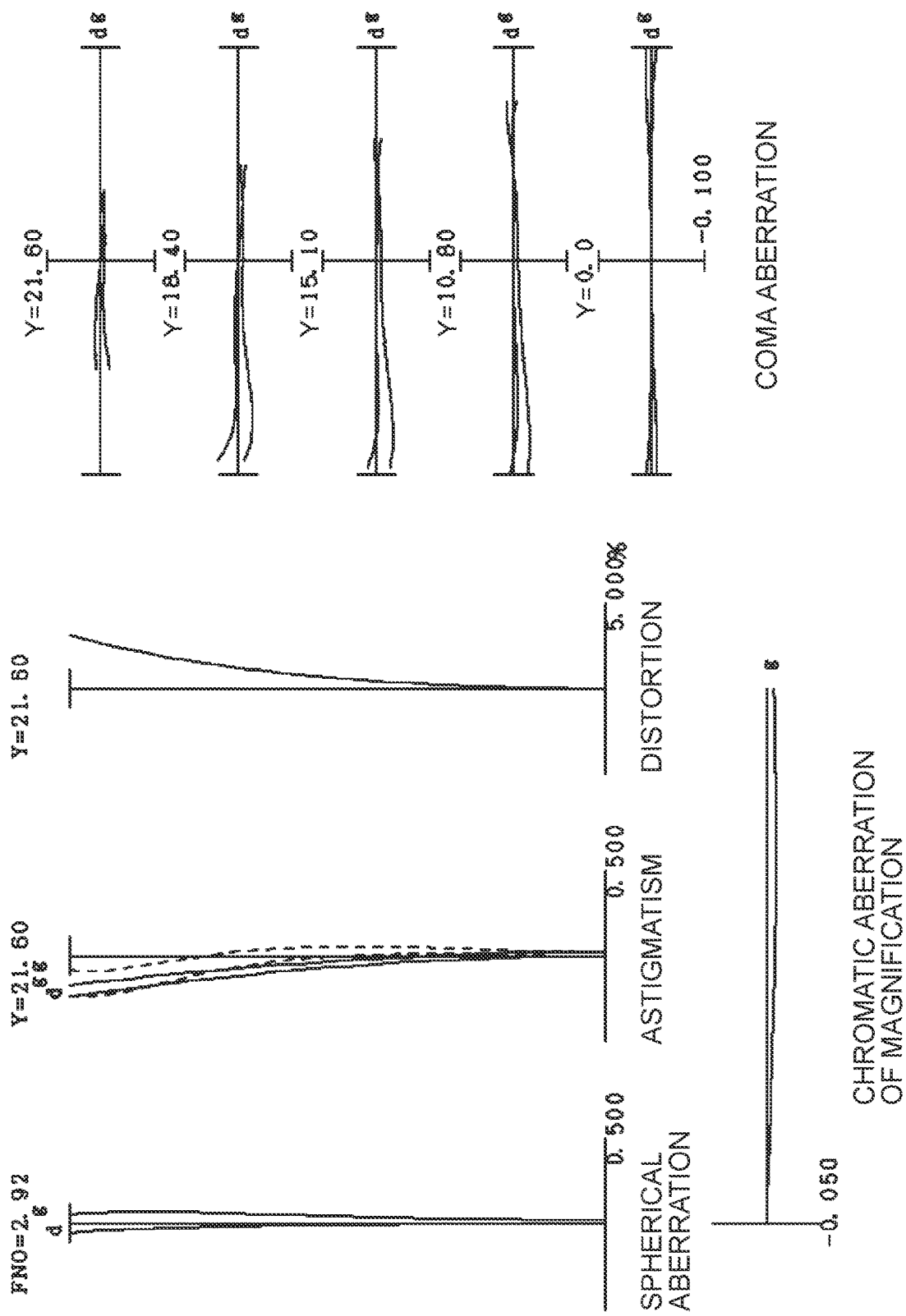

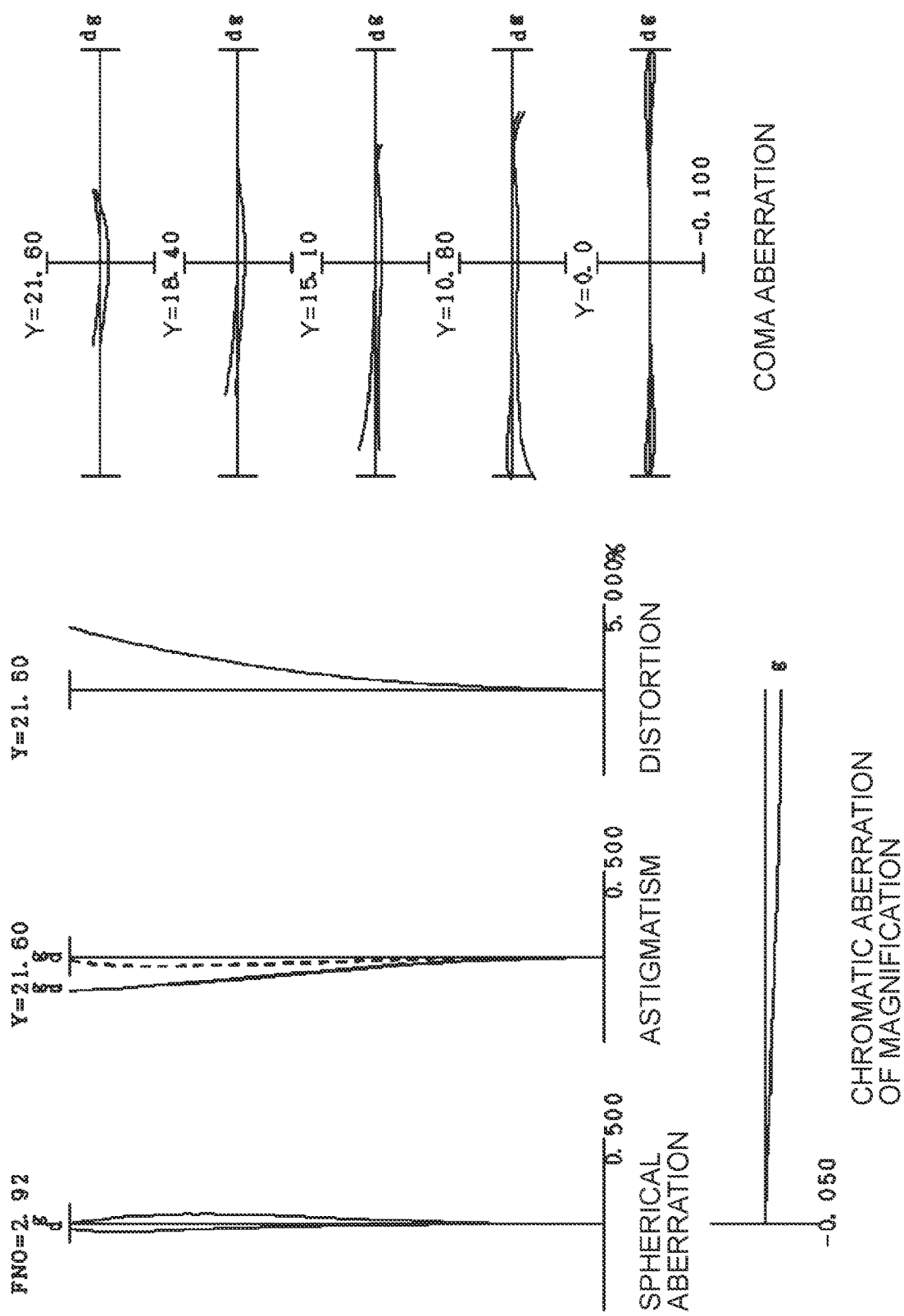

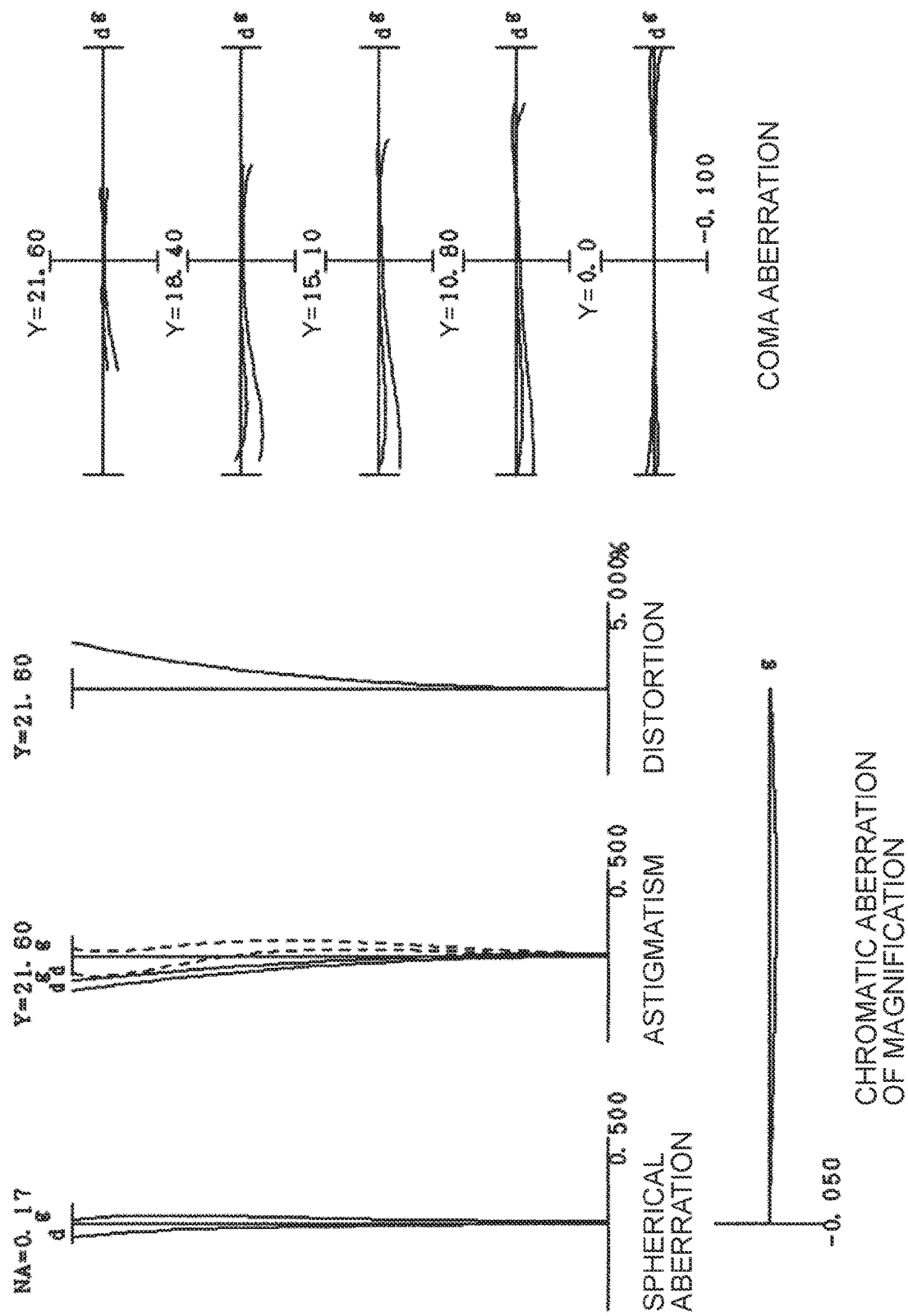

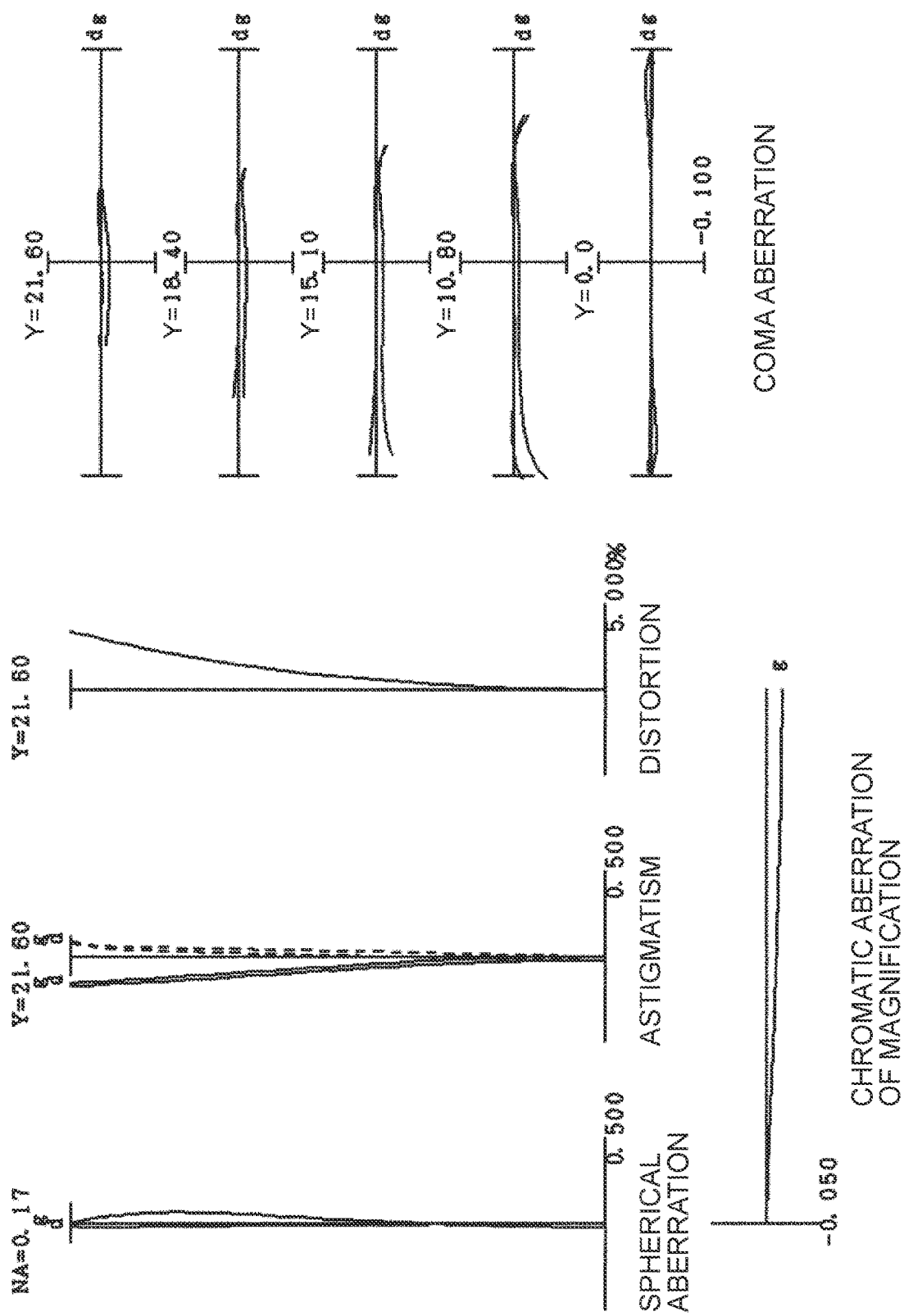

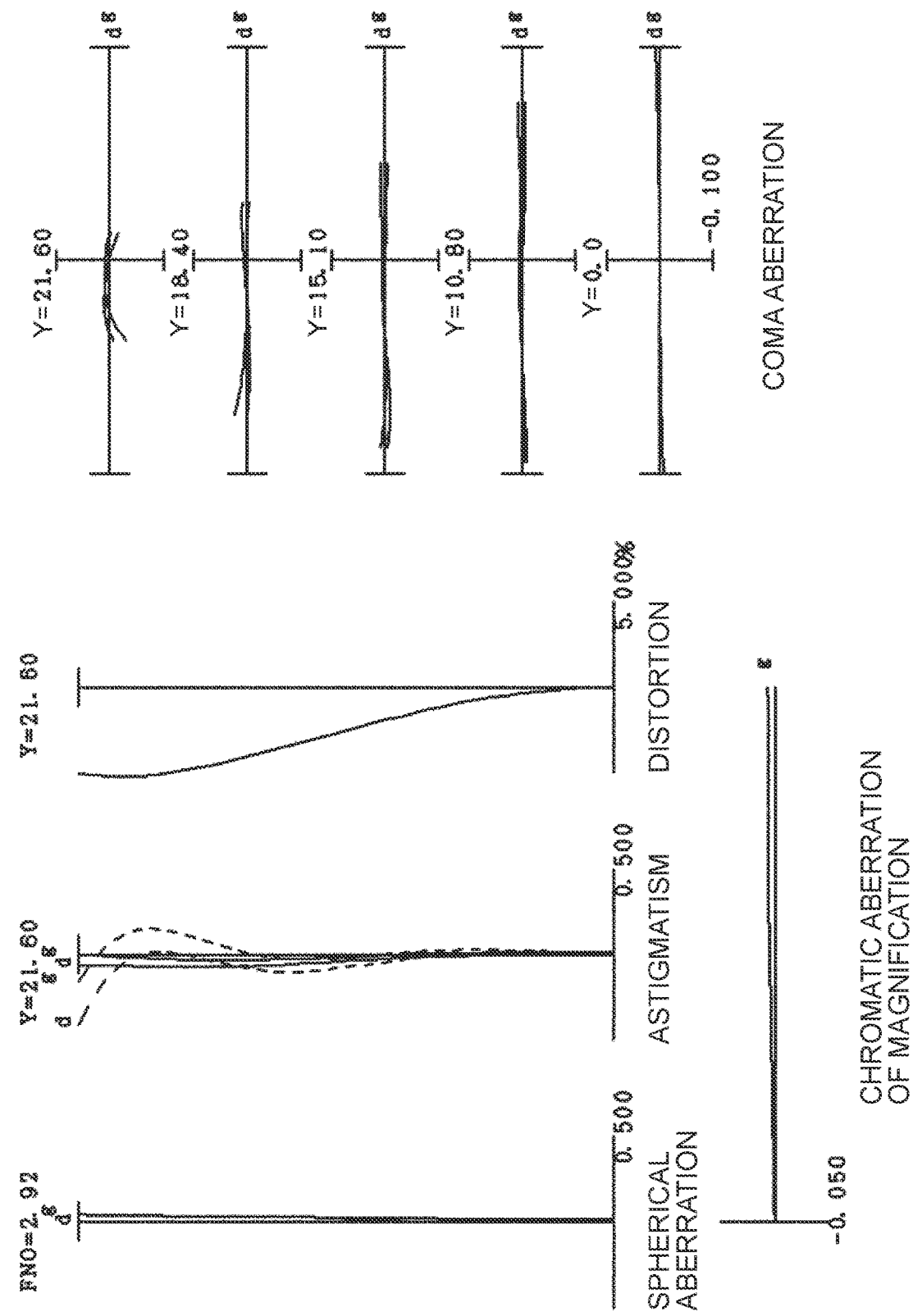

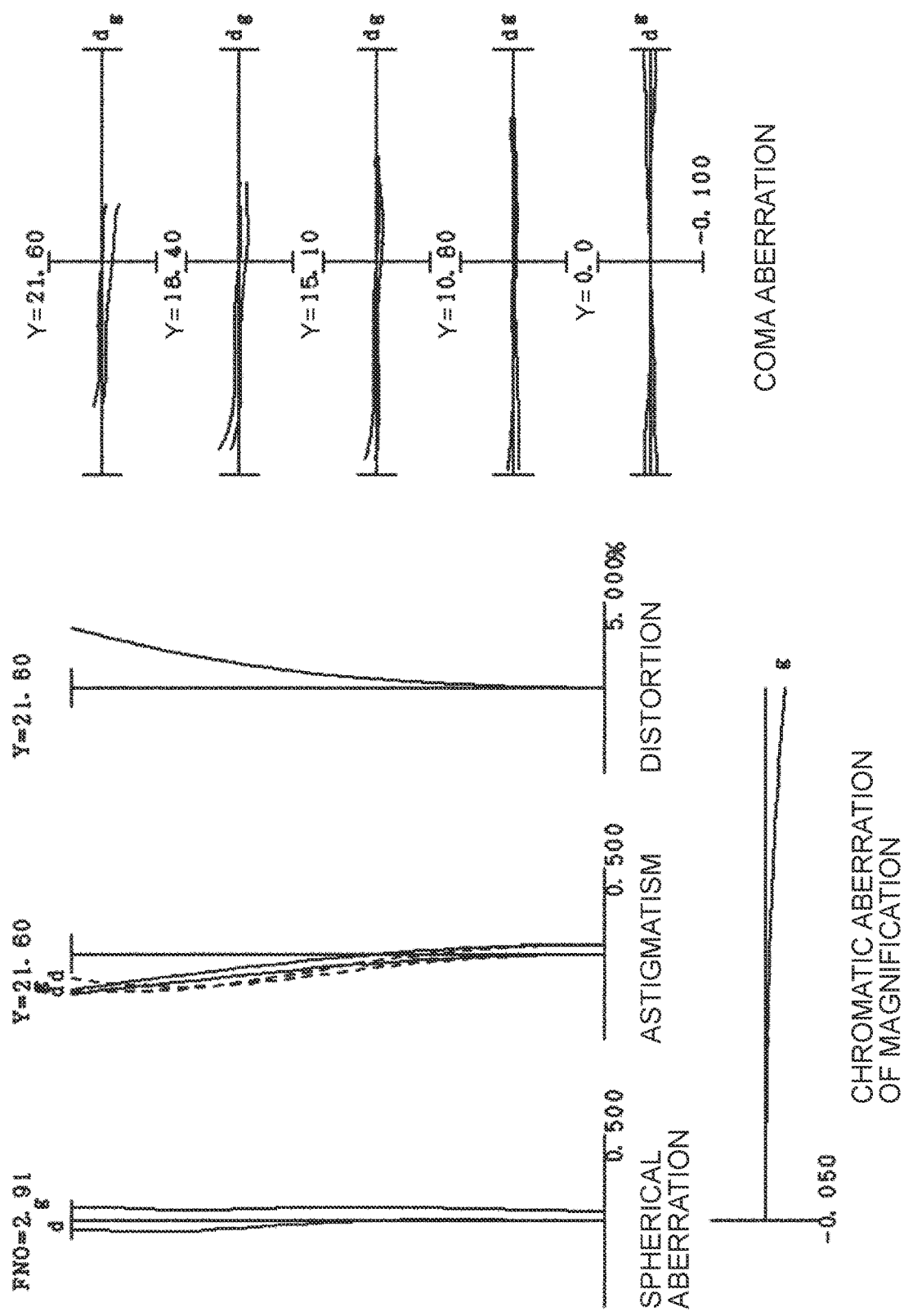

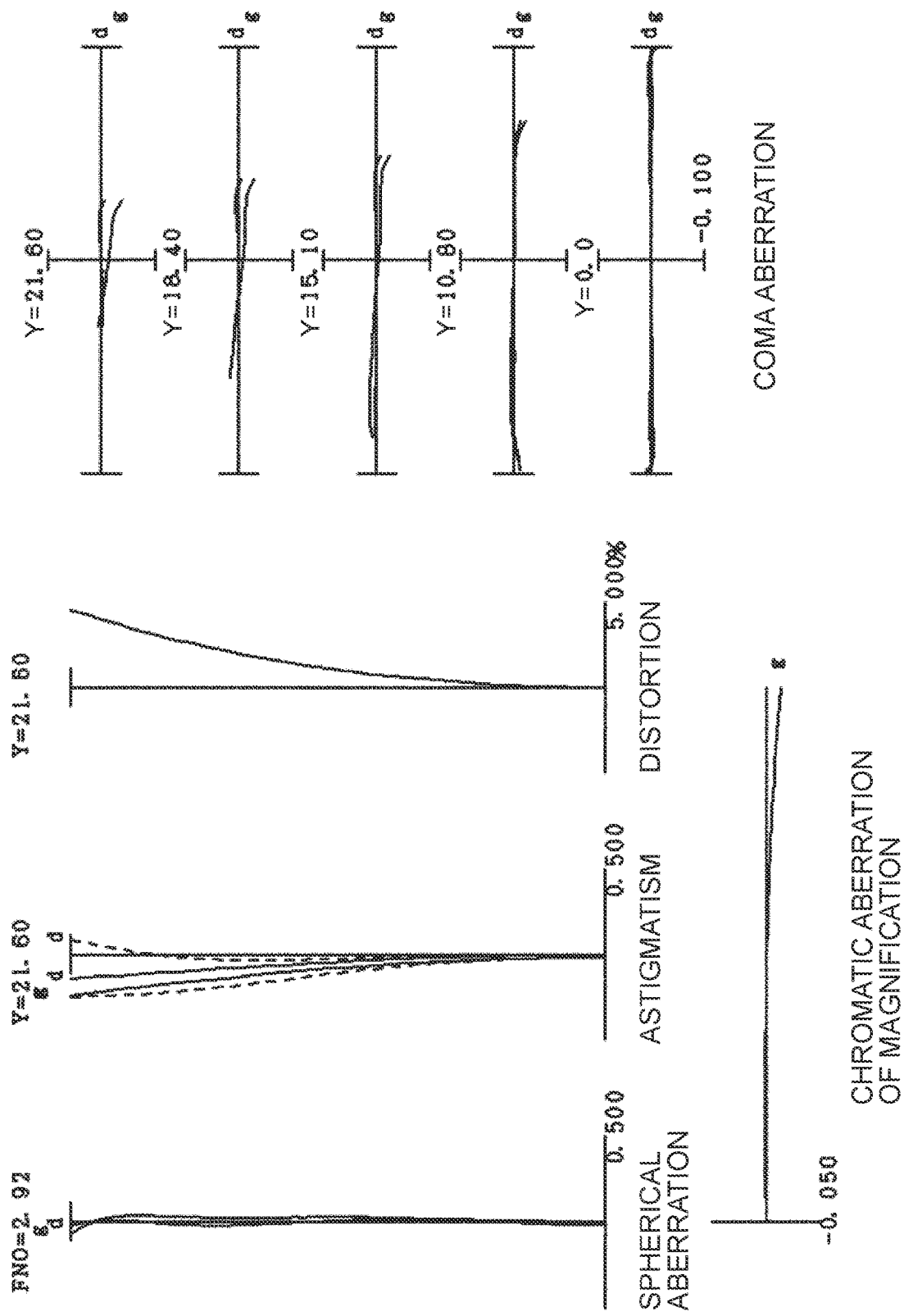

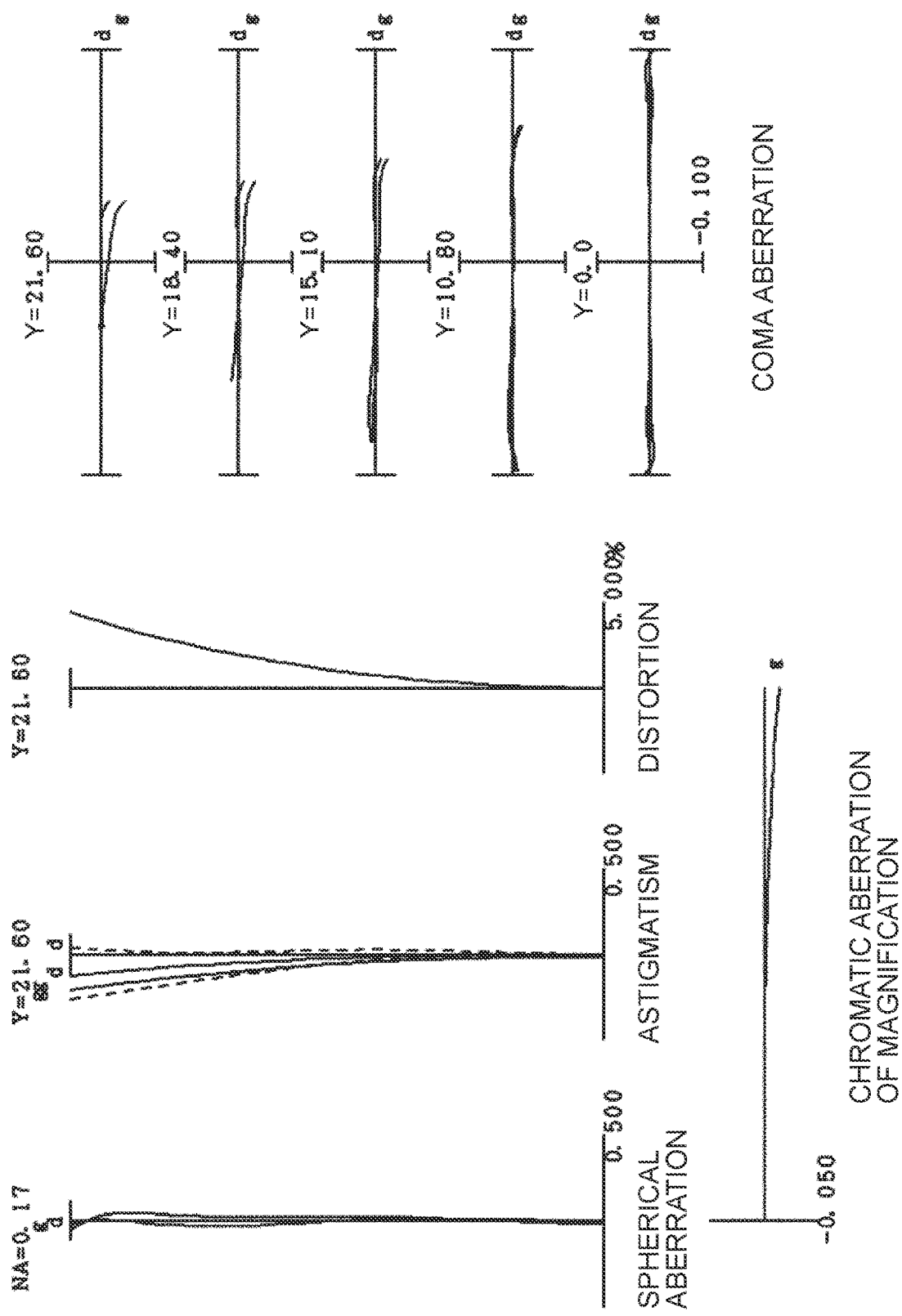

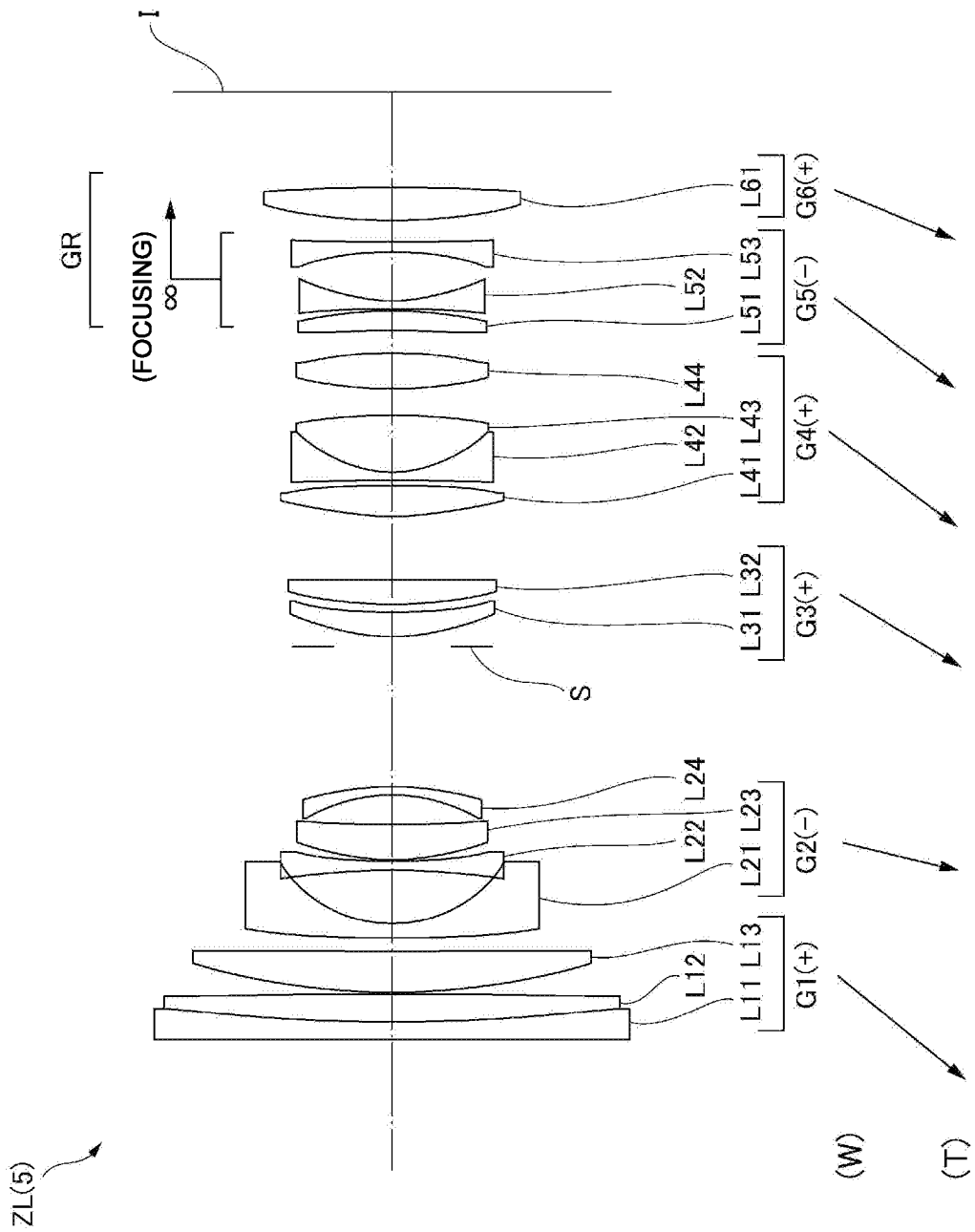

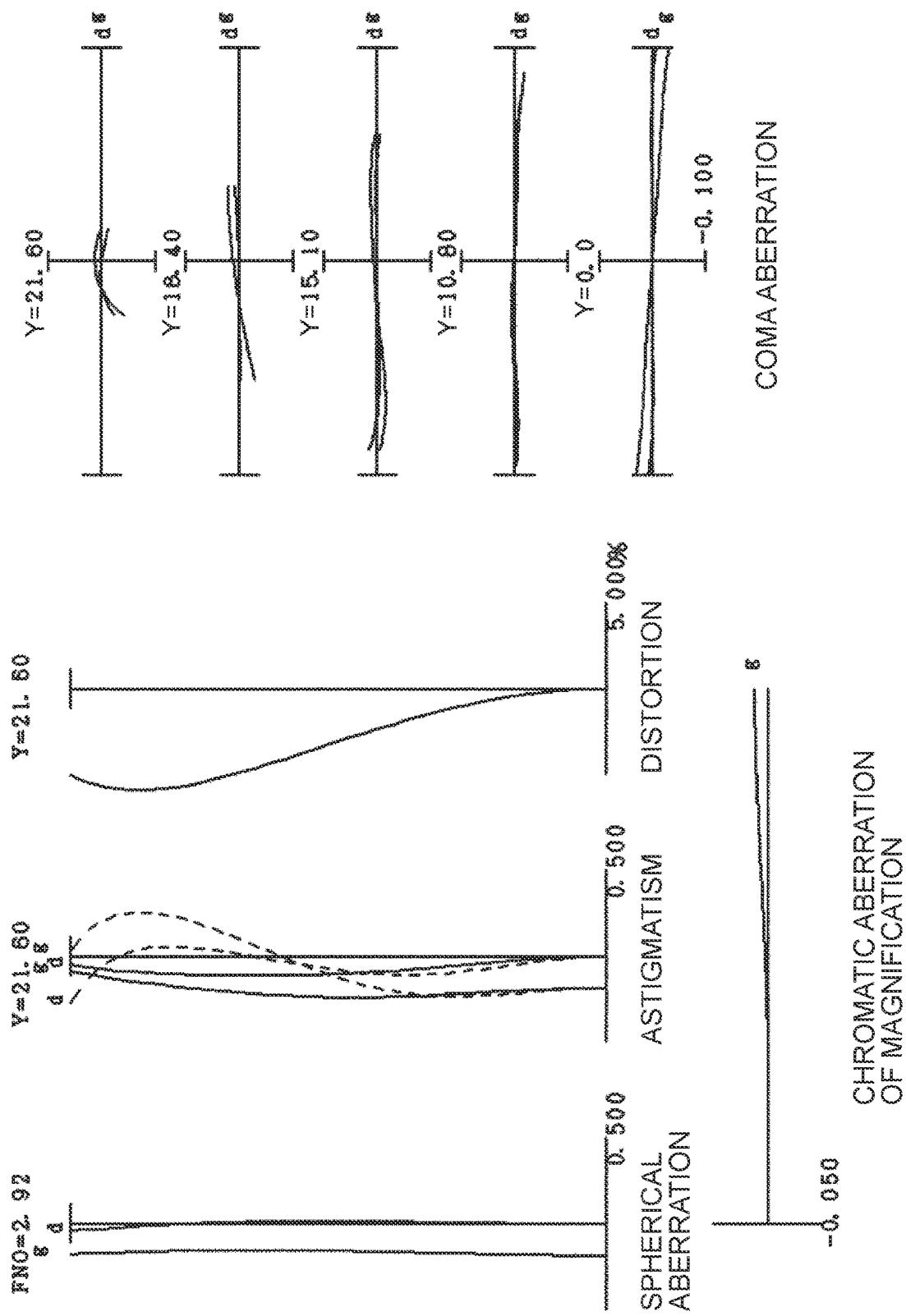

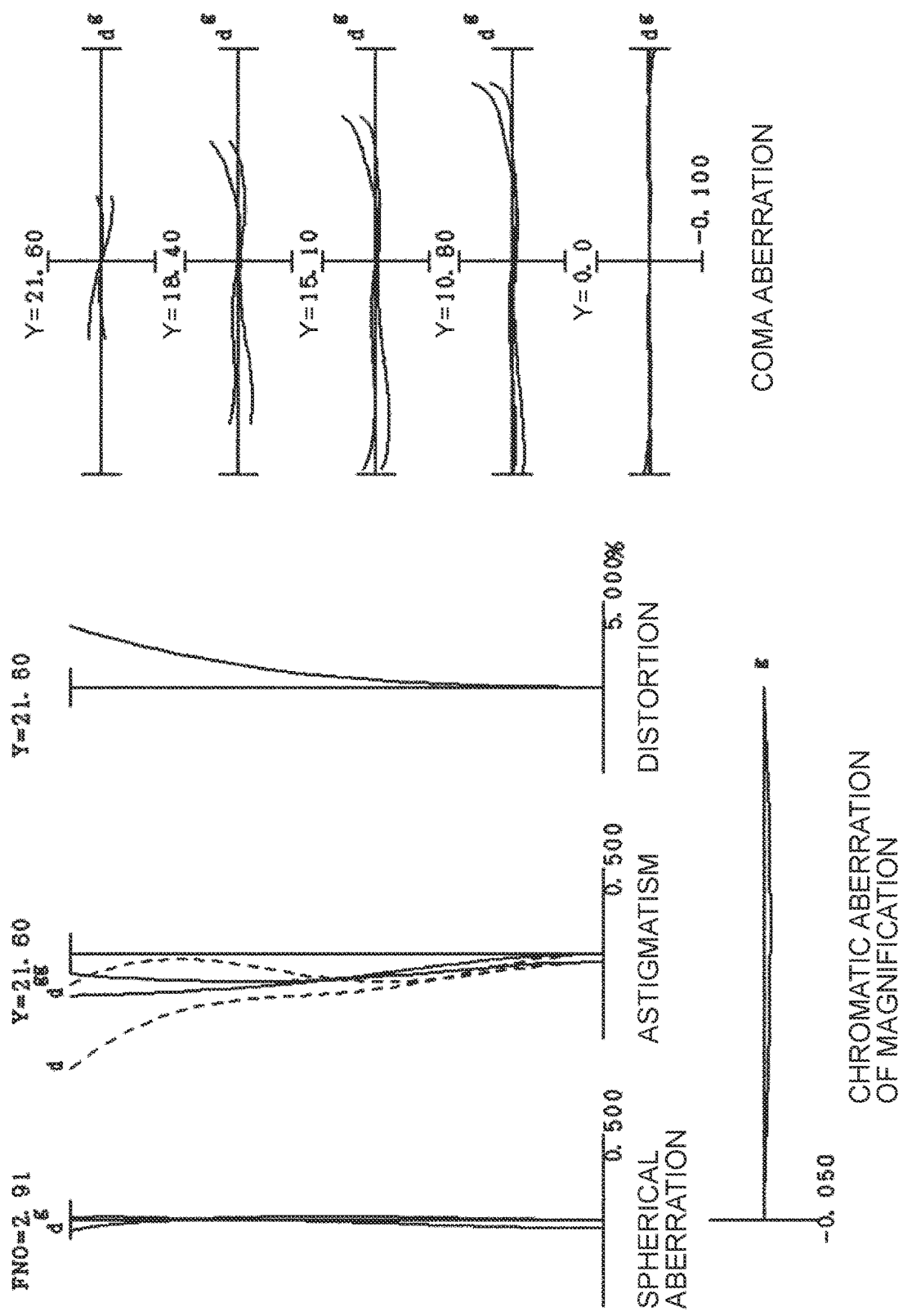

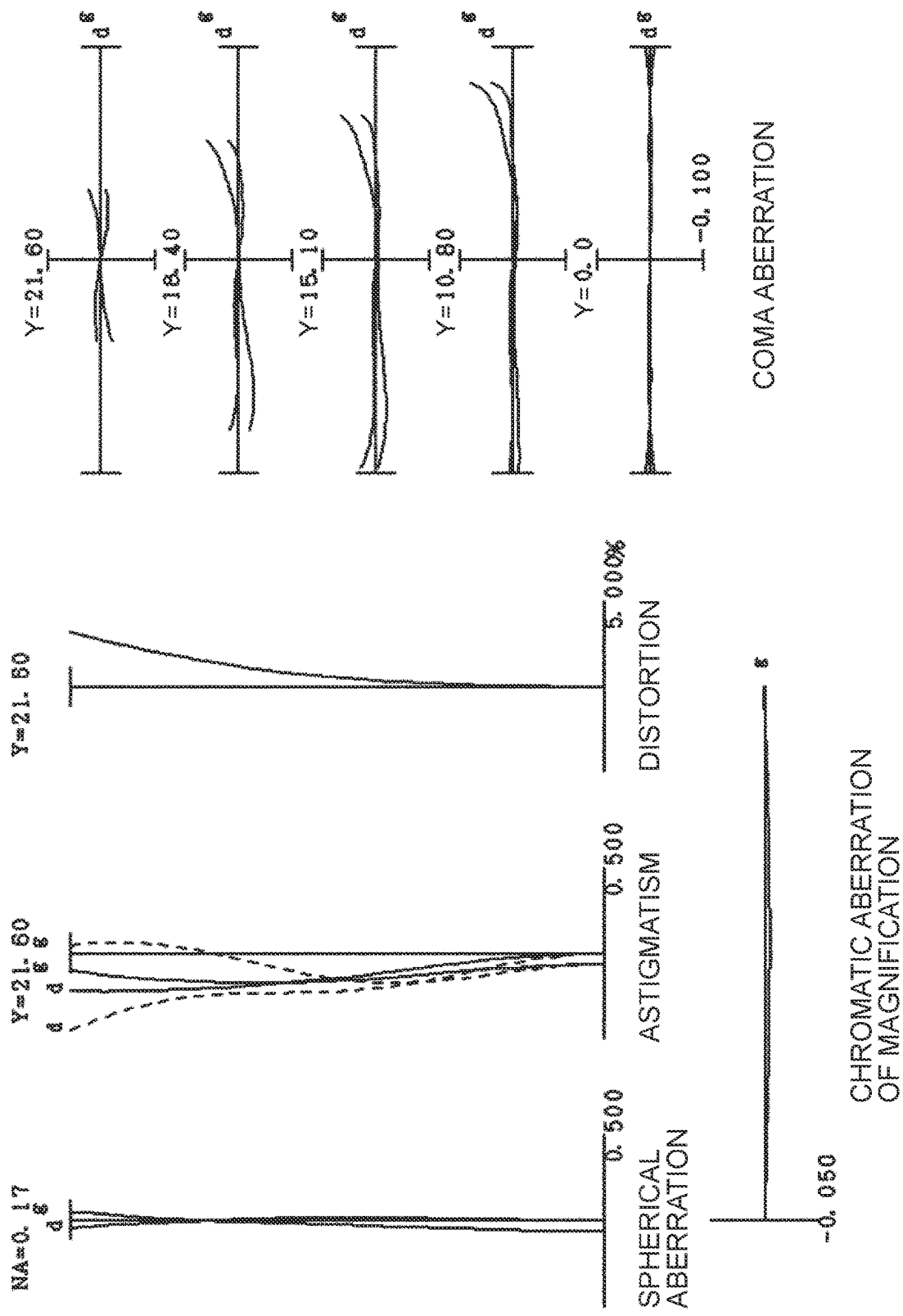

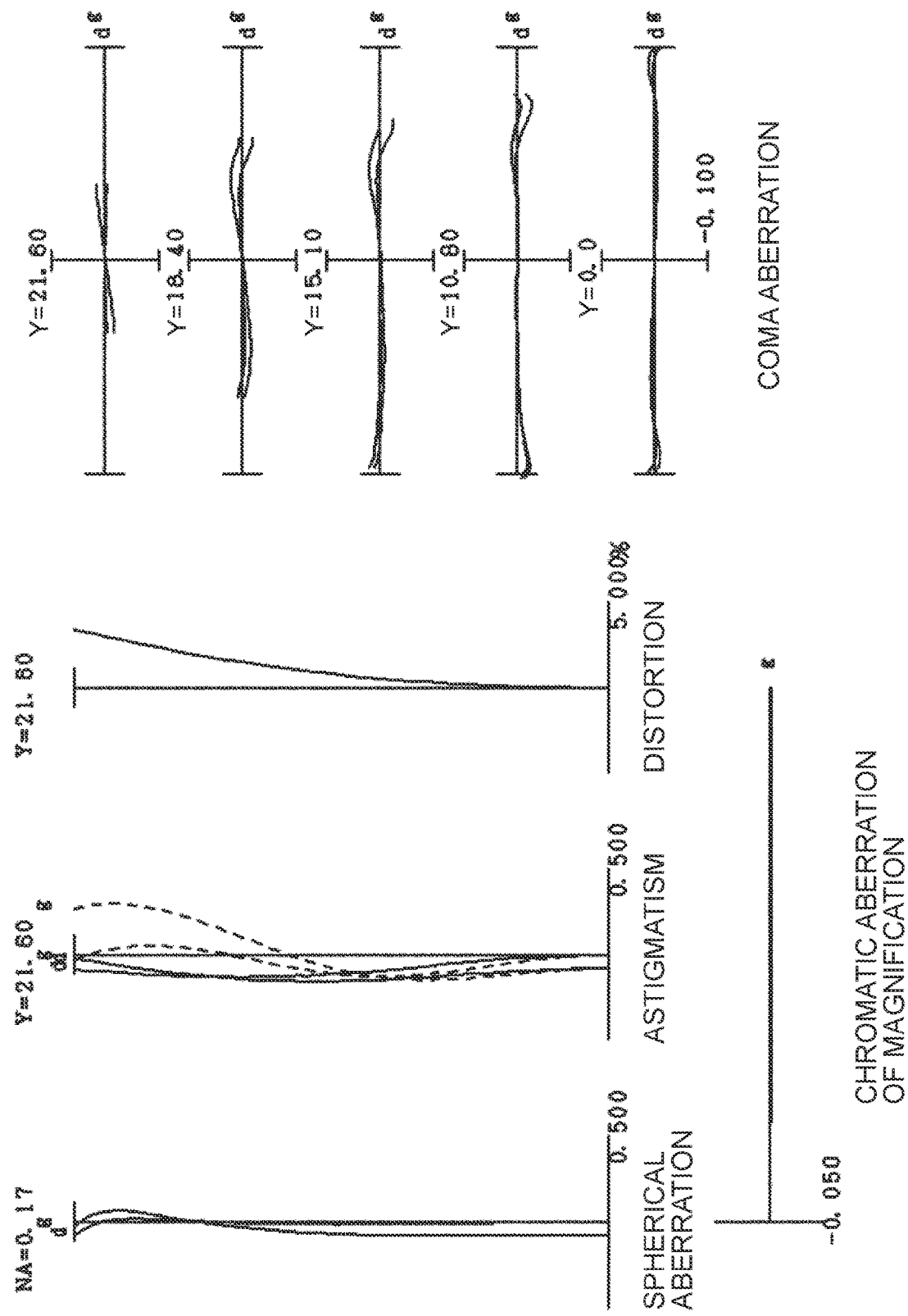

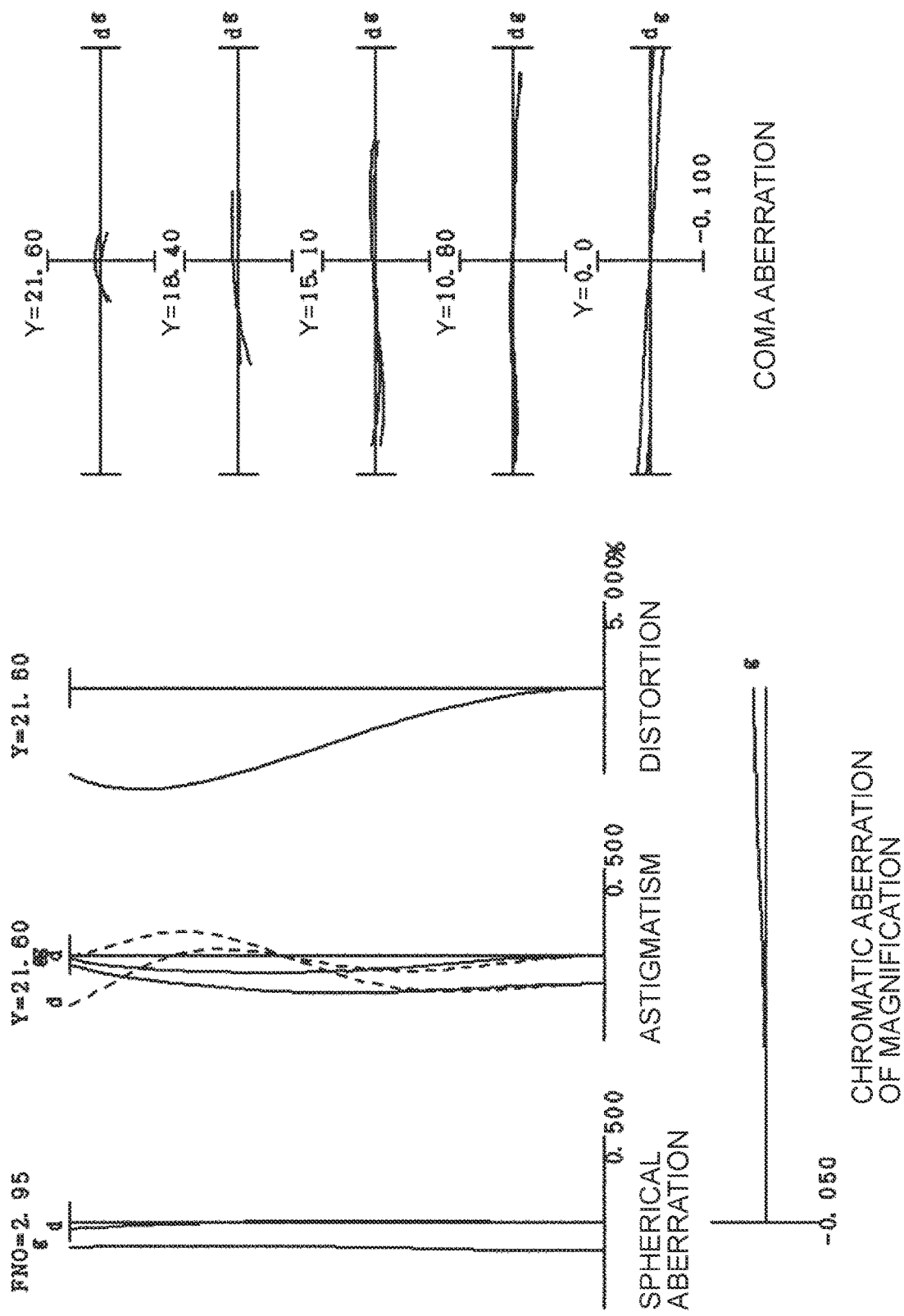

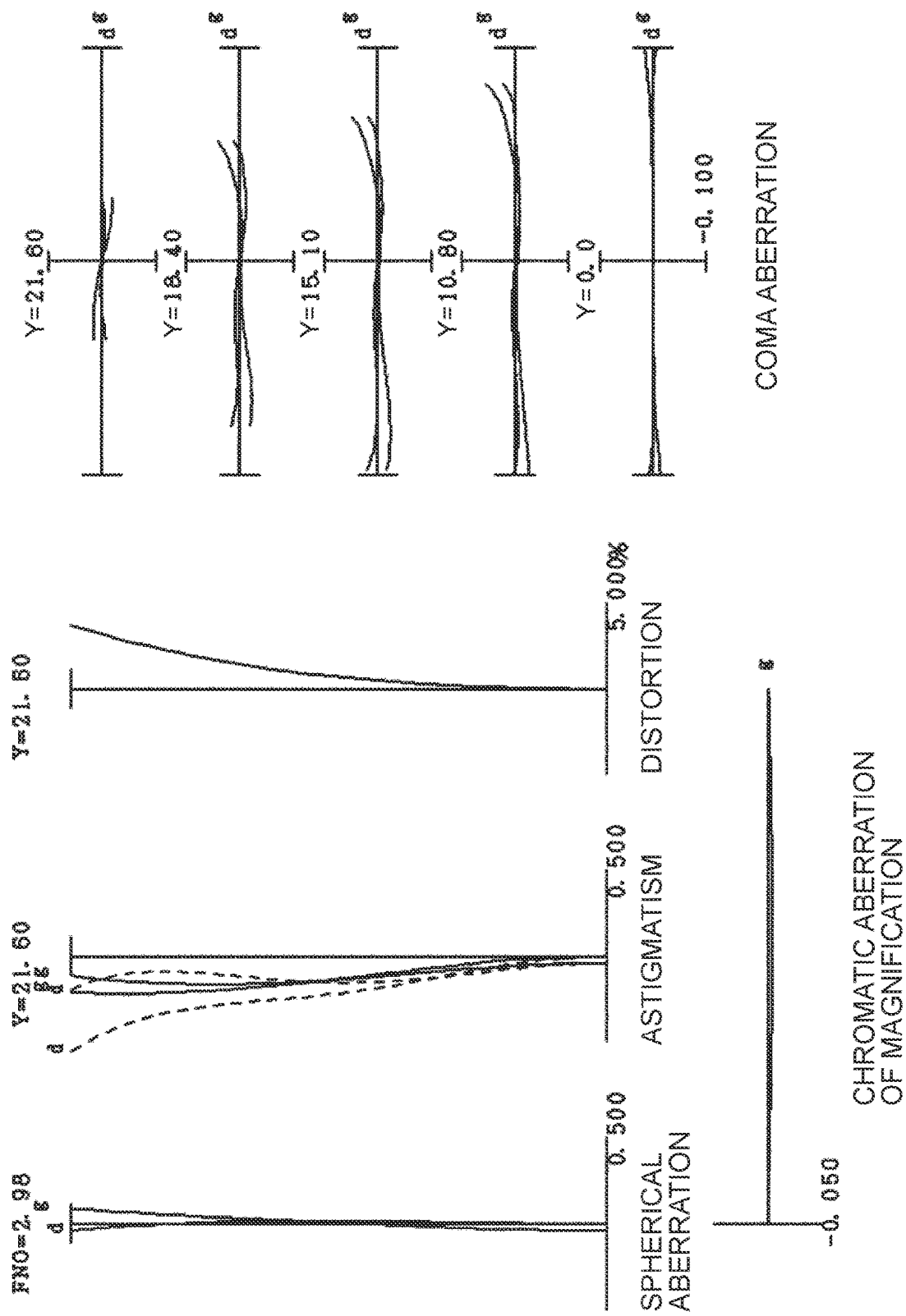

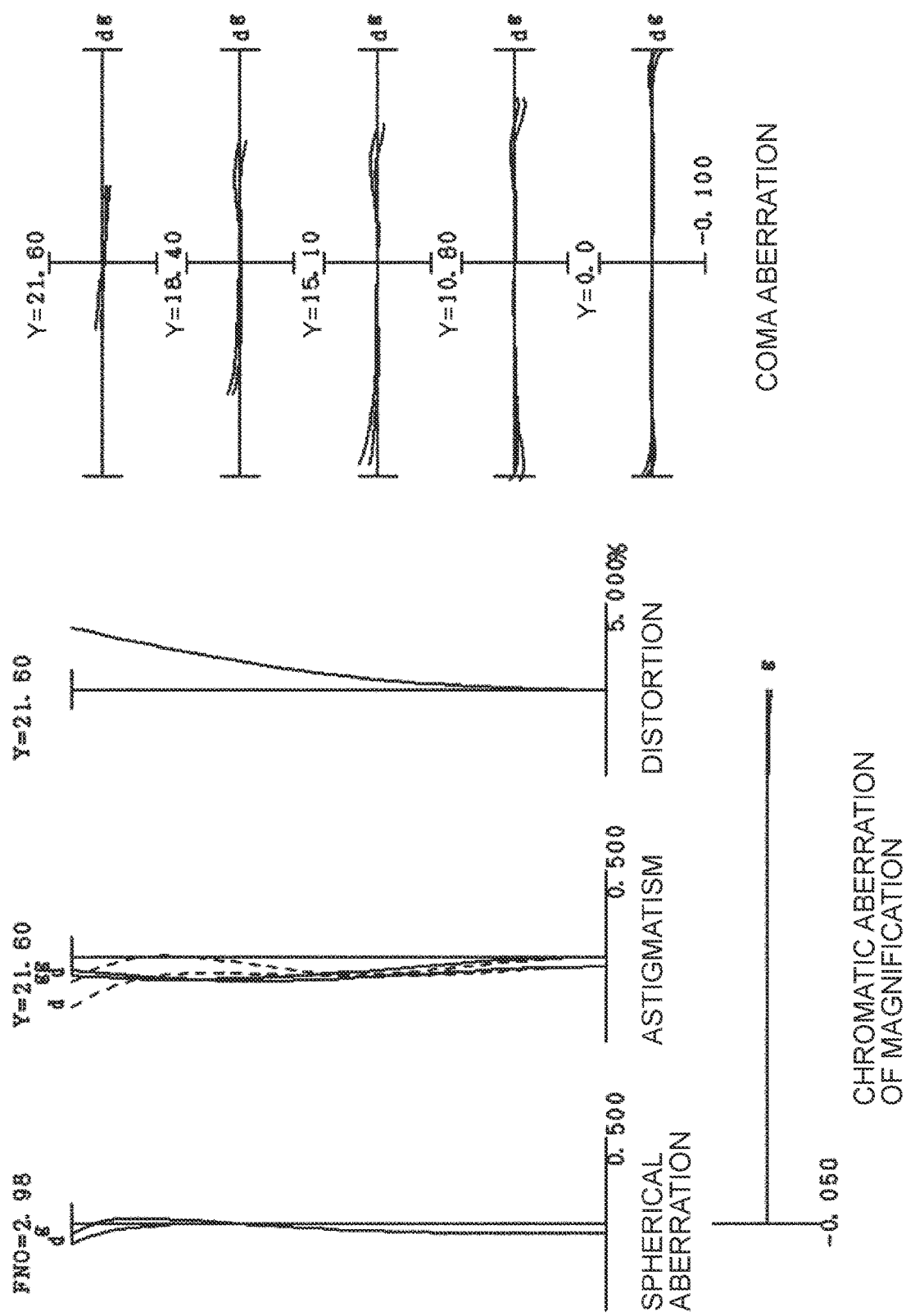

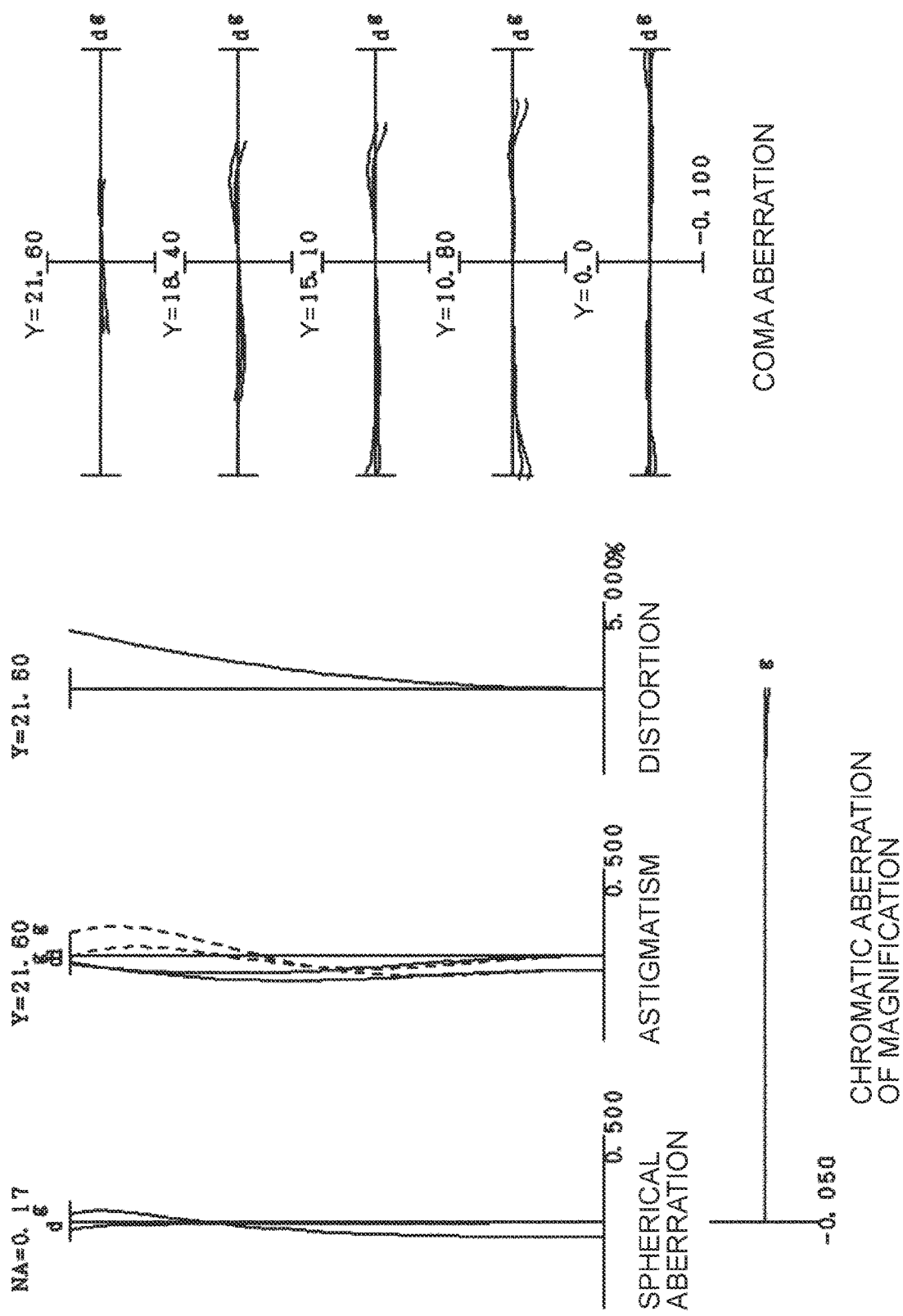

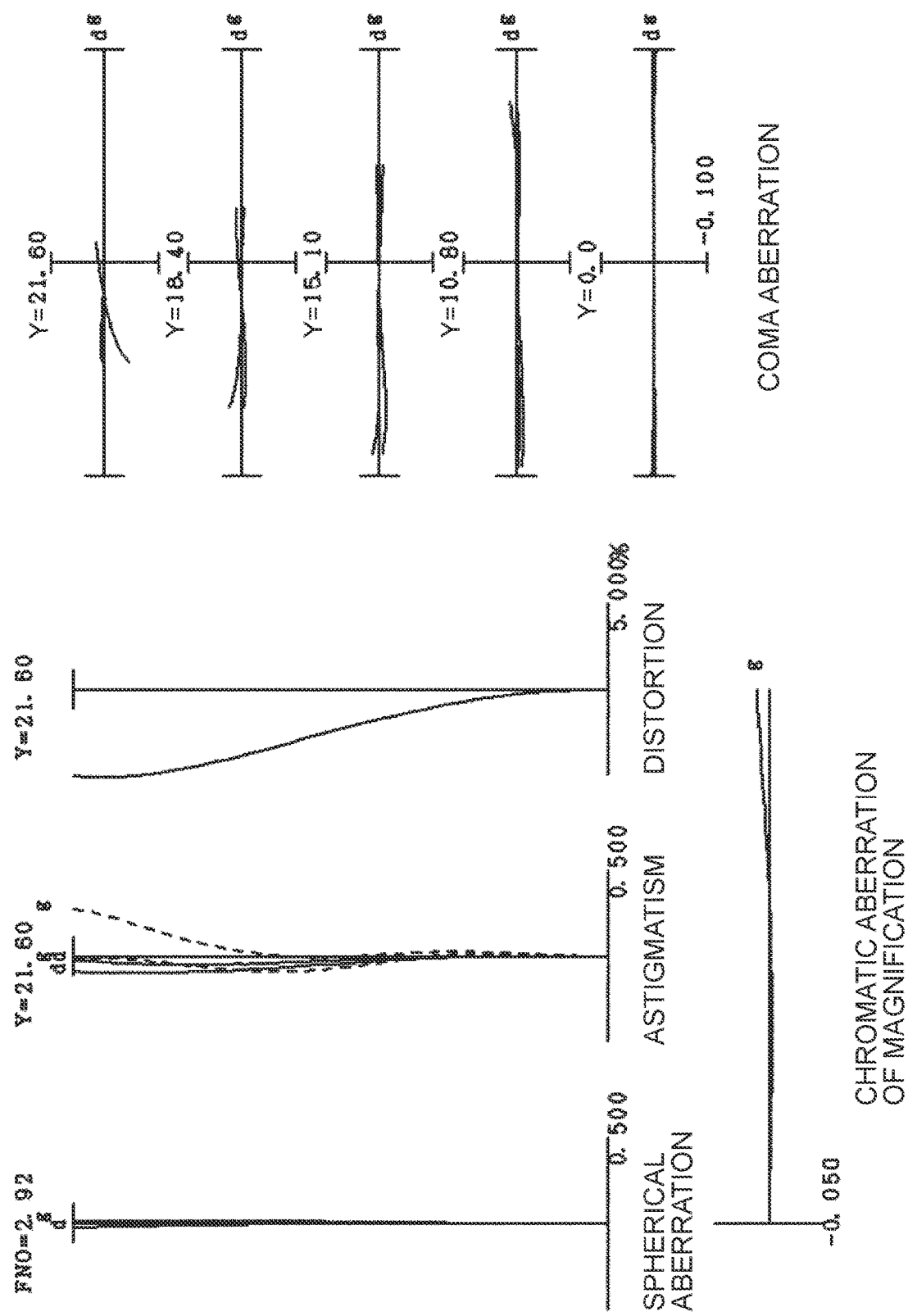

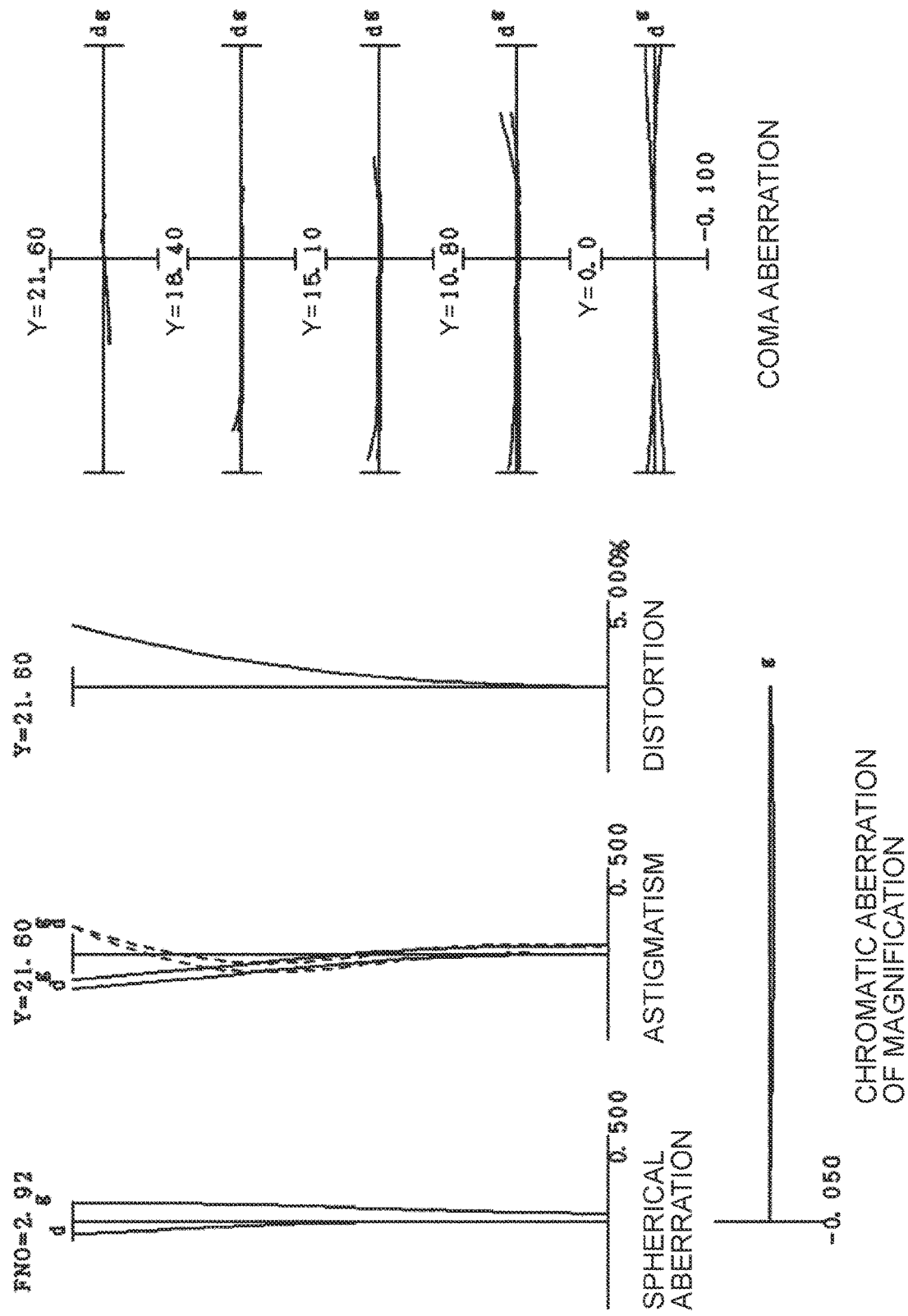

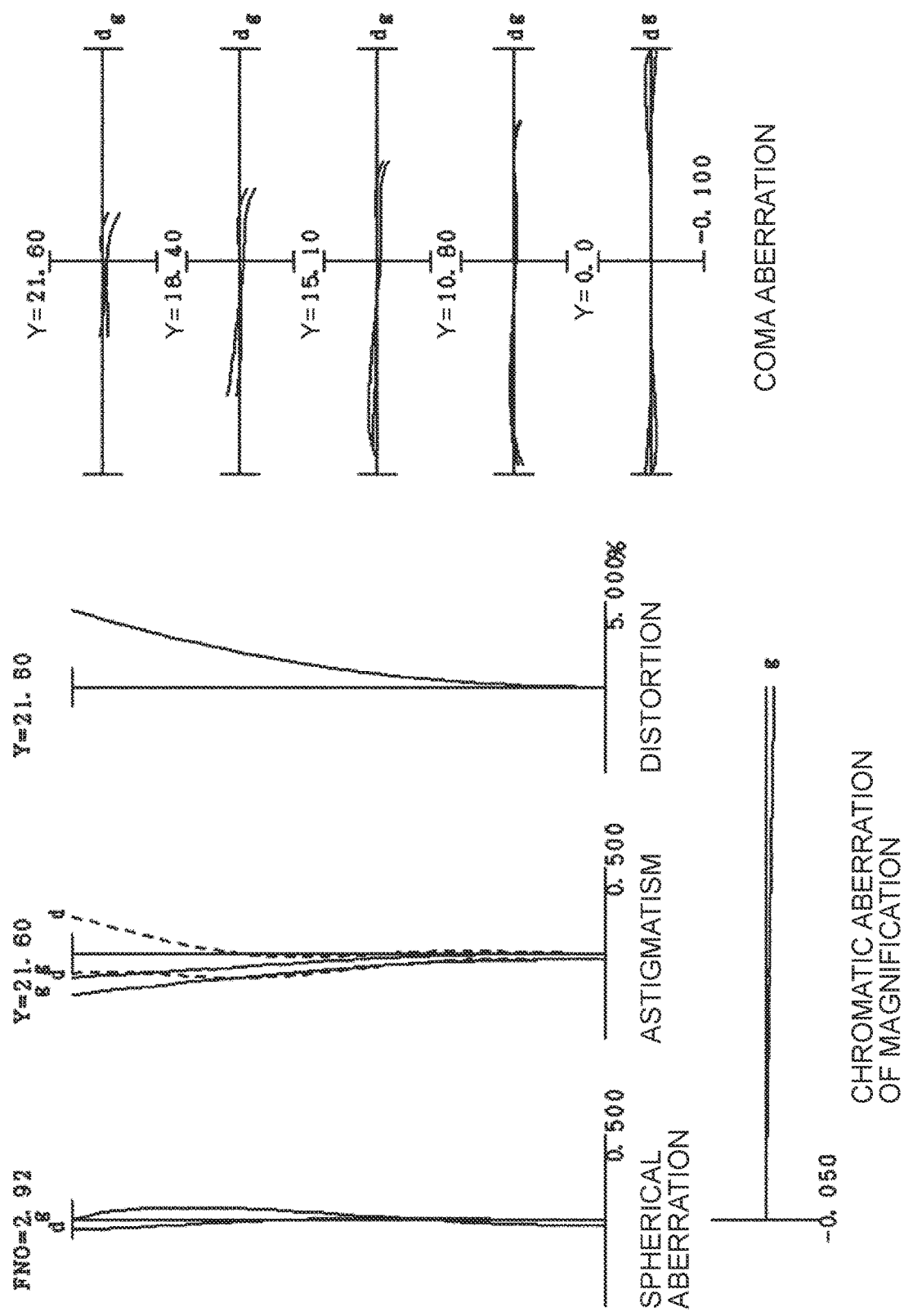

ZOOM OPTICAL SYSTEM, OPTICAL APPARATUS AND METHOD FOR MANUFACTURING THE ZOOM OPTICAL SYSTEM

TECHNICAL FIELD

The present invention relates to a zoom optical system, an optical apparatus including the same, and a method for manufacturing the zoom optical system.

TECHNICAL BACKGROUND

Conventionally, zoom optical systems suitable for photographic cameras, electronic still cameras, video cameras and the like have been proposed (for example, see Patent literature 1). The zoom optical systems are required to suppress variation in aberration upon zooming or focusing.

PRIOR ARTS LIST

Patent Document

Patent literature 1: Japanese Laid-Open Patent Publication No. 2013-160944(A)

SUMMARY OF THE INVENTION

A zoom optical system according to a first aspect is a zoom optical system comprising a plurality of lens groups, wherein upon zooming, distances between adjacent lens groups change, the zoom optical system comprises: a focusing lens group that moves upon focusing; and an image-side lens group disposed adjacent to an image side of the focusing lens group, and the zoom optical system satisfies a following conditional expression.

$$0.000 < dL0t/dL1t < 1.000$$

where dL0t: a distance on an optical axis between the focusing lens group and the image-side lens group upon focusing on an infinity object in a telephoto end state, and dL1t: a distance on the optical axis between the focusing lens group and the image-side lens group upon focusing on a short-distance object in the telephoto end state.

A zoom optical system according to a second aspect is a zoom optical system comprising a plurality of lens groups, wherein upon zooming, distances between adjacent lens groups change, the zoom optical system comprises, as focusing lens groups: a first focusing lens group that moves upon focusing; and a second focusing lens group that is disposed closer to an image than the first focusing lens group and moves upon focusing, and the zoom optical system satisfies a following conditional expression.

$$0.000 < dF0w/dF1w < 1.000$$

where dF0w: a distance on the optical axis between the first focusing lens group and the second focusing lens group upon focusing on an infinity object in a wide-angle end state, and dF1w: a distance on the optical axis between the first focusing lens group and the second focusing lens group upon focusing on a short-distance object in the wide-angle end state.

A zoom optical system according to a third aspect a zoom optical system comprising a plurality of lens groups, wherein upon zooming, distances between adjacent lens groups change, the zoom optical system comprises: a focusing lens group that moves upon focusing; and a cylindrical member to which a driving apparatus for moving the focusing lens group is fixed, upon zooming, the cylindrical member moves, the focusing lens group is relatively movable with respect to the cylindrical member by the driving apparatus, an amount of movement of a lens disposed to an object side or an image side of the focusing lens group upon zooming is different from the amount of movement of the cylindrical member upon zooming, and the zoom optical system satisfies a following conditional expression.

$$-1.000 < dA/dB < 2.000$$

where dA: an amount of movement of the focusing lens group with respect to an image surface upon zooming from a wide-angle end state to a telephoto end state (a sign of the amount of movement toward an object is assumed to be +, and a sign of the amount of movement toward an image is assumed to be −), and dB: an amount of movement of the cylindrical member with respect to the image surface upon zooming from the wide-angle end state to the telephoto end state (a sign of the amount of movement toward the object is assumed to be +, and a sign of the amount of movement toward the image is assumed to be −).

A zoom optical system according to a fourth aspect is a zoom optical system comprising a plurality of lens groups, wherein upon zooming, distances between adjacent lens groups change, the zoom optical system comprises: a focusing lens group that moves upon focusing; and a cylindrical member to which a driving apparatus for moving the focusing lens group is fixed, upon zooming, the cylindrical member moves, the focusing lens group is relatively movable with respect to the cylindrical member by the driving apparatus, no lens is fixed to the cylindrical member, and the zoom optical system satisfies a following conditional expression.

$$-1.000 < dA/dB < 2.000$$

where dA: an amount of movement of the focusing lens group with respect to an image surface upon zooming from a wide-angle end state to a telephoto end state (a sign of the amount of movement toward an object is assumed to be +, and a sign of the amount of movement toward an image is assumed to be −), and dB: an amount of movement of the cylindrical member with respect to the image surface upon zooming from the wide-angle end state to the telephoto end state (a sign of the amount of movement toward the object is assumed to be +, and a sign of the amount of movement toward the image is assumed to be −).

An optical apparatus according to a fifth aspect comprises the zoom optical system mounted thereon.

A method for manufacturing a zoom optical system according to a sixth aspect is a method for manufacturing a zoom optical system comprising a plurality of lens groups, wherein upon zooming, distances between adjacent lens groups change, the zoom optical system comprises: a focusing lens group that moves upon focusing; and an image-side lens group disposed adjacent to an image side of the focusing lens group, and the method arranges each lens in a lens barrel such that the zoom optical system satisfies a following conditional expression.

$$0.000 < dL0t/dL1t < 1.000$$

where dL0t: a distance on an optical axis between the focusing lens group and the image-side lens group upon focusing on an infinity object in a telephoto end state, and dL1t: a distance on the optical axis between the focusing lens group and the image-side lens group upon focusing on a short-distance object in the telephoto end state.

BRIEF DESCRIPTION OF THE DRAWINGS

FIG. 4 is a lens configuration diagram of a zoom optical system according to a first example;

FIGS. 6A, 6B and 6C are graphs respectively showing various aberrations of the zoom optical system according to a first example upon focusing on infinity in a wide-angle end state, an intermediate focal length state and a telephoto end state;

FIGS. 7A, 7B and 7C are graphs respectively showing various aberrations of the zoom optical system according to the first example upon focusing on a short-distance object in the wide-angle end state, the intermediate focal length state and the telephoto end state;

FIGS. 9A, 9B and 9C are graphs respectively showing various aberrations of the zoom optical system according to the second example upon focusing on infinity in the wide-angle end state, the intermediate focal length state and the telephoto end state;

FIGS. 10A, 10B and 10C are graphs respectively showing various aberrations of the zoom optical system according to the second example upon focusing on a short-distance object in the wide-angle end state, the intermediate focal length state and the telephoto end state;

FIGS. 12A, 12B and 12C are graphs respectively showing various aberrations of the zoom optical system according to the third example upon focusing on infinity in the wide-angle end state, the intermediate focal length state and the telephoto end state;

FIGS. 13A, 13B and 13C are graphs respectively showing various aberrations of the zoom optical system according to the third example upon focusing on a short-distance object in the wide-angle end state, the intermediate focal length state and the telephoto end state;

FIGS. 15A, 15B and 15C are graphs respectively showing various aberrations of the zoom optical system according to the fourth example upon focusing on infinity in the wide-angle end state, the intermediate focal length state and the telephoto end state;

FIGS. 16A, 16B and 16C are graphs respectively showing various aberrations of the zoom optical system according to the fourth example upon focusing on a short-distance object in the wide-angle end state, the intermediate focal length state and the telephoto end state;

FIG. 17 is a lens configuration diagram of a zoom optical system according to a fifth example;

FIGS. 18A, 18B and 18C are graphs respectively showing various aberrations of the zoom optical system according to the fifth example upon focusing on infinity in the wide-angle end state, the intermediate focal length state and the telephoto end state;

FIGS. 19A, 19B and 19C are graphs respectively showing various aberrations of the zoom optical system according to the fifth example upon focusing on a short-distance object in the wide-angle end state, the intermediate focal length state and the telephoto end state;

FIGS. 21A, 21B and 21C are graphs respectively showing various aberrations of the zoom optical system according to the sixth example upon focusing on infinity in the wide-angle end state, the intermediate focal length state and the telephoto end state;

FIGS. 22A, 22B and 22C are graphs respectively showing various aberrations of the zoom optical system according to the sixth example upon focusing on a short-distance object in the wide-angle end state, the intermediate focal length state and the telephoto end state;

FIGS. 24A, 24B and 24C are graphs respectively showing various aberrations of the zoom optical system according to the seventh example upon focusing on infinity in the wide-angle end state, the intermediate focal length state and the telephoto end state;

DESCRIPTION OF THE EMBODIMENTS

Figure 1:
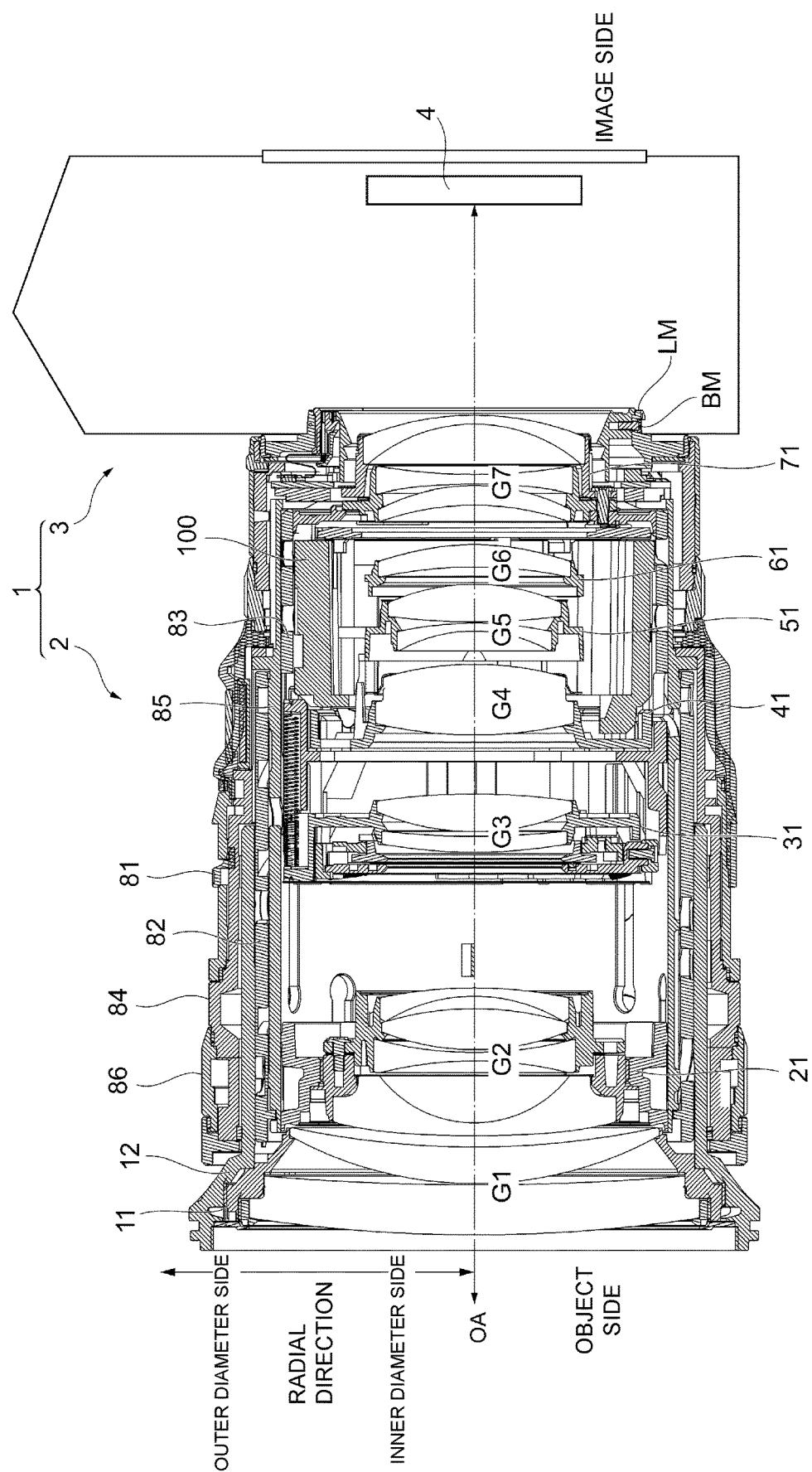
FIG. 1 shows a configuration of a camera that comprises a zoom optical system according to each embodiment.

Hereinafter, zoom optical systems according to first to fourth embodiments, and optical apparatuses comprising these systems are described with reference to the drawings. First, a camera (optical apparatus) that comprises any of the zoom optical systems according to the first to fourth embodiments is described with reference to FIG. 1. As shown in FIG. 1, the camera 1 is a camera that comprises the zoom optical system according to any of the first to fourth embodiments as a lens barrel 2.

The camera 1 comprises the lens barrel 2, and a camera body 3. The lens barrel 2 is provided with a lens mount LM at a proximal end (rear) on the image side. The lens mount LM is engaged with a body mount BM of the camera body 3, thereby allowing this barrel to be detachably mounted on the camera body 3. Note that in the description of the camera 1, a photographic subject side of the lens barrel 2 in the optical axis OA direction is called an object side, and a camera body 3 side is called an image side. In the radial direction orthogonal to the optical axis OA of the lens barrel 2, a side apart from the optical axis OA is called an outer diameter side, and a side approaching the optical axis OA is called an inner diameter side. The camera body 3 comprises an image pickup element 4 that electrically converts a light image, image-processes image pickup data through the image pickup element 4, and records the processed data in a recording unit (not shown).

The lens barrel 2 is what is called a zoom lens (zoom optical system) that comprises a plurality of lens groups and can change the focal length. In an example shown in FIG. 1, the plurality of lens groups include, in order from the object: a first lens group G1; a second lens group G2; a third lens group G3; a fourth lens group G4; a fifth lens group G5; a sixth lens group G6; and a seventh lens group G7. At least one or some of the first lens group G1, the second lens group G2, the third lens group G3, the fourth lens group G4, the fifth lens group G5, the sixth lens group G6 and the seventh lens group G7 move upon zooming. The fifth lens group G5 and the sixth lens group G6 are focusing lens groups that move upon focusing.

The first lens group G1 is held by a first group frame 11. The outer periphery of the first group frame 11 is held by a first group slide cylinder 12. The second lens group G2 is held by a second group frame 21. The third lens group G3 is held by a third group frame 31. The fourth lens group G4 is held by a fourth group frame 41. The fifth lens group G5 is held by a fifth group frame 51. The sixth lens group G6 is held by a sixth group frame 61. The seventh lens group G7 is held by a seventh group frame 71.

The lens barrel 2 comprises a first operation ring 81, an outer cam cylinder 82, an inner cam cylinder 83, an outer fixation cylinder 84, an inner fixation cylinder 85, and a second operation ring 86. The outer periphery of the outer fixation cylinder 84 is provided with the first operation ring 81 and the second operation ring 86 rotatably with respect to the outer fixation cylinder 84. The first group slide cylinder 12, and the outer cam cylinder 82 are disposed in order from the outer periphery, between the outer fixation cylinder 84 and the inner fixation cylinder 85. The second group frame 21, the third group frame 31, the fourth group frame 41, the cylindrical member 100 and the seventh group frame 71 are disposed in order from the front side, in the inner diameter side of the inner fixation cylinder 85. The fifth group frame 51 and the sixth group frame 61 are disposed in order from the front side, in the inner diameter side of the cylindrical member 100. The inner cam cylinder 83 is disposed between the fourth group frame 41, the cylindrical member 100 and the seventh group frame 71, and the inner fixation cylinder 85.

A plurality of cam grooves are formed in the outer cam cylinder 82 and the inner cam cylinder 83; cam followers of the corresponding lens group frames and cylindrical member are engaged therewith. A plurality of linear grooves are formed in the inner fixation cylinder 85 and the outer fixation cylinder 84 along the optical axis OA direction; cam followers of the corresponding lens group frames and the cylindrical member are engaged therewith. Note that a drive mechanism that drives each lens group frame in the optical axis OA direction can be appropriately changed.

The first operation ring 81 is what is called a zoom ring, and can be rotatably operated by a user. The lens barrel 2 comprises a first detector (not shown) that detects the amount of rotation of the first operation ring 81. Upon detection of the rotation of the first operation ring 81, the first detector outputs the amount of rotation and the rotation rate to a controller (not shown) in the lens barrel 2. According to the amount of rotation of the first operation ring 81, the controller drives and controls motors (a five group drive motor STM5 and a six group drive motor STM6 described later or the like) for changing the focal length.

The second operation ring 86 can be rotatably operated by the user. A function operated by a rotational operation can be set by the lens barrel 2 or the camera body 3. The user can change the optical characteristics, such as the focus position, the focal length or the aperture value by rotatably operating the second operation ring 86, for example. A second detector (not shown) that detects the amount of rotation of the second operation ring 86 is provided on the inner diameter side of the second operation ring 86. When the second operation ring 86 is rotatably operated by the user, the second detector detects the amount of rotation and the rotation rate of the second operation ring 86, and outputs the amount and rate to the controller (not shown) in the lens barrel 2. According to the amount of rotation of the second operation ring 86, the controller drives and controls the motors (the five group drive motor STM5 and the six group drive motor STM6 described later or the like) for changing the optical characteristics. The controller exchanges information with the camera body 3 according to the rotation of the first operation ring 81 or the second operation ring 86, thus transmitting the state (the optical characteristics and the operation state by the user) of the lens barrel 2 to the camera body 3.

Figure 2:
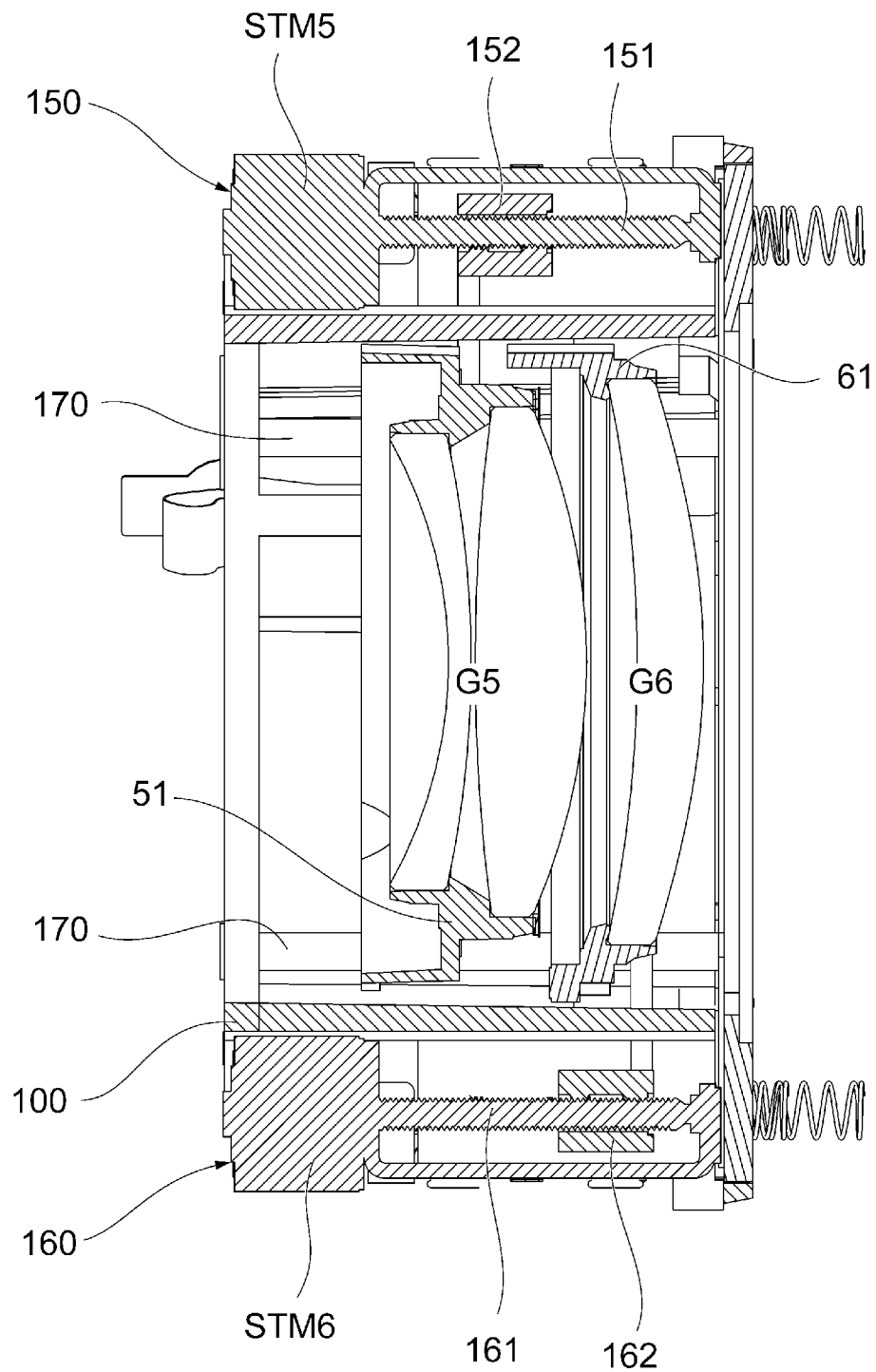
FIG. 2 shows components of the camera.

As shown in FIG. 2, the cylindrical member 100 is provided with a part of a five group drive unit 150 comprising the five group drive motor STM5, a part of a six group drive unit 160 comprising the six group drive motor STM6, and a pair of guide shafts 170. The five group drive unit 150 drives the fifth group frame 51 in the optical axis OA direction. The five group drive unit 150 comprises not only the five group drive motor STM5 described above, but also a five group lead screw 151, and a five group rack 152. The five group drive motor STM5 is, for example, a stepping motor, and is fixed to the cylindrical member 100. The five group lead screw 151 is formed into a shaft shape that includes a screw portion and extends in the optical axis OA direction, and is coupled with an output shaft of the five group drive motor STM5 and rotated. The five group rack 152 is screwed with the screw portion of the five group lead screw 151, and is coupled with the fifth group frame 51.

The six group drive unit 160 drives the sixth group frame 61 in the optical axis OA direction. The six group drive unit 160 comprises not only the six group drive motor STM6 described above, but also a six group lead screw 161, and a six group rack 162. The six group drive motor STM6 is, for example, a stepping motor, and is fixed to the cylindrical member 100. The six group lead screw 161 is formed into a shaft shape that includes a screw portion and extends in the optical axis OA direction, and is coupled with an output shaft of the six group drive motor STM6. The six group rack 162 is screwed with the screw portion of the six group lead screw 161, and is coupled with the sixth group frame 61. The five group drive motor STM5 and the six group drive motor STM6 are disposed at positions displaced from each other by approximately 180° about the optical axis OA at the cylindrical member 100.

Figure 3:
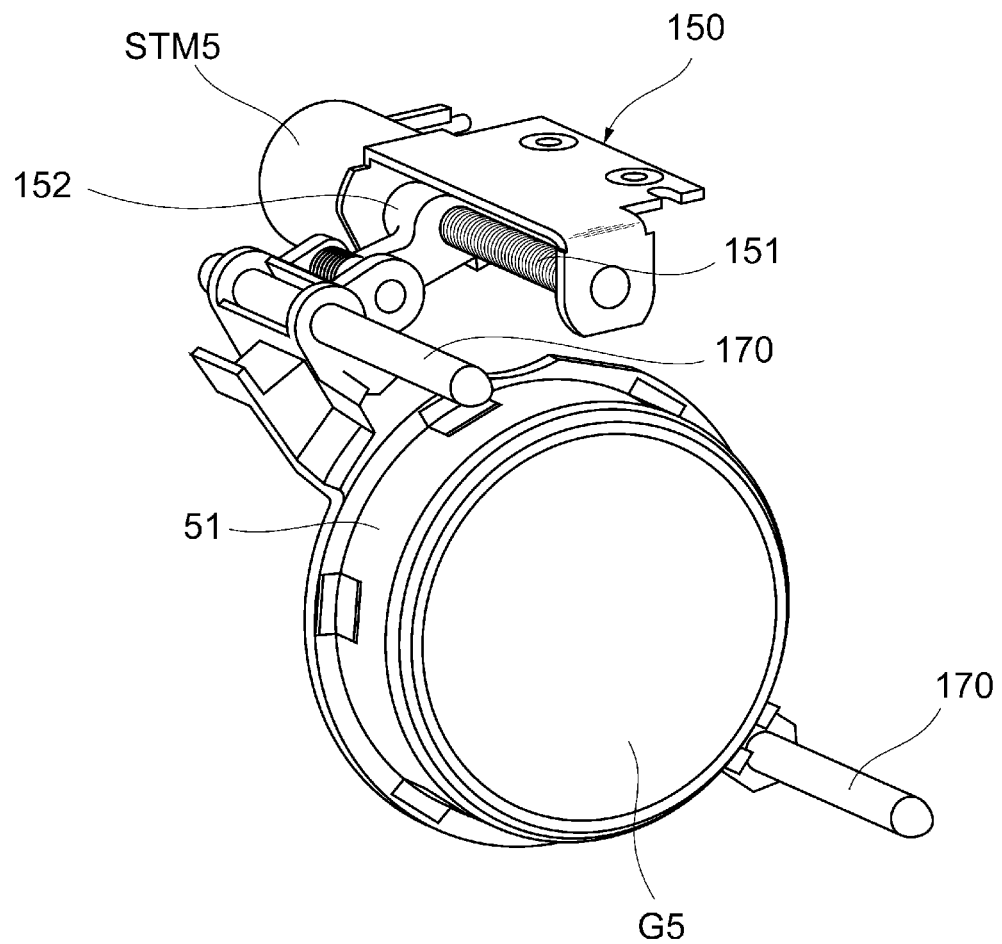
FIG. 3 is a perspective view showing some of the components of the camera.

As shown in FIGS. 2 and 3, the guide shafts 170 are formed as shaft shapes extending in the optical axis OA direction, and are fixed to the cylindrical member 100. The guide shafts 170 are respectively engaged into engagement holes formed in the fifth group frame 51, and linearly guide the fifth group frame 51 in the optical axis OA direction. The guide shafts 170 are respectively engaged into engagement holes formed in the sixth group frame 61, and linearly guide the sixth group frame 61 in the optical axis OA direction. Accordingly, the fifth lens group G5 held by the fifth group frame 51, and the sixth lens group G6 held by the sixth group frame 61 are linearly guided in the optical axis OA direction by the guide shafts 170.

When the five group drive motor STM5 rotates the five group lead screw 151, the drive force in the optical axis OA direction is transmitted to the fifth group frame 51 through the five group rack 152 screwed with the screw portion of the five group lead screw 151. At this time, the fifth lens group G5 held by the fifth group frame 51 is linearly guided in the optical axis OA direction by the guide shafts 170 about the five group lead screw 151 as the central axis so as not to be rotated. The fifth lens group G5 is relatively movable by the five group drive unit 150 in the optical axis OA direction with respect to the cylindrical member 100. Accordingly, upon zooming, the amount of relative movement in the optical axis OA direction with respect to the image pickup element 4 (image surface) can be different between the fifth lens group G5 and the cylindrical member 100.

When the six group drive motor STM6 rotates the six group lead screw 161, the drive force in the optical axis OA direction is transmitted to the sixth group frame 61 through the six group rack 162 screwed with the screw portion of the six group lead screw 161. At this time, the sixth lens group G6 held by the sixth group frame 61 is linearly guided in the optical axis OA direction by the guide shafts 170 about the six group lead screw 161 as the central axis so as not to be rotated. The sixth lens group G6 is relatively movable by the six group drive unit 160 in the optical axis OA direction with respect to the cylindrical member 100. Accordingly, upon zooming, the amount of relative movement in the optical axis OA direction with respect to the image pickup element 4 (image surface) can be different between the sixth lens group G6 and the cylindrical member 100. The fifth lens group G5 and the sixth lens group G6 can be separately driven by the five group drive unit 150 and the six group drive unit 160, respectively. Accordingly, upon zooming or focusing, the amount of relative movement in the optical axis OA direction with respect to the image pickup element 4 (image surface) can be different between the fifth lens group G5 and the sixth lens group G6.

Note that the five group drive motor STM5 and the six group drive motor STM6 are stepping motors, for example, but are not limited thereto, and may be DC motors, voice coil motors, ultrasonic motors or the like. The five group drive motor STM5 and the six group drive motor STM6 may be the same type of motors or different types of motors. The five group drive motor STM5 and the six group drive motor STM6 are disposed on the object side of the cylindrical member 100. However, the disposition of the five group drive motor STM5 and the six group drive motor STM6 can be appropriately changed. For example, the five group drive motor STM5 may be disposed on the object side (or the image side) of the cylindrical member 100, and the six group drive motor STM6 may be disposed on the image side (or the object side) of the cylindrical member 100. Alternatively, one of the five group drive motor STM5 and the six group drive motor STM6 may be disposed in the cylindrical member 100, and the other of the five group drive motor STM5 and the six group drive motor STM6 may be disposed in another member different from the cylindrical member 100. In this embodiment, the two lens groups (G5 and G6) that move upon focusing are disposed in the single cylindrical member 100, thereby allowing the lens barrel 2 to be reduced in size.

The guide shafts 170 are fixed to the cylindrical member 100. However, there is no limitation thereto. These shafts may be fixed to another cylindrical member movable separately from the cylindrical member 100. For example, the guide shafts 170 may be fixed to the fourth group frame 41 at least a part of which is disposed on the object side or the image side of the cylindrical member 100. The fifth lens group G5 held by the fifth group frame 51 and the sixth lens group G6 held by the sixth group frame 61 are linearly guided in the optical axis OA direction by the guide shafts 170. However, there is no limitation thereto. For example, these groups may be linearly guided in the optical axis OA direction using a cam follower and a linear groove. The fifth lens group G5 and the sixth lens group G6 are linearly guided by the pair of guide shafts 170. Alternatively, a pair of guide shafts that linearly guide the fifth lens group G5, and a pair of guide shafts that linearly guide the sixth lens group G6 may be provided.

Upon focusing, the fifth lens group G5 and the sixth lens group G6 independently move in the optical axis OA direction. Alternatively, the fifth lens group G5 and the sixth lens group G6 may integrally move in the optical axis OA direction. The fifth lens group G5 and the sixth lens group G6 may integrally move in the optical axis OA direction in a part of the process of focusing from the infinity object to the short-distance object. In the case where the fifth lens group G5 and the sixth lens group G6 integrally move in the optical axis OA direction, the number of drive units provided in the cylindrical member 100 may be one.

The first group frame 11 (first group slide cylinder 12), the second group frame 21, the third group frame 31, the fourth group frame 41, the cylindrical member 100, and the seventh group frame 71 are driven in the optical axis OA direction by rotation of the outer cam cylinder 82 and the inner cam cylinder 83 that are rotated by rotation of the first operation ring 81, upon zooming. Upon zooming and focusing, the fifth group frame 51 is driven in the optical axis OA direction with respect to the cylindrical member 100 by the five group drive unit 150 provided in the cylindrical member 100, according to rotation of the first operation ring 81 or the second operation ring 86. Likewise, the sixth group frame 61 is driven in the optical axis OA direction with respect to the cylindrical member 100 by the six group drive unit 160 provided in the cylindrical member 100, according to rotation of the first operation ring 81 or the second operation ring 86. That is, the first lens group G1, the second lens group G2, the third lens group G3, the fourth lens group G4, the cylindrical member 100 and the seventh lens group G7 are mechanically driven in the optical axis OA direction when the first operation ring 81 is rotated. The fifth lens group G5 and the sixth lens group G6 are driven in the optical axis OA direction mechanically and electrically (motor drive control) when the first operation ring 81 is rotated, and are driven in the optical axis OA direction electrically when the second operation ring 86 is rotated to designate a focusing operation.

Thus, the first lens group G1, the second lens group G2, the third lens group G3, the fourth lens group G4, the fifth lens group G5, the sixth lens group G6 and the seventh lens group G7 are driven in the optical axis OA direction upon zooming. The fifth lens group G5 and the sixth lens group G6 are driven in the optical axis OA direction upon focusing. In this embodiment, the zoom lens groups are driven in the optical axis OA direction by a cam function. Alternatively, a driving apparatus (motor) for driving the zoom lens groups in the optical axis OA direction may be provided.

In such a camera 1, light from an object (photographic subject), not shown, is collected by the lens barrel 2, and reaches the image pickup element 4 of the camera body 3. Accordingly, the light from the photographic subject is imaged by the image pickup element 4, and the image pickup data by the image pickup element 4 is image-processed and is recorded in the recording unit (not shown). A photographer can thus take an image of the photographic subject through the camera 1. Note that the camera 1 is not necessarily the digital single-lens reflex camera, and may be a mirrorless camera or a compact digital camera.

Next, a first embodiment of the zoom optical system (zoom lens) is described. The zoom optical system ZL(1) as an example of the zoom optical system ZL according to the first embodiment includes a plurality of lens groups as shown in FIG. 4, and upon zooming, distances between adjacent lens groups change. The zoom optical system ZL(1) comprises: a focusing lens group that moves upon focusing; and an image-side lens group disposed adjacent to an image side of the focusing lens group.

Figure 8:
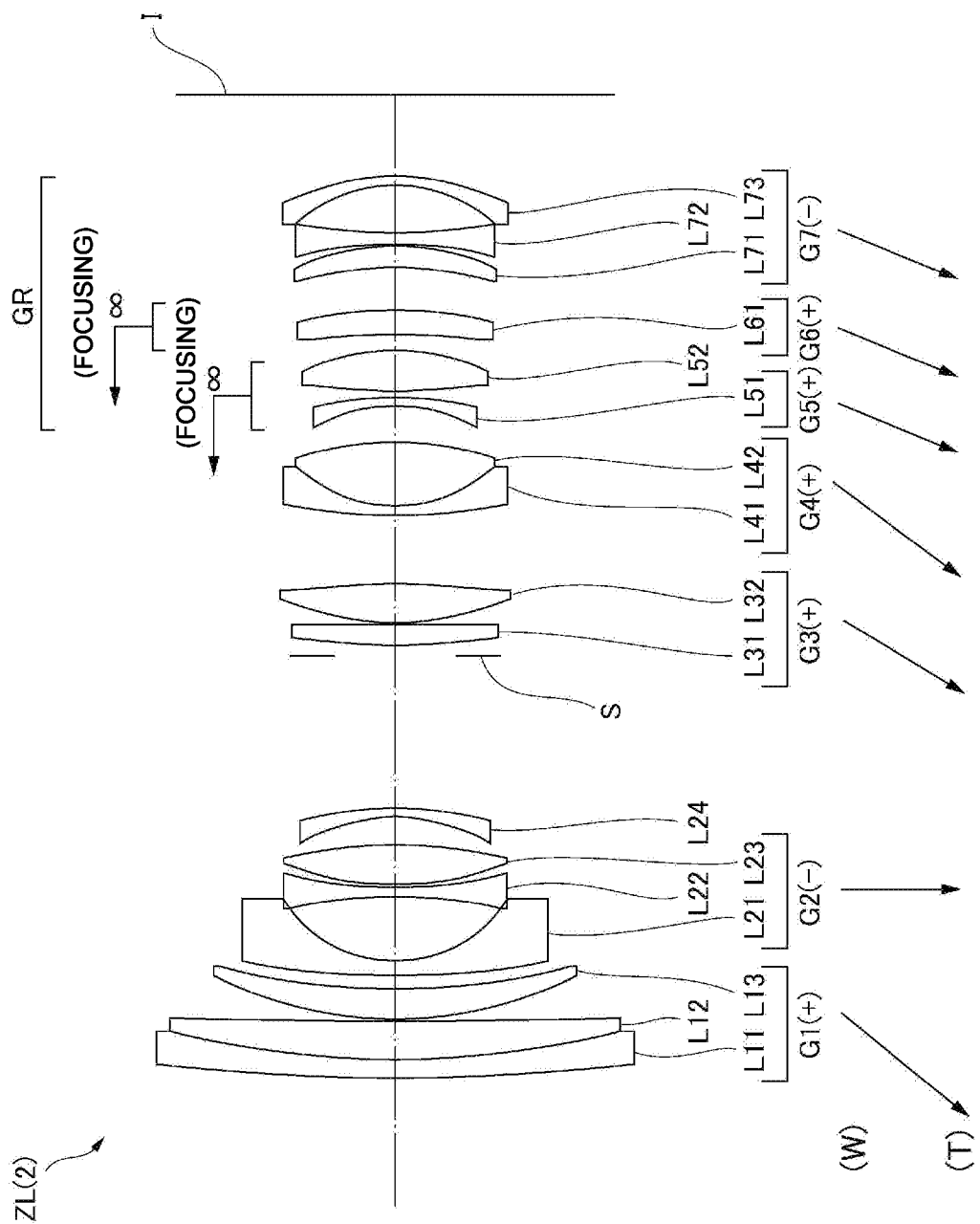
FIG. 8 is a lens configuration diagram of a zoom optical system according to a second example.
Figure 11:
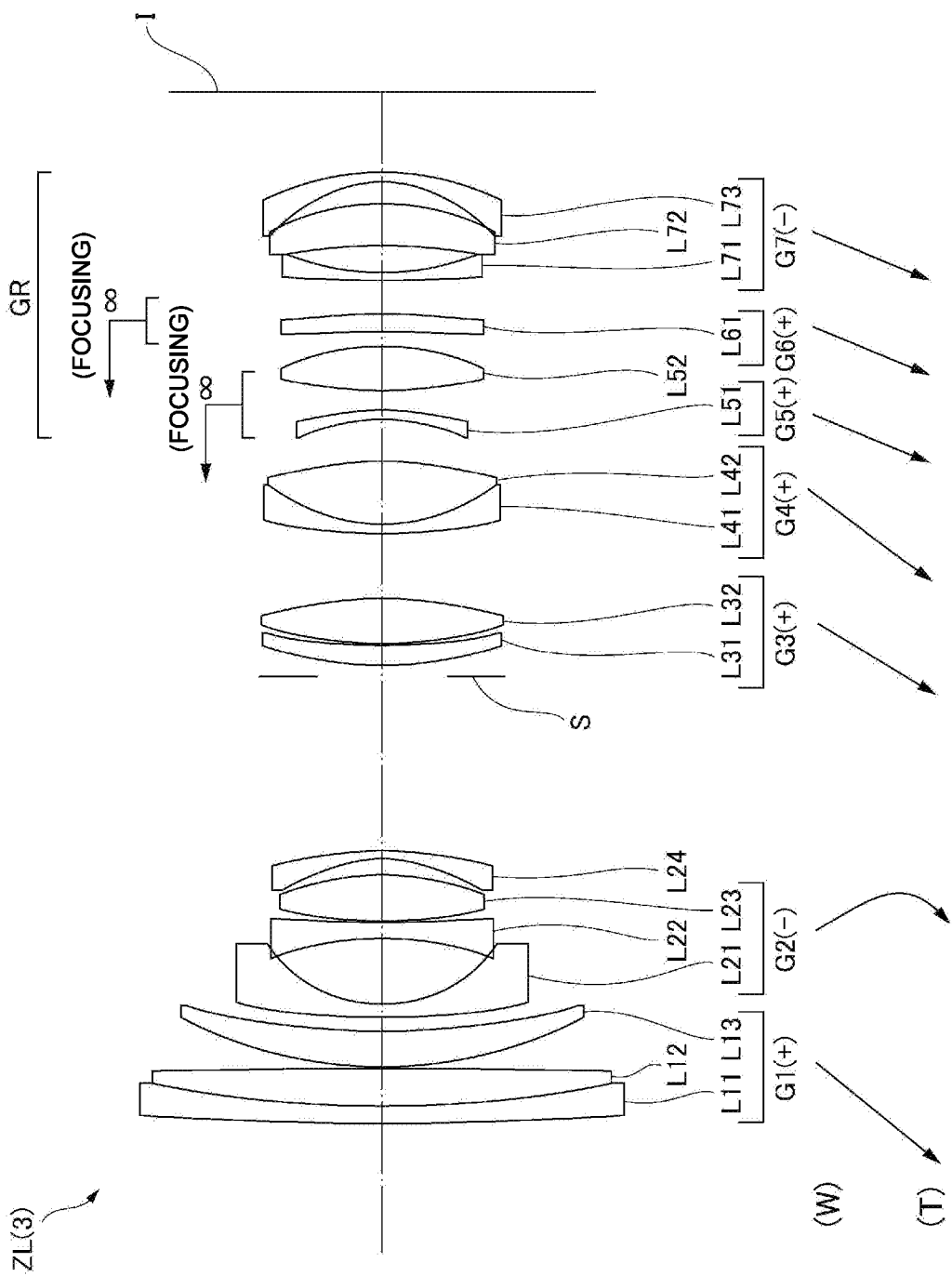
FIG. 11 is a lens configuration diagram of a zoom optical system according to a third example.
Figure 14:
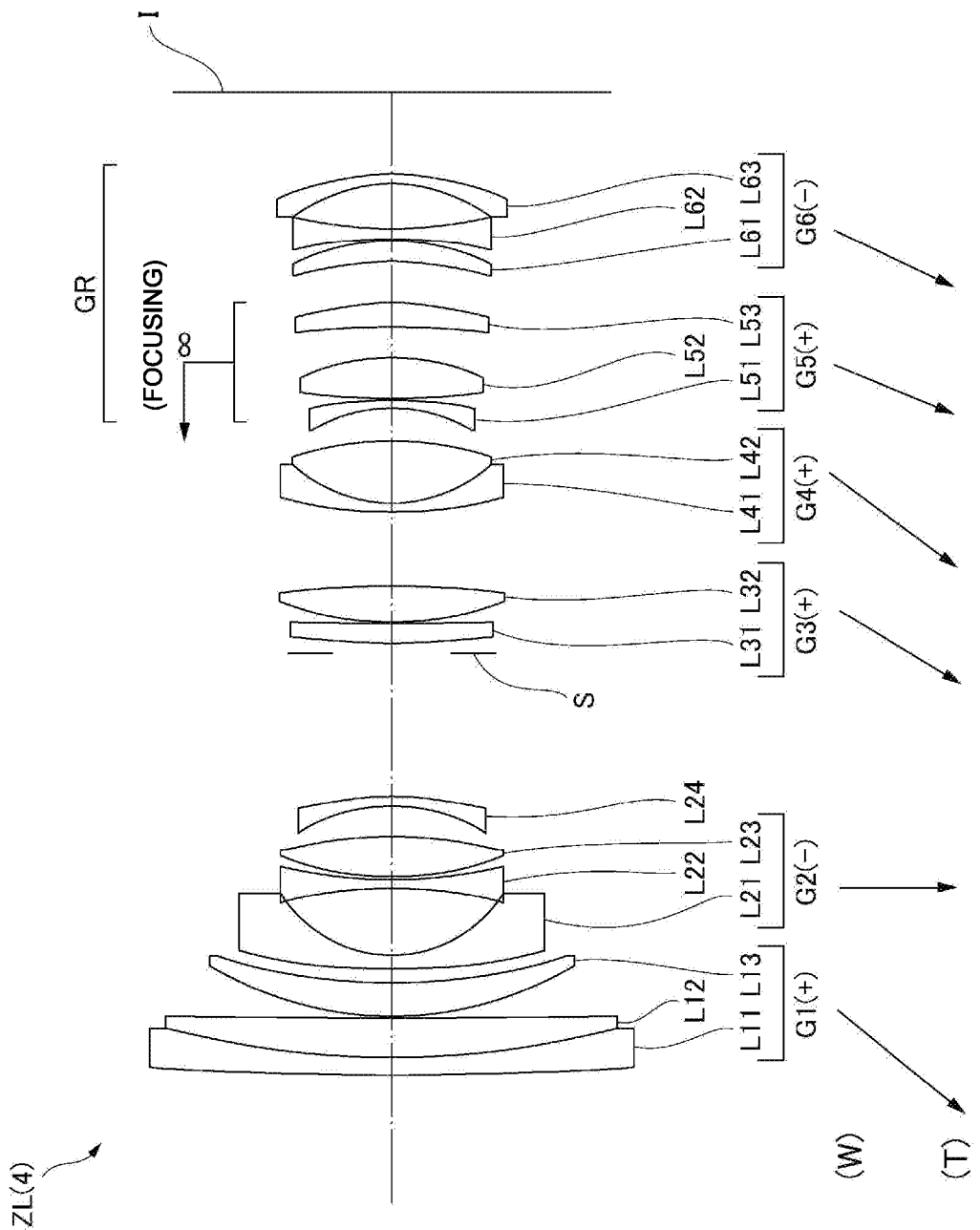
FIG. 14 is a lens configuration diagram of a zoom optical system according to a fourth example.
Figure 23:
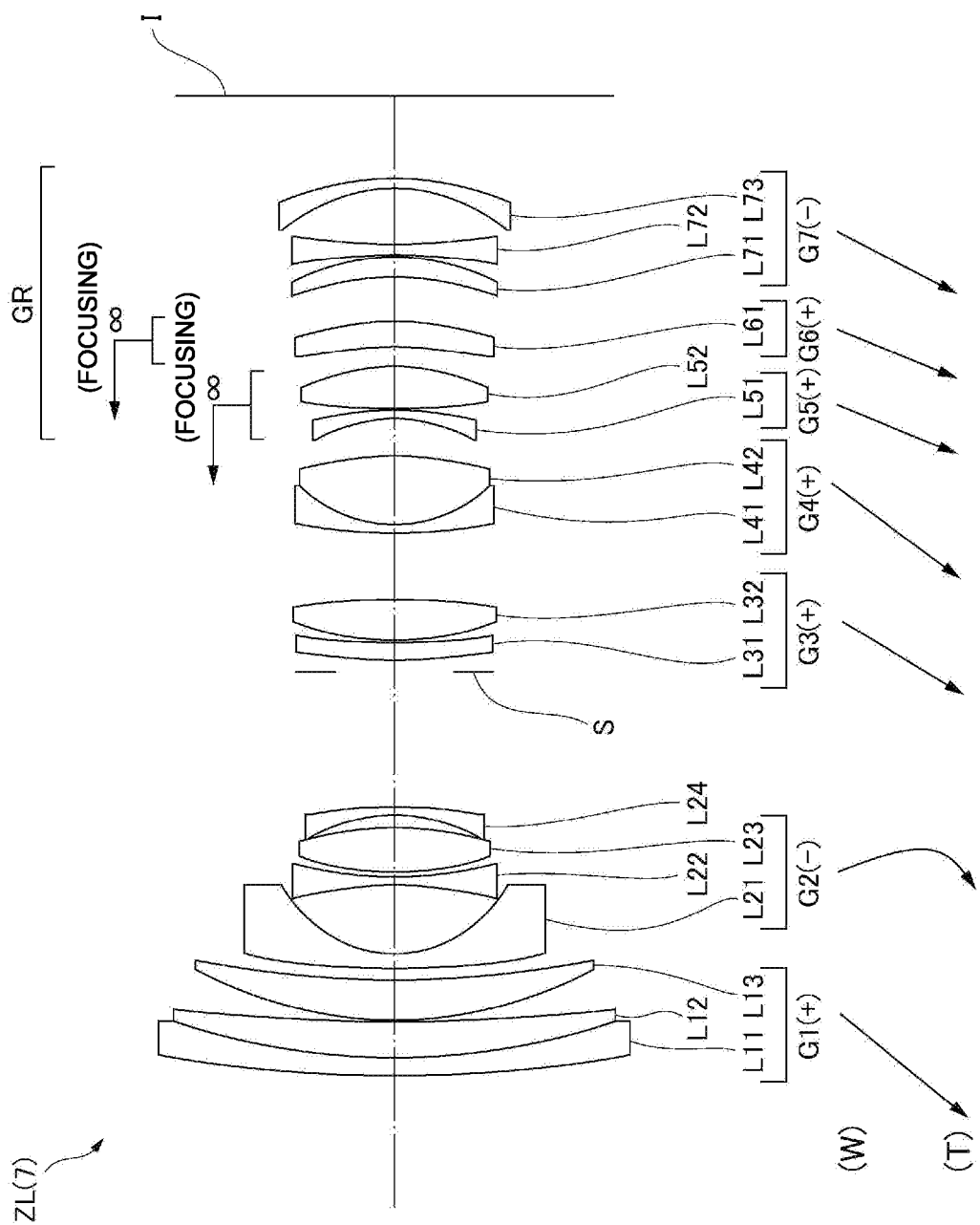
FIG. 23 is a lens configuration diagram of a zoom optical system according to a seventh example.

The zoom optical system ZL according to the first embodiment may be a zoom optical system ZL(2) shown in FIG. 8, a zoom optical system ZL(3) shown in FIG. 11, a zoom optical system ZL(4) shown in FIG. 14, or a zoom optical system ZL(7) shown in FIG. 23.

In the configuration described above, the zoom optical system ZL according to the first embodiment satisfies a following conditional expression (1).

$$0.000 < dL0t/dL1t < 1.000 \tag{1}$$

where dL0t: a distance on an optical axis between the focusing lens group and the image-side lens group upon focusing on an infinity object in a telephoto end state, and dL1t: a distance on the optical axis between the focusing lens group and the image-side lens group upon focusing on a short-distance object in the telephoto end state.

The conditional expression (1) defines the ratio between the distance on the optical axis between the focusing lens group and the image-side lens group upon focusing on an infinity object in the telephoto end state, and the distance on the optical axis between the focusing lens group and the image-side lens group upon focusing on a short-distance object (shortest-distant object). By satisfying the conditional expression (1), various aberrations including the spherical aberration and the coma aberration can be favorably corrected in both the case of focusing on an infinity object and the case of focusing on a short-distance object, in the telephoto end state.

If the corresponding value of the conditional expression (1) becomes out of the range, the distance between the focusing lens group and the image-side lens group becomes inappropriate. Accordingly, it is difficult to suppress the variation in aberration. By setting the upper limit value of the conditional expression (1) to 0.950, the advantageous effects of this embodiment can be more secured. To further secure the advantageous effects of this embodiment, the upper limit value of the conditional expression (1) may be set to 0.900, 0.850, 0.800, 0.780, 0.750, 0.740, 0.730, 0.720, 0.710, 0.700, 0.695, and further to 0.690.

By setting the lower limit value of the conditional expression (1) to 0.100, the advantageous effects of this embodiment can be more secured. To further secure the advantageous effects of this embodiment, the lower limit value of the conditional expression (1) may be set to 0.150, 0.200, 0.250, 0.300, 0.350, 0.400, 0.450, 0.500, 0.550, 0.600, 0.610, 0.620, 0.630, 0.640, 0.650, 0.660, and further to 0.665.

Preferably, in the zoom optical system ZL according to the first embodiment, the plurality of lens groups include, in order from an object: a first lens group G1 having a positive refractive power; a second lens group G2 having a negative refractive power; a third lens group G3 having a positive refractive power; a fourth lens group G4 having a positive refractive power; and a succeeding lens group GR, and the succeeding lens group GR includes: the focusing lens group; and the image-side lens group.

Accordingly, the zoom optical system ZL according to the first embodiment includes at least five lens groups. The distances between lens groups change upon zooming. Accordingly, the variation in various aberrations upon zooming from the wide-angle end state to the telephoto end state can be suppressed. By disposing the focusing lens groups in the succeeding lens group GR, the focusing lens groups can be reduced in size and weight, and high-speed and highly silent autofocus can be achieved without increasing the size of the lens barrel.

Next, a second embodiment of the zoom optical system is described. The zoom optical system according to the second embodiment has a configuration similar to that of the zoom optical system ZL according to the first embodiment. Accordingly, the same symbols as those in the first embodiment are assigned and description is made. The zoom optical system ZL(1) as an example of the zoom optical system ZL according to the second embodiment includes a plurality of lens groups as shown in FIG. 1, and upon zooming, distances between adjacent lens groups change. The zoom optical system ZL(1) comprises, as the focusing lens group: a first focusing lens group that moves upon focusing; and a second focusing lens group that is disposed closer to an image than the first focusing lens group and moves upon focusing.

The zoom optical system ZL according to the second embodiment may be a zoom optical system ZL(2) shown in FIG. 8, a zoom optical system ZL(3) shown in FIG. 11, or a zoom optical system ZL(7) shown in FIG. 23.

In the configuration described above, the zoom optical system ZL according to the second embodiment satisfies a following conditional expression (2).

$$0.000 < dF0w/dF1w < 1.000 \tag{2}$$

where dF0w: a distance on the optical axis between the first focusing lens group and the second focusing lens group upon focusing on an infinity object in a wide-angle end state, and dF1w: a distance on the optical axis between the first focusing lens group and the second focusing lens group upon focusing on a short-distance object in the wide-angle end state.

The conditional expression (2) defines the ratio between the distance on the optical axis between the first focusing lens group and the second focusing lens group upon focusing on an infinity object in the wide-angle end state, and the distance on the optical axis between the first focusing lens group and the second focusing lens group upon focusing on a short-distance object (shortest-distant object). By satisfying the conditional expression (2), various aberrations including the spherical aberration and the coma aberration can be favorably corrected in each of the case of focusing on an infinity object, and the case of focusing on a short-distance object, in the wide-angle end state.

If the corresponding value of the conditional expression (2) becomes out of the range, the distance between the focusing lens group and the image-side lens group becomes inappropriate. Accordingly, it is difficult to suppress the variation in aberration. By setting the upper limit value of the conditional expression (2) to 0.980, the advantageous effects of this embodiment can be more secured. To further secure the advantageous effects of this embodiment, the upper limit value of the conditional expression (2) may be set to 0.950, 0.940, 0.930, 0.920, 0.910, 0.900, 0.895, 0.890, 0.885, 0.880, 0.875, and further to 0.870.

By setting the lower limit value of the conditional expression (2) to 0.100, the advantageous effects of this embodiment can be more secured. To further secure the advantageous effects of this embodiment, the lower limit value of the conditional expression (2) may be set to 0.200, 0.300, 0.400, 0.500, 0.550, 0.600, 0.650, 0.700, 0.750, 0.780, 0.800, 0.810, 0.815, and further to 0.820.

Preferably, in the zoom optical system ZL according to the second embodiment, the plurality of lens groups include, in order from an object: a first lens group G1 having a positive refractive power; a second lens group G2 having a negative refractive power; a third lens group G3 having a positive refractive power; a fourth lens group G4 having a positive refractive power; and a succeeding lens group GR, and the succeeding lens group GR includes: the first focusing lens group; and the second focusing lens group.

Accordingly, the zoom optical system ZL according to the second embodiment includes at least five lens groups. The distances between lens groups change upon zooming. Accordingly, the variation in various aberrations upon zooming from the wide-angle end state to the telephoto end state can be suppressed. By disposing the focusing lens groups in the succeeding lens group GR, the focusing lens groups can be reduced in size and weight, and high-speed and highly silent autofocus can be achieved without increasing the size of the lens barrel.

Next, a third embodiment of the zoom optical system is described. The zoom optical system according to the third embodiment has a configuration similar to that of the zoom optical system ZL according to the first embodiment. Accordingly, the same symbols as those in the first embodiment are assigned and description is made. The zoom optical system ZL(1) as an example of the zoom optical system ZL according to the third embodiment includes a plurality of lens groups as shown in FIG. 1, and upon zooming, distances between adjacent lens groups change. The zoom optical system ZL(1) comprises: a focusing lens group that moves upon focusing; and a cylindrical member (for example, the cylindrical member 100 shown in FIGS. 1 and 2) to which a driving apparatus for moving the focusing lens group is fixed, and upon zooming, the cylindrical member moves. The focusing lens group is relatively movable with respect to the cylindrical member by the driving apparatus. Upon zooming from the wide-angle end state to the telephoto end state, the direction in which the focusing lens groups move relatively with respect to the cylindrical member is opposite to the movement direction of the cylindrical member. The amount of movement of the lenses disposed on the object side or the image side in the focusing lens groups upon zooming is different from the amount of movement of the cylindrical member upon zooming. Accordingly, upon zooming, the cylindrical member can be moved irrespective of the movement trajectories of the focusing lens groups, and the design flexibility of the movement trajectory of the cylindrical member is improved. Consequently, the cylindrical member and the lenses before and after the member can be moved along the movement trajectories avoiding any collision to improve the optical performances, and the distances between the cylindrical member and the lenses before and after the cylindrical member are reduced in a non-photographing condition (for example, a reduced barrel state) to achieve both the optical performances and reduction in total length.

Here, upon zooming from the wide-angle end state to the telephoto end state, the movement direction of the cylindrical member toward the image surface is assumed as a first direction, and a relative movement direction of the focusing lens group toward the cylindrical member is assumed to be a second direction. In this embodiment, in at least a part of the process of zooming from the wide-angle end state to the telephoto end state, the first direction and the second direction are opposite to each other. The first direction and the second direction may be opposite to each other upon zooming in the entire focal length region from the wide-angle end state to the telephoto end state. The focusing lens group may be relatively immovable with respect to the cylindrical member upon zooming in a part of the focal length region. In this embodiment, preferably, the number of focal length regions where the first direction and the second direction are opposite to each other is larger than the number of focal length regions where the first direction and the second direction are the same direction or the focusing lens group is relatively immovable with respect to the cylindrical member.

The zoom optical system ZL according to the third embodiment may be a zoom optical system ZL(2) shown in FIG. 8, a zoom optical system ZL(3) shown in FIG. 11, or a zoom optical system ZL(4) shown in FIG. 14. The zoom optical system ZL according to the third embodiment may be a zoom optical system ZL(5) shown in FIG. 17, a zoom optical system ZL(6) shown in FIG. 20, or a zoom optical system ZL(7) shown in FIG. 23.

In the configuration described above, the zoom optical system ZL according to the third embodiment satisfies a following conditional expression (3).

$$-1.000 < dA/dB < 2.000 \tag{3}$$

where dA: an amount of movement of the focusing lens group with respect to an image surface upon zooming from a wide-angle end state to a telephoto end state (a sign of the amount of movement toward an object is assumed to be +, and a sign of the amount of movement toward an image is assumed to be −), and dB: an amount of movement of the cylindrical member with respect to the image surface upon zooming from the wide-angle end state to the telephoto end state (a sign of the amount of movement toward the object is assumed to be +, and a sign of the amount of movement toward the image is assumed to be −).

The conditional expression (3) defines the ratio between the amount of movement of the focusing lens group toward the image surface upon zooming from the wide-angle end state to the telephoto end state, and the amount of movement of the cylindrical member toward the image surface. By satisfying the conditional expression (3), reduction in the size of the lens barrel can be achieved while the various aberrations including the field curves and coma aberration are favorably corrected. Note that in the conditional expression (3), in the case where the focusing lens groups include the first focusing lens group that moves upon focusing, and the second focusing lens group that is disposed closer to the image than the first focusing lens group and moves upon focusing, the amount of movement of the focusing lens groups is the amount of movement of the second focusing lens group.

If the corresponding value of the conditional expression (3) becomes out of the range, the positional relationship between the focusing lens group and the cylindrical member becomes inappropriate. Accordingly, it is difficult to achieve reduction in the size of the lens barrel while suppressing the variation in aberration. By setting the upper limit value of the conditional expression (3) to 1.950, the advantageous effects of this embodiment can be more secured. To further secure the advantageous effects of this embodiment, the upper limit value of the conditional expression (3) may be set to 1.900, 1.800, 1.700, 1.600, 1.500, 1.400, 1.300, 1.200, 1.100, 1.000, 0.980, and further to 0.950.

By setting the lower limit value of the conditional expression (3) to −0.500, the advantageous effects of this embodiment can be more secured. To further secure the advantageous effects of this embodiment, the lower limit value of the conditional expression (3) may be set to −0.100, 0.100, 0.200, 0.300, 0.400, 0.500, 0.550, 0.600, 0.650, 0.700, 0.710, and further to 0.720.

Next, a fourth embodiment of the zoom optical system is described. The zoom optical system according to the fourth embodiment has a configuration similar to that of the zoom optical system ZL according to the first embodiment. Accordingly, the same symbols as those in the first embodiment are assigned and description is made. The zoom optical system ZL(1) as an example of the zoom optical system ZL according to the fourth embodiment includes a plurality of lens groups as shown in FIG. 1, and upon zooming, distances between adjacent lens groups change. The zoom optical system ZL(1) comprises: a focusing lens group that moves upon focusing; and a cylindrical member (for example, the cylindrical member 100 shown in FIGS. 1 and 2) to which a driving apparatus for moving the focusing lens group is fixed, and upon zooming, the cylindrical member moves. The focusing lens group is relatively movable with respect to the cylindrical member by the driving apparatus, and no lens is fixed to the cylindrical member.

The zoom optical system ZL according to the fourth embodiment may be a zoom optical system ZL(2) shown in FIG. 8, a zoom optical system ZL(3) shown in FIG. 11, or a zoom optical system ZL(4) shown in FIG. 14. The zoom optical system ZL according to the fourth embodiment may be a zoom optical system ZL(5) shown in FIG. 17, a zoom optical system ZL(6) shown in FIG. 20, or a zoom optical system ZL(7) shown in FIG. 23.

In the configuration described above, the zoom optical system ZL according to the fourth embodiment satisfies the following conditional expression (3) described above.

$$-1.000 < dA/dB < 2.000 \tag{3}$$

Similar to the third embodiment, by satisfying the conditional expression (3), reduction in the size of the lens barrel can be achieved while the various aberrations including the field curves and coma aberration are favorably corrected. Note that by setting the upper limit value of the conditional expression (3) to 1.950, the advantageous effects of this embodiment can be more secured. To further secure the advantageous effects of this embodiment, the upper limit value of the conditional expression (3) may be set to 1.900, 1.800, 1.700, 1.600, 1.500, 1.400, 1.300, 1.200, 1.100, 1.000, 0.980, and further to 0.950. By setting the lower limit value of the conditional expression (3) to −0.500, the advantageous effects of this embodiment can be more secured. To further secure the advantageous effects of this embodiment, the lower limit value of the conditional expression (3) may be set to −0.100, 0.100, 0.200, 0.300, 0.400, 0.500, 0.550, 0.600, 0.650, 0.700, 0.710, and further to 0.720.

Preferably, in the zoom optical systems ZL according to the third embodiment and the fourth embodiment, the plurality of lens groups include, in order from an object: a first lens group G1 having a positive refractive power; a second lens group G2 having a negative refractive power; a third lens group G3 having a positive refractive power; a fourth lens group G4 having a positive refractive power; and a succeeding lens group GR, and the succeeding lens group GR includes the focusing lens group.

Accordingly, the zoom optical systems ZL according to the third and fourth embodiments include at least five lens groups. The distances between lens groups change upon zooming. Accordingly, the variation in various aberrations upon zooming from the wide-angle end state to the telephoto end state can be suppressed. By disposing the focusing lens groups in the succeeding lens group GR, the focusing lens groups can be reduced in size and weight, and high-speed and highly silent autofocus can be achieved without increasing the size of the lens barrel.

Preferably, the zoom optical systems ZL according to the third embodiment and the fourth embodiment further comprise an image-side lens group disposed adjacent to an image side of the focusing lens group, wherein upon zooming, a distance between the focusing lens group and the image-side lens group changes, and satisfies a following conditional expression (4).

$$-1.000 < dB/dE < 1.500 \tag{4}$$

where dE: an amount of movement of the image-side lens group with respect to an image surface upon zooming from a wide-angle end state to a telephoto end state (a sign of the amount of movement toward an object is assumed to be +, and a sign of the amount of movement toward an image is assumed to be −).

The conditional expression (4) defines the ratio between the amount of movement of the cylindrical member toward the image surface upon zooming from the wide-angle end state to the telephoto end state, and the amount of movement of the image-side lens group toward the image surface. By satisfying the conditional expression (4), reduction in the size of the lens barrel can be achieved while the various aberrations including the field curves and coma aberration are favorably corrected.

If the corresponding value of the conditional expression (4) becomes out of the range, the positional relationship between the focusing lens group and the cylindrical member becomes inappropriate. Accordingly, it is difficult to achieve reduction in the size of the lens barrel while suppressing the variation in aberration. By setting the upper limit value of the conditional expression (4) to 1.450, the advantageous effects of this embodiment can be more secured. To further secure the advantageous effects of this embodiment, the upper limit value of the conditional expression (4) may be set to 1.400, 1.350, 1.300, 1.250, 1.200, 1.150, 1.120, 1.100, 1.080, and further to 1.050.

By setting the lower limit value of the conditional expression (4) to −0.500, the advantageous effects of this embodiment can be more secured. To further secure the advantageous effects of this embodiment, the lower limit value of the conditional expression (4) may be set to −0.100, 0.100, 0.200, 0.300, 0.400, 0.500, 0.550, 0.600, 0.650, 0.700, and further to 0.750.

Preferably, the zoom optical systems ZL according to the third embodiment and the fourth embodiment further comprise an object-side lens group disposed adjacent to an object side of the focusing lens group, wherein upon zooming, a distance between the object-side lens group and the focusing lens group changes, and the zoom optical system satisfies a following conditional expression (5).

$$-1.000 < dB/dD < 1.000 \tag{5}$$

where dD: an amount of movement of the object-side lens group with respect to an image surface upon zooming from a wide-angle end state to a telephoto end state (a sign of the amount of movement toward an object is assumed to be +, and a sign of the amount of movement toward an image is assumed to be −).

The conditional expression (5) defines the ratio between the amount of movement of the cylindrical member toward the image surface upon zooming from the wide-angle end state to the telephoto end state, and the amount of movement of the object-side lens group toward the image surface. By satisfying the conditional expression (5), reduction in the size of the lens barrel can be achieved while the various aberrations including the field curves and coma aberration are favorably corrected.

If the corresponding value of the conditional expression (5) becomes out of the range, the positional relationship between the focusing lens group and the cylindrical member becomes inappropriate. Accordingly, it is difficult to achieve reduction in the size of the lens barrel while suppressing the variation in aberration. By setting the upper limit value of the conditional expression (5) to 0.950, the advantageous effects of this embodiment can be more secured. To further secure the advantageous effects of this embodiment, the upper limit value of the conditional expression (5) may be set to 0.900, 0.850, 0.800, 0.750, 0.700, 0.690, 0.680, 0.670, and further to 0.665.

By setting the lower limit value of the conditional expression (5) to −0.500, the advantageous effects of this embodiment can be more secured. To further secure the advantageous effects of this embodiment, the lower limit value of the conditional expression (5) may be set to −0.100, 0.100, 0.200, 0.300, 0.400, 0.500, 0.510, 0.520, 0.530, 0.540, and further to 0.550.

Preferably, in the zoom optical systems ZL according to the third embodiment and the fourth embodiment, the driving apparatus is a stepping motor. Accordingly, the focusing lens group can be moved in the optical axis direction even upon zooming as required, which can further improve the optical performances.

Preferably, the zoom optical systems ZL according to the third embodiment and the fourth embodiment comprise, as the focusing lens group: a first focusing lens group that moves upon focusing; and a second focusing lens group that is disposed closer to an image than the first focusing lens group and moves upon focusing, wherein a movement trajectory of the first focusing lens group upon zooming is different from a movement trajectory of the second focusing lens group upon zooming. Accordingly, the various aberrations, such as the field curves and the spherical aberration, can be favorably corrected.

Preferably, in the zoom optical systems ZL according to the third embodiment and the fourth embodiment, a first driving apparatus for moving the first focusing lens group, and a second driving apparatus for moving the second focusing lens group are fixed to the cylindrical member. Accordingly, the fixation member of the first driving apparatus and the fixation member of the second driving apparatus can be a common member, which can prevent the lens barrel from increasing in size.

Preferably, in the zoom optical systems ZL according to the third embodiment and the fourth embodiment, a guide shaft (for example, the guide shafts 170 shown in FIGS. 2 and 3) that linearly guides the first focusing lens group and the second focusing lens group in an optical axis direction is fixed to the cylindrical member. Accordingly, the fixation member of the linear guide shaft for the first focusing lens group and the fixation member of the linear guide shaft for the second focusing lens group may be a common member, which can prevent the lens barrel from increasing in size.

Preferably, the zoom optical systems ZL according to the first to fourth embodiments comprise, as the focusing lens group: a first focusing lens group that moves upon focusing; and a second focusing lens group that is disposed closer to an image than the first focusing lens group and moves upon focusing, wherein the first focusing lens group and the second focusing lens group have positive refractive powers, and the zoom optical system satisfies a following conditional expression (6).

$$0.20 < fF1/fF2 < 3.00 \tag{6}$$

where fF1: a focal length of the first focusing lens group, and fF2: a focal length of the second focusing lens group.

The conditional expression (6) defines the ratio between the focal length of the first focusing lens group and the focal length of the second focusing lens group. By satisfying the conditional expression (6), the variation in various aberrations including the spherical aberration upon focusing from the infinity object to the short-distance object can be suppressed.

If the corresponding value of the conditional expression (6) exceeds the upper limit value, the refractive power of the second focusing lens group becomes too strong. Accordingly, it is difficult to suppress the variation in various aberrations including the spherical aberration upon focusing. By setting the upper limit value of the conditional expression (6) to 2.80, the advantageous effects of this embodiment can be more secured. To further secure the advantageous effects of this embodiment, the upper limit value of the conditional expression (6) may be set to 2.50, 2.30, 2.20, 2.10, 2.00, 1.90, 1.80, 1.70, 1.60, and further to 1.50.

If the corresponding value of the conditional expression (6) falls below the lower limit value, the refractive power of the first focusing lens group becomes too strong. Accordingly, it is difficult to suppress the variation in various aberrations including the spherical aberration upon focusing. By setting the lower limit value of the conditional expression (6) to 0.25, the advantageous effects of this embodiment can be more secured. To further secure the advantageous effects of this embodiment, the lower limit value of the conditional expression (6) may be set to 0.28, 0.30, 0.33, 0.35, 0.38, 0.40, 0.43, 0.45, 0.48, and further to 0.50.

Preferably, the zoom optical systems ZL according to the first to fourth embodiments comprise, as the focusing lens group: a first focusing lens group that moves upon focusing; and a second focusing lens group that is disposed closer to an image than the first focusing lens group and moves upon focusing, wherein the first focusing lens group and the second focusing lens group have positive refractive powers, and the zoom optical system satisfies a following conditional expression (7).

$$0.20 < MTF1/MTF2 < 3.00 \tag{7}$$

where MTF1: an absolute value of an amount of movement of the first focusing lens group upon focusing from an infinity object to a short-distance object in the telephoto end state, and MTF2: an absolute value of an amount of movement of the second focusing lens group upon focusing from an infinity object to a short-distance object in the telephoto end state.

The conditional expression (7) defines the ratio between the absolute value of the amount of movement of the first focusing lens group upon focusing from the infinity object to the short-distance object (shortest-distant object) in the telephoto end state, and the absolute value of the amount of movement of the second focusing lens group upon focusing from the infinity object to the short-distance object (shortest-distant object) in the telephoto end state. By satisfying the conditional expression (7), the variation in various aberrations including the spherical aberration upon focusing from the infinity object to the short-distance object can be suppressed.

If the corresponding value of the conditional expression (7) exceeds the upper limit value, the amount of movement of the first focusing lens group becomes too large. Accordingly, it is difficult to suppress the variation in various aberrations including the spherical aberration upon focusing. By setting the upper limit value of the conditional expression (7) to 2.90, the advantageous effects of this embodiment can be more secured. To further secure the advantageous effects of this embodiment, the upper limit value of the conditional expression (7) may be set to 2.80, 2.70, 2.60, 2.50, 2.40, 2.30, 2.20, 2.10, and further to 2.00.

If the corresponding value of the conditional expression (7) falls below the lower limit value, the amount of movement of the second focusing lens group becomes too large. Accordingly, it is difficult to suppress the variation in various aberrations including the spherical aberration upon focusing. By setting the lower limit value of the conditional expression (7) to 0.25, the advantageous effects of this embodiment can be more secured. To further secure the advantageous effects of this embodiment, the lower limit value of the conditional expression (7) may be set to 0.30, 0.35, 0.40, 0.45, 0.50, 0.55, 0.60, 0.65, and further to 0.70.

Preferably, the zoom optical system ZL according to the first to fourth embodiments comprise, as the focusing lens group: a first focusing lens group that moves upon focusing; and a second focusing lens group that is disposed closer to an image than the first focusing lens group and moves upon focusing, wherein the first focusing lens group and the second focusing lens group have positive refractive powers, and the zoom optical system satisfies a following conditional expression (8).

$$0.20 < |\beta TF1|/|\beta TF2| < 5.00 \quad (8)$$

where $\beta TF1$: a lateral magnification of the first focusing lens group in a case of focusing on an infinity object in a telephoto end state, and $\beta TF2$: a lateral magnification of the second focusing lens group in a case of focusing on the infinity object in the telephoto end state.

The conditional expression (8) defines the ratio between the lateral magnification of the first focusing lens group in the case of focusing on the infinity object in the telephoto end state, and the lateral magnification of the second focusing lens group in the case of focusing on the infinity object in the telephoto end state. By satisfying the conditional expression (8), the variation in various aberrations including the spherical aberration upon focusing from the infinity object to the short-distance object can be suppressed.

If the corresponding value of the conditional expression (8) exceeds the upper limit value, the lateral magnification of the first focusing lens group becomes too large. Accordingly, it is difficult to suppress the variation in various aberrations including the spherical aberration upon focusing. By setting the upper limit value of the conditional expression (8) to 4.80, the advantageous effects of this embodiment can be more secured. To further secure the advantageous effects of this embodiment, the upper limit value of the conditional expression (8) may be set to 4.50, 4.30, 4.00, 3.80, 3.50, 3.30, 3.00, 2.80, 2.50, 2.30, 2.00, 1.80, and further to 1.50.

If the corresponding value of the conditional expression (8) falls below the lower limit value, the lateral magnification of the second focusing lens group becomes too large. Accordingly, it is difficult to suppress the variation in various aberrations including the spherical aberration upon focusing. By setting the lower limit value of the conditional expression (8) to 0.25, the advantageous effects of this embodiment can be more secured. To further secure the advantageous effects of this embodiment, the lower limit value of the conditional expression (8) may be set to 0.30, 0.35, 0.40, 0.45, 0.50, 0.55, 0.60, 0.65, and further to 0.70.

Preferably, the zoom optical systems ZL according to the first to fourth embodiments comprise, as the focusing lens group: a first focusing lens group that moves upon focusing; and a second focusing lens group that is disposed closer to an image than the first focusing lens group and moves upon focusing, wherein the first focusing lens group and the second focusing lens group have positive refractive powers, and the first focusing lens group and the second focusing lens group are adjacent to each other. Accordingly, the variation in various aberrations including the spherical aberration upon focusing from the infinity object to the short-distance object can be suppressed.

Preferably, in the zoom optical system ZL according to the first to fourth embodiments, the focusing lens groups consist of three or less single lenses. Accordingly, the focusing lens groups can be reduced in size and weight.

Preferably, in the zoom optical system ZL according to the first to fourth embodiments, at least one of the focusing lens groups includes a single lens having a negative refractive power. Accordingly, the variation in various aberrations including the spherical aberration upon focusing from the infinity object to the short-distance object can be suppressed.

Preferably, in the zoom optical system ZL according to the first to fourth embodiments, the focusing lens groups are disposed closer to an image than an aperture stop S. Accordingly, the focusing lens groups can be reduced in size and weight.

Preferably, the zoom optical system ZL according to the first to fourth embodiments satisfies the following conditional expression (9).

$$0.20 < |fF|/ft < 4.00 \quad (9)$$

where fF: a focal length of a focusing lens group having a strongest refractive power among the focusing lens groups, and ft: a focal length of the zoom optical system ZL in a telephoto end state.

The conditional expression (9) defines the ratio between the focal length of the focusing lens group having the strongest refractive power among the focusing lens groups, and the focal length of the zoom optical system ZL in the telephoto end state. By satisfying the conditional expression (9), the variation in various aberrations including the spherical aberration upon focusing from the infinity object to the short-distance object can be suppressed without increasing the size of the lens barrel.

If the corresponding value of the conditional expression (9) exceeds the upper limit value, the refractive power of the focusing lens group becomes too weak. Accordingly, the amount of movement of the focusing lens group upon focusing becomes large, thereby increasing the size of the lens barrel. By setting the upper limit value of the conditional expression (9) to 3.80, the advantageous effects of this embodiment can be more secured. To further secure the advantageous effects of this embodiment, the upper limit value of the conditional expression (9) may be set to 3.60, 3.40, 3.20, 3.00, 2.80, 2.60, 2.40, 2.20, and further to 2.00.

If the corresponding value of the conditional expression (9) falls below the lower limit value, the refractive power of the focusing lens group becomes too strong. Accordingly, it is difficult to suppress the variation in various aberrations including the spherical aberration upon focusing. By setting the lower limit value of the conditional expression (9) to 0.23, the advantageous effects of this embodiment can be more secured. To further secure the advantageous effects of this embodiment, the lower limit value of the conditional expression (9) may be set to 0.25, 0.28, 0.30, 0.33, and further to 0.35.

Figure 26:
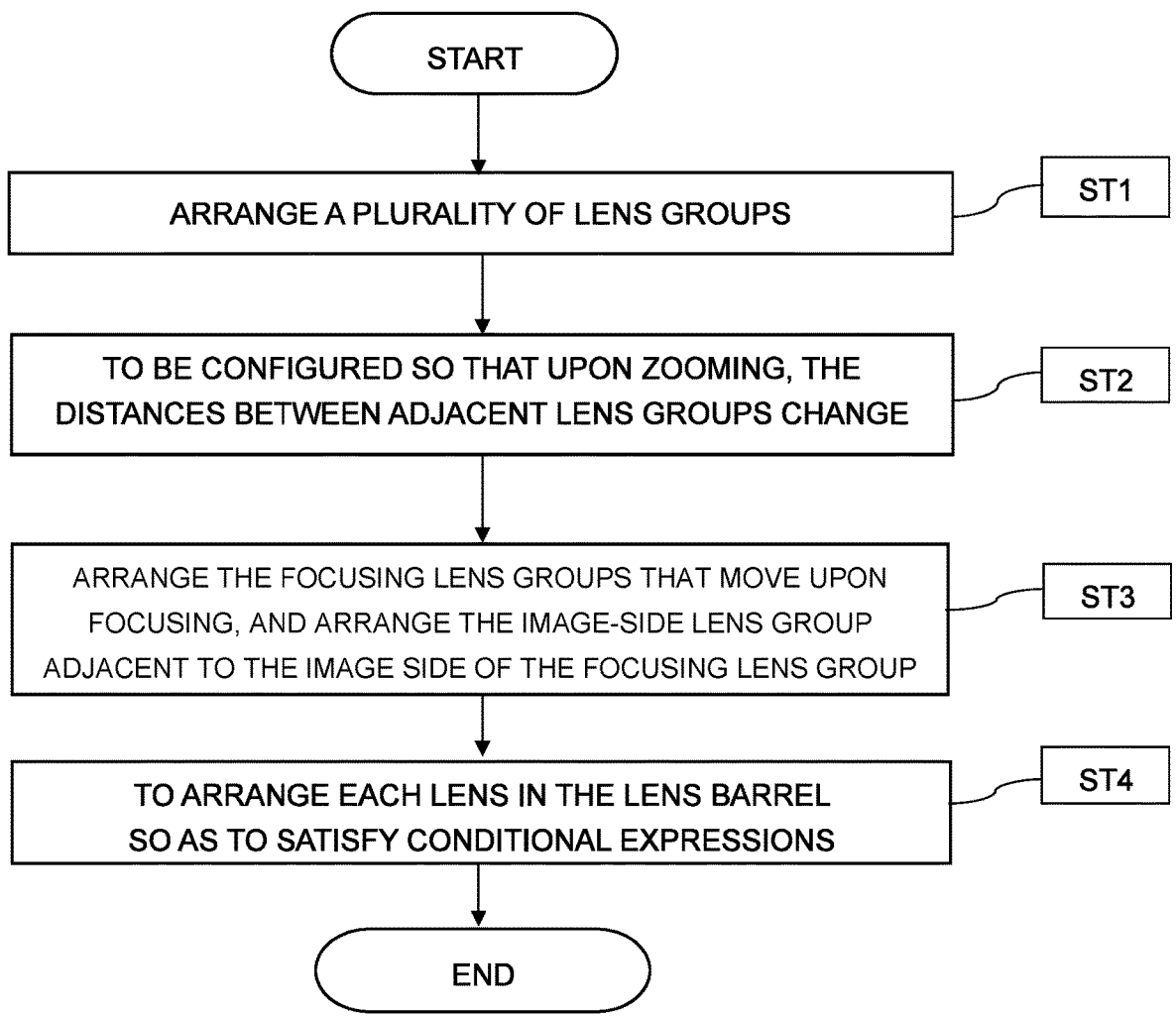
FIG. 26 is a flowchart showing a method for manufacturing the zoom optical system according to a first embodiment.

Subsequently, referring to FIG. 26, a method of manufacturing the zoom optical system ZL according to the first embodiment is described. First, arrange a plurality of lens groups (step ST1). Achieve a configuration such that upon zooming, the distances between adjacent lens groups change (step ST2). Arrange the focusing lens groups that move upon focusing, and arrange the image-side lens group adjacent to the image side of the focusing lens group (step ST3). Furthermore, arrange each lens in the lens barrel so as to satisfy at least the conditional expression (1) (step ST4). Such a manufacturing method can manufacture the zoom optical system that can achieve high-speed and highly silent autofocus without increasing the size of the lens barrel, and suppress the variation in aberrations upon zooming from the wide-angle end state to the telephoto end state, and the variation in aberrations upon focusing from the infinity object to the short-distance object.

EXAMPLES

Zoom optical systems ZL according to the respective examples are hereinafter described with reference to the drawings. FIGS. 4, 8, 11, 14, 17, 20 and 23 are sectional views showing configurations and refractive power distributions of the zoom optical systems ZL {ZL(1) to ZL(7)} according to first to seventh examples. Note that the first to third examples and seventh example are examples corresponding to the first to the fourth embodiment. The fourth example is an example corresponding to the first, the third and the fourth embodiments. The fifth and the sixth examples are examples corresponding to the third and the fourth embodiments. In each sectional view, the movement direction of each lens group along the optical axis upon zooming from the wide-angle end state (W) to the telephoto end state (T) is indicated by an arrow. Furthermore, the movement direction of each focusing lens group upon zooming from the infinity to the short-distance object is indicated by an arrow accompanied by characters "FOCUSING".

In these drawings (FIGS. 4, 8, 11, 14, 17, 20 and 23), each lens group is represented by a combination of a symbol G and a numeral, and each lens is represented by a combination of a symbol L and a numeral. In this case, to prevent the types and numbers of symbols and numerals from being large and complicated, the lens groups and the like are represented using combinations of symbols and numerals independently among the examples. Accordingly, even if the same combinations of symbols and numerals are used among the examples, such use does not mean the same configurations.

Tables 1 to 7 are hereinafter shown. Among them, Table 1 is a table showing each data item in the first example, Table 2 is that in the second example, Table 3 is that in the third example, Table 4 is that in the fourth example, Table 5 is that in the fifth example, Table 6 is that in the sixth example, and Table 7 is that in the seventh example. In each example, d-line (wavelength $\lambda$=587.6 nm), and g-line (wavelength $\lambda$=435.8 nm) are selected as calculation targets of aberration characteristics.

In the table of [General Data], f indicates the focal length of the entire lens system, FNO indicates the F-number, 2ω indicates the angle of view (the unit is ° (degrees), and m is the half angle of view), and Ymax indicates the maximum image height. TL indicates a distance obtained by adding BF to the distance from the lens foremost surface to the lens last surface on the optical axis upon focusing on infinity. BF indicates the air equivalent distance (back focus) from the lens last surface to the image surface I on the optical axis upon focusing on infinity. Note that these values are indicated for each of zoom states at the wide-angle end (W), the intermediate focal length (M) and the telephoto end (T). In the table of [General Data], MTF1 indicates an absolute value of an amount of movement of the first focusing lens group upon focusing from an infinity object to a short-distance object (shortest-distance object) in the telephoto end state. MTF2 indicates an absolute value of an amount of movement of the second focusing lens group upon focusing from an infinity object to a short-distance object (shortest-distance object) in the telephoto end state. βTF1 indicates a lateral magnification of the first focusing lens group in the case of focusing on an infinity object in the telephoto end state. βTF2 indicates a lateral magnification of the second focusing lens group in the case of focusing on the infinity object in the telephoto end state. dA indicates an amount of movement of the focusing lens group with respect to an image surface upon zooming from a wide-angle end state to a telephoto end state (movement toward an object is shown as positive (+) value and movement toward an image is shown as negative (−) value). dB indicates an amount of movement of the cylindrical member with respect to an image surface upon zooming from a wide-angle end state to a telephoto end state. dD indicates an amount of movement of an object side lens group with respect to an image surface upon zooming from a wide-angle end state to a telephoto end state. dE indicates an amount of movement of an image side lens group with respect to an image surface upon zooming from a wide-angle end state to a telephoto end state.

In the table of [Lens Data], Surface Number indicates the order of the optical surface from the object side along the direction in which the ray travels, R indicates the radius of curvature (the surface whose center of curvature resides on the image side is regarded to have a positive value) of each optical surface, D indicates a surface distance, which is the distance to the next optical surface (or the image surface) from each optical surface on the optical axis, nd indicates the refractive index of the material of the optical member for d-line, and νd indicates the Abbe number of the material of the optical member with respect to d-line. The radius of curvature "∞" indicates a plane or an aperture, and (aperture stop S) indicates an aperture stop. The description of the refractive index nd=1.00000 of air is omitted. In a case where the lens surface is an aspherical surface, the surface number is assigned * symbol, and the field of the radius of curvature R indicates the paraxial radius of curvature.

In the table of [Aspherical Surface Data], the shape of the aspherical surface indicated in [Lens Data] is indicated by the following expression (A). X(y) indicates the distance (sag amount) from the tangent plane at the vertex of the aspherical surface to the position on the aspherical surface at the height y along the optical axis direction. R indicates the radius of curvature (paraxial radius of curvature) of the reference spherical surface. κ indicates the conic constant. Ai indicates the i-th aspherical coefficient. "E-n" indicates "×10⁻ⁿ". For example, 1.234 E−05=1.234×10⁻⁵. Note that the second-order aspherical coefficient A2 is 0, and description of which is omitted.

$$X(y)=(y^2/R)/\{1+(1-\kappa \times y^2/R^2)^{1/2}\}+A4 \times y^4+A6 \times y^6+A8 \times y^8+A10 \times y_{10}+A12 \times y^{12} \quad (A)$$

The table of [Lens Group Data] shows the first surface (the surface closest to the object) of each lens group and the focal length.

The table of [Variable Distance Data] shows the surface distances at surface numbers where the distance to the next lens surface is "Variable" in the table showing [Lens Data]. Here, surface distances in the zoom states at the wide-angle end (W), the intermediate focal length (M) and the telephoto end (T) upon the infinity focus and the short range focus are indicated.

The table of [Conditional Expression Corresponding Value] shows the value corresponding to each conditional expression.

Hereinafter, among all the data values, "mm" is generally used for the listed focal length f, radius of curvature R, surface distance D, other lengths and the like if not otherwise specified. However, there is no limitation thereto, because the optical system can achieve equivalent optical performances even if being proportionally enlarged or reduced.

The description of the table so far is common to all the examples. Hereinafter, redundant description is omitted.

First Example

A first example is described with reference to FIGS. 4 to 7 and Table 1. FIG. 4 is a lens configuration diagram of a zoom optical system according to the first example. The zoom optical system ZL(1) according to the first example consists of, in order from the object: a first lens group G1 having a positive refractive power; a second lens group G2 having a negative refractive power; an aperture stop S; a third lens group G3 having a positive refractive power; a fourth lens group G4 having a positive refractive power; a fifth lens group G5 having a positive refractive power; a sixth lens group G6 having a positive refractive power; and a seventh lens group G7 having a negative refractive power. Upon zooming from the wide-angle end state (W) to the telephoto end state (T), the first to seventh lens groups G1 to G7 move in directions respectively indicated by arrows in FIG. 4, and the distances between adjacent lens groups change. A lens group that consists of the fifth lens group G5, the sixth lens group G6 and the seventh lens group G7 corresponds to a succeeding lens group GR, and has a negative refractive power as a whole. A sign (+) or a sign (−) assigned to each lens group indicates the refractive power of the corresponding lens group. This analogously applies to all the following examples.

The first lens group G1 consists of, in order from the object: a positive cemented lens that includes a negative meniscus lens L11 having a convex surface facing the object, and a positive meniscus lens L12 having a convex surface facing the object; and a positive meniscus lens L13 having a convex surface facing the object.

The second lens group G2 consists of, in order from the object: a negative meniscus lens L21 having a convex surface facing the object; a biconcave negative lens L22; a biconvex positive lens L23; and a negative meniscus lens L24 having a concave surface facing the object. The negative meniscus lens L21 has an object-side lens surface that is an aspherical surface.

The third lens group G3 consists of, in order from the object: a positive meniscus lens L31 having a convex surface facing the object; and a biconvex positive lens L32. The aperture stop S is provided on an object-side neighborhood of the third lens group G3, and moves together with the third lens group G3 upon zooming. The positive meniscus lens L31 has an object-side lens surface that is an aspherical surface.

The fourth lens group G4 consists of a positive cemented lens that includes a negative meniscus lens L41 having a convex surface facing the object, and a biconvex positive lens L42.

The fifth lens group G5 consists of, in order from the object: a negative meniscus lens L51 having a concave surface facing the object; and a biconvex positive lens L52.

The sixth lens group G6 consists of a positive meniscus lens L61 having a concave surface facing the object. The positive meniscus lens L61 has an image-side lens surface that is an aspherical surface.

The seventh lens group G7 consists of, in order from the object: a positive meniscus lens L71 having a concave surface facing the object; a biconcave negative lens L72; and a negative meniscus lens L73 having a concave surface facing the object. The negative lens L72 has an object-side lens surface that is an aspherical surface. An image surface I is disposed on the image side of the seventh lens group G7.

In this example, the fifth lens group G5 and the sixth lens group G6 are independently moved toward the object, thereby focusing from a far-distant object to a short-distance object (from an infinity object to a finite distance object). That is, the fifth lens group G5 corresponds to the first focusing lens group, and the sixth lens group G6 corresponds to the second focusing lens group. The fourth lens group G4 corresponds to the object side lens group, and the seventh lens group G7 corresponds to the image side lens group.

FIG. 4 provides illustration simplified by chain double-dashed lines. The cylindrical member 100 is disposed between the fourth lens group G4 and the seventh lens group G7. The fifth lens group G5 and the sixth lens group G6 are disposed on the inner diameter side of the cylindrical member 100. Although shown in a simplified manner in FIG. 4, the cylindrical member 100 moves toward the object upon zooming from the wide-angle end state (W) to the telephoto end state (T). The five group drive motor and the six group drive motor fixed to the cylindrical member 100 respectively allow the fifth lens group G5 and the sixth lens group G6 to move relatively in the optical axis direction with respect to the cylindrical member 100. Accordingly, upon zooming, the amount of relative movement in the optical axis direction with respect to the image surface I can be different between the fifth lens group G5 and the sixth lens group G6, and the cylindrical member 100. Upon zooming or focusing, the amount of relative movement in the optical axis direction with respect to the image surface I can be different between the fifth lens group G5 and the sixth lens group G6.

Figure 5A:
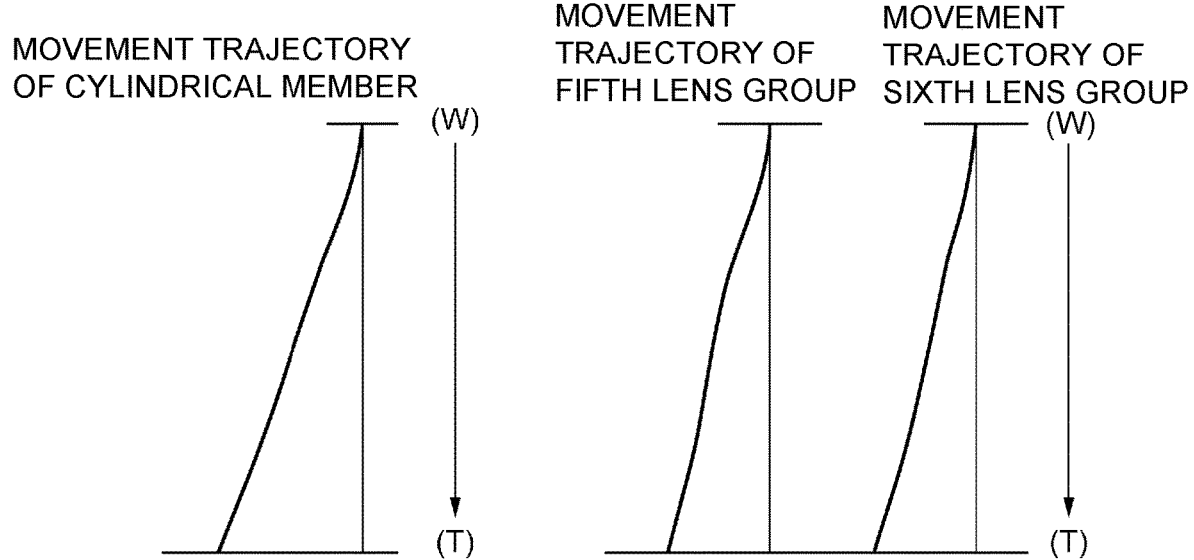
FIG. 5A schematically shows movement trajectories of a cylindrical member and focusing lens groups with respect to an image surface upon zooming, and FIG. 5B schematically shows relative movement trajectories of the focusing lens groups with respect to the cylindrical member upon zooming.

The left side of FIG. 5A shows the movement trajectory of the cylindrical member 100 with respect to the image surface upon zooming from the wide-angle end state (W) to the telephoto end state (T). The right side of FIG. 5A shows the movement trajectories of the focusing lens groups (the fifth lens group G5 and the sixth lens group G6) with respect to the image surface upon zooming from the wide-angle end state (W) to the telephoto end state (T). FIG. 5B shows the relative movement trajectories of the focusing lens groups (the fifth lens group G5 and the sixth lens group G6) with respect to the cylindrical member 100 upon zooming from the wide-angle end state (W) to the telephoto end state (T).

In the first example, upon zooming from the wide-angle end state to the telephoto end state, the cylindrical member 100 is disposed at a position close to an image-surface-side end of the lens disposed on the object side of the cylindrical member 100 in the wide-angle end state, and the cylindrical member 100 is disposed at a position close to an object-side end of the lens disposed on the image surface side in the telephoto end state. That is, the cylindrical member 100 is close to the lens disposed on one of the object side and the image surface side of the cylindrical member 100 in a first focal length state, and is close to the lens disposed on the other of the object side and the image surface side of the cylindrical member 100 in a second focal length state different from the first focal length state. Upon zooming, the cylindrical member 100 moves so as to avoid collision with the lenses that are before and after the cylindrical member 100 and move to approach the cylindrical member 100. In the first example, the cylindrical member 100 moves so as to avoid collision with the fourth lens group G4 in the wide-angle end state and to avoid collision with the seventh lens group G7 in the telephoto end state. On the other hand, the focusing lens groups (the fifth lens group G5 and the sixth lens group G6) are relatively movable with respect to the cylindrical member 100, and can correct each aberration by appropriately moving in the corresponding focal length state. In the first example, the cylindrical member 100 moves toward the object, while the focusing lens groups are fixed at positions with respect to the cylindrical member 100 or move toward the image surface with respect to the cylindrical member 100. Thus, the focusing lens groups can have smaller amounts of movement than the cylindrical member 100, and can correct each aberration. In the first example, upon zooming, the focusing lens groups are at the fixed relative positions with respect to the cylindrical member 100 or relatively move in the direction opposite to the movement direction of the cylindrical member 100, but may relatively move in the same direction as the movement direction of the cylindrical member 100 instead. Upon zooming, the focusing lens groups move toward the object with respect to the image surface, but may move toward the image surface with respect to the image surface instead.

The following Table 1 lists values of data on the zoom optical system according to the first example.

TABLE 1

[General Data]

Zooming ratio 2.74
MTF1 = −1.352
MTF2 = −0.941
βTF1 = 0.758
βTF2 = 0.760
dA = 12.515
dB = 17.350
dD = 26.291
dE = 16.690

|   | W | M | T |
|---|---|---|---|
| f | 24.8 | 50.0 | 67.9 |
| FNO | 2.92 | 2.92 | 2.92 |
| 2ω | 85.10 | 45.26 | 33.84 |
| Ymax | 21.60 | 21.60 | 21.60 |

TABLE 1-continued

[General Data]

| TL | 139.35 | 158.45 | 169.16 |
|---|---|---|---|
| BF | 11.93 | 23.42 | 28.62 |

[Lens Data]

| Surface Number | R | D | nd | vd |
|---|---|---|---|---|
| Object Surface | ∞ | | | |
| 1 | 234.3873 | 2.500 | 1.84666 | 23.80 |
| 2 | 109.5180 | 5.200 | 1.75500 | 52.34 |
| 3 | 389.6852 | 0.200 | | |
| 4 | 59.0627 | 5.700 | 1.77250 | 49.62 |
| 5 | 135.3649 | D5(Variable) | | |
| 6* | 218.4420 | 2.000 | 1.74389 | 49.53 |
| 7 | 18.6957 | 9.658 | | |
| 8 | −59.6856 | 1.300 | 1.77250 | 49.62 |
| 9 | 59.6856 | 0.442 | | |
| 10 | 39.2099 | 6.400 | 1.72825 | 28.38 |
| 11 | −48.6731 | 1.933 | | |
| 12 | −26.4065 | 1.300 | 1.61800 | 63.34 |
| 13 | −71.7612 | D13(Variable) | | |
| 14 | ∞ | 1.712 | | (Aperture Stop S) |
| 15* | 71.8876 | 2.500 | 1.69370 | 53.32 |
| 16 | 127.6411 | 0.716 | | |
| 17 | 38.7492 | 5.900 | 1.59319 | 67.90 |
| 18 | −105.4274 | D18(Variable) | | |
| 19 | 67.0276 | 1.300 | 1.73800 | 32.33 |
| 20 | 19.5126 | 9.700 | 1.49782 | 82.57 |
| 21 | −50.5609 | D21(Variable) | | |
| 22 | −23.9237 | 1.200 | 1.72047 | 34.71 |
| 23 | −56.2081 | 0.200 | | |
| 24 | 103.1749 | 5.900 | 1.59349 | 67.00 |
| 25 | −33.0197 | D25(Variable) | | |
| 26 | −70.6288 | 3.500 | 1.79189 | 45.04 |
| 27* | −38.2153 | D27(Variable) | | |
| 28 | −43.9824 | 3.000 | 1.94595 | 17.98 |
| 29 | −32.4253 | 0.200 | | |
| 30* | −100.5837 | 1.500 | 1.85207 | 40.15 |
| 31 | 88.1634 | 7.847 | | |
| 32 | −25.2838 | 1.400 | 1.58913 | 61.22 |
| 33 | −45.3661 | BF | | |
| Image Surface | ∞ | | | |

[Aspherical Surface Data]

6th Surface

K = 1.0000, A4 = 5.27866E−06, A6 = −5.41835E−09
A8 = 1.33113E−11, A10 = −2.04736E−14, A12 = 2.05090E−17

15th Surface

K = 1.0000, A4 = −4.55747E−06, A6 = −1.40092E−10
A8 = −8.81384E−13, A10 = −8.42653E−15, A12 = 0.00000E+00

27th Surface

K = 1.0000, A4 = 1.09543E−05, A6 = −2.36281E−08
A8 = 1.42728E−10, A10 = −5.02724E−13, A12 = 7.51800E−16

30th Surface

K = 1.0000, A4 = −2.18913E−06, A6 = −2.29301E−08
A8 = 3.94582E−11, A10 = −9.84200E−14, A12 = 0.00000E+00

[Lens Group Data]

| Group | First surface | Focal length |
|---|---|---|
| G1 | 1 | 119.124 |
| G2 | 6 | −22.126 |
| G3 | 14 | 40.880 |
| G4 | 19 | 115.687 |
| G5 | 22 | 124.717 |
| G6 | 26 | 100.365 |
| G7 | 28 | −47.354 |

TABLE 1-continued

[General Data]

[Variable Distance Data]

|  | W<br>Infinity | M<br>Infinity | T<br>Infinity | W<br>Short-<br>distance | M<br>Short-<br>distance | T<br>Short-<br>distance |
|---|---|---|---|---|---|---|
| D5 | 1.780 | 21.220 | 30.246 | 1.780 | 21.220 | 30.246 |
| D13 | 19.285 | 6.132 | 2.013 | 19.285 | 6.132 | 2.013 |
| D18 | 9.167 | 3.866 | 1.493 | 9.167 | 3.866 | 1.493 |
| D21 | 5.179 | 14.279 | 19.018 | 4.137 | 12.991 | 17.666 |
| D25 | 2.679 | 3.515 | 2.616 | 3.249 | 4.079 | 3.027 |
| D27 | 6.128 | 2.807 | 1.953 | 6.600 | 3.530 | 2.893 |

[Conditional Expression Corresponding Value]

Conditional Expression (1) dL0t/dL1t = 0.675
Conditional Expression (2) dF0t/dF1t = 0.825
Conditional Expression (3) dA/dB = 0.721
Conditional Expression (4) dB/dE = 1.040
Conditional Expression (5) dB/dD = 0.660
Conditional Expression (6) fF1/fF2 = 1.243
Conditional Expression (7) MTF1/MTF2 = 1.437
Conditional Expression (8) |βTF1|/|βTF2| = 0.997
Conditional Expression (9) |fF|/ft = 1.837

FIGS. 6A, 6B and 6C are graphs respectively showing various aberrations of the zoom optical system according to the first example upon focusing on infinity in the wide-angle end state, the intermediate focal length state and the telephoto end state. FIGS. 7A, 7B and 7C are graphs respectively showing various aberrations of the zoom optical system according to the first example upon focusing on a short-distance object in the wide-angle end state, the intermediate focal length state and the telephoto end state.

In the aberration graphs in FIGS. 6A to 6C, FNO indicates the F-number, and Y indicates the image height. The spherical aberration graph indicates the value of the F-number corresponding to the maximum diameter. The astigmatism graph and the distortion graph indicate the maximum value of the image height. The lateral aberration graph indicates the value of each image height. In the aberration graphs in FIGS. 7A to 7C, NA indicates the numerical aperture, and Y indicates the image height. The spherical aberration graph indicates the value of the numerical aperture corresponding to the maximum diameter. The astigmatism graph and the distortion graph indicate the maximum value of the image height. The lateral aberration graph indicates the value of each image height. In each aberration graph, d indicates d-line (wavelength $\lambda=587.6$ nm), and g indicates g-line (wavelength $\lambda=435.8$ nm). In the astigmatism graph, a solid line indicates a sagittal image surface, and a broken line indicates a meridional image surface. Note that also in the aberration graph in each example described below, symbols similar to those in this example are used, and redundant description is omitted.

The various aberration graphs show that the zoom optical system according to the first example favorably corrects the various aberrations from the wide-angle end state to the telephoto end state, has an excellent imaging performance, and also has an excellent imaging performance even upon focusing on a short-distance object.

Second Example

The second example is described with reference to FIGS. 8 to 10 and Table 2. FIG. 8 is a lens configuration diagram of a zoom optical system according to the second example. The zoom optical system ZL(2) according to the second example consists of, in order from the object: a first lens group G1 having a positive refractive power; a second lens group G2 having a negative refractive power; an aperture stop S; a third lens group G3 having a positive refractive power; a fourth lens group G4 having a positive refractive power; a fifth lens group G5 having a positive refractive power; a sixth lens group G6 having a positive refractive power; and a seventh lens group G7 having a negative refractive power. Upon zooming from the wide-angle end state (W) to the telephoto end state (T), the first to seventh lens groups G1 to G7 move in directions respectively indicated by arrows in FIG. 8, and the distances between adjacent lens groups change. A lens group that consists of the fifth lens group G5, the sixth lens group G6 and the seventh lens group G7 corresponds to a succeeding lens group GR, and has a negative refractive power as a whole.

The first lens group G1 consists of, in order from the object: a positive cemented lens that includes a negative meniscus lens L11 having a convex surface facing the object, and a positive meniscus lens L12 having a convex surface facing the object; and a positive meniscus lens L13 having a convex surface facing the object.

The second lens group G2 consists of, in order from the object: a negative meniscus lens L21 having a convex surface facing the object; a biconcave negative lens L22; a biconvex positive lens L23; and a negative meniscus lens L24 having a concave surface facing the object. The negative meniscus lens L21 has an object-side lens surface that is an aspherical surface.

The third lens group G3 consists of, in order from the object: a biconvex positive lens L31; and a biconvex positive lens L32. The aperture stop S is provided on an object-side neighborhood of the third lens group G3, and moves together with the third lens group G3 upon zooming. The positive lens L31 has an object-side lens surface that is an aspherical surface.

The fourth lens group G4 consists of a positive cemented lens that includes a negative meniscus lens L41 having a convex surface facing the object, and a biconvex positive lens L42.

The fifth lens group G5 consists of, in order from the object: a negative meniscus lens L51 having a concave surface facing the object; and a biconvex positive lens L52.

The sixth lens group G6 consists of a positive meniscus lens L61 having a concave surface facing the object. The positive meniscus lens L61 has an image-side lens surface that is an aspherical surface.

The seventh lens group G7 consists of, in order from the object: a positive meniscus lens L71 having a concave surface facing the object; a biconcave negative lens L72; and a negative meniscus lens L73 having a concave surface facing the object. The negative lens L72 has an object-side lens surface that is an aspherical surface. An image surface I is disposed on the image side of the seventh lens group G7.

In this example, the fifth lens group G5 and the sixth lens group G6 are independently moved toward the object, thereby focusing from a far-distant object to a short-distance object (from an infinity object to a finite distance object). That is, the fifth lens group G5 corresponds to the first focusing lens group, and the sixth lens group G6 corresponds to the second focusing lens group. The fourth lens group G4 corresponds to the object side lens group, and the seventh lens group G7 corresponds to the image side lens group.

Although illustration is omitted in FIG. 8, the cylindrical member (for example, the cylindrical member 100 shown in FIGS. 1 and 2) is disposed between the fourth lens group G4 and the seventh lens group G7. The fifth lens group G5 and the sixth lens group G6 are disposed on the inner diameter side of the cylindrical member. The cylindrical member moves toward the object upon zooming from the wide-angle end state (W) to the telephoto end state (T). The five group drive motor and the six group drive motor fixed to the cylindrical member respectively allow the fifth lens group G5 and the sixth lens group G6 to move relatively in the optical axis direction with respect to the cylindrical member. Accordingly, upon zooming, the amount of relative movement in the optical axis direction with respect to the image surface I can be different between the fifth lens group G5 and the sixth lens group G6, and the cylindrical member. Upon zooming or focusing, the amount of relative movement in the optical axis direction with respect to the image surface I can be different between the fifth lens group G5 and the sixth lens group G6.

The following Table 2 lists values of data on the zoom optical system according to the second example.

TABLE 2

[General Data]

Zooming ratio 2.74
MTF1 = −1.170
MTF2 = −0.956
βTF1 = 0.758
βTF2 = 0.793
dA = 13.767
dB = 17.350
dD = 27.774
dE = 17.570

| | W | M | T |
|---|---|---|---|
| f | 24.8 | 50.0 | 67.9 |
| FNO | 2.92 | 2.92 | 2.92 |
| 2ω | 85.08 | 45.32 | 33.84 |
| Ymax | 21.60 | 21.60 | 21.60 |
| TL | 139.96 | 156.15 | 168.00 |
| BF | 11.76 | 26.07 | 29.33 |

[Lens Data]

| Surface Number | R | D | nd | νd |
|---|---|---|---|---|
| Object Surface | ∞ | | | |
| 1 | 282.3733 | 2.500 | 1.84666 | 23.80 |
| 2 | 123.2365 | 5.647 | 1.77250 | 49.62 |
| 3 | 1180.1775 | 0.200 | | |
| 4 | 59.2907 | 4.310 | 1.81600 | 46.59 |
| 5 | 98.9987 | D5(Variable) | | |
| 6* | 205.3191 | 2.000 | 1.74389 | 49.53 |
| 7 | 19.2200 | 9.185 | | |
| 8 | −74.7032 | 1.300 | 1.83481 | 42.73 |
| 9 | 64.3697 | 0.324 | | |
| 10 | 41.9771 | 5.683 | 1.78472 | 25.64 |
| 11 | −72.0408 | 4.071 | | |
| 12 | −26.6709 | 1.300 | 1.60300 | 65.44 |
| 13 | −52.5345 | D13(Variable) | | |
| 14 | ∞ | 1.500 | | (Aperture Stop S) |
| 15* | 84.6431 | 3.039 | 1.58913 | 61.15 |
| 16 | −4073.6051 | 0.200 | | |
| 17 | 42.4140 | 5.438 | 1.59319 | 67.90 |
| 18 | −143.7473 | D18(Variable) | | |
| 19 | 74.9775 | 1.300 | 1.73800 | 32.33 |
| 20 | 20.9860 | 9.090 | 1.49782 | 82.57 |
| 21 | −48.9247 | D21(Variable) | | |
| 22 | −23.9603 | 1.200 | 1.73800 | 32.33 |
| 23 | −52.8529 | 0.955 | | |
| 24 | 113.2572 | 5.800 | 1.59349 | 66.99 |
| 25 | −32.1120 | D25(Variable) | | |
| 26 | −120.6162 | 3.500 | 1.74389 | 49.53 |
| 27* | −50.8923 | D27(Variable) | | |
| 28 | −61.4253 | 3.215 | 1.94595 | 17.98 |
| 29* | −34.3446 | 0.200 | | |
| 30* | −69.3409 | 1.500 | 1.85108 | 40.12 |
| 31 | 72.0715 | 6.683 | | |
| 32 | −23.1150 | 1.400 | 1.69680 | 55.52 |
| 33 | −36.7553 | BF | | |
| Image Surface | ∞ | | | |

[Aspherical Surface Data]

6th Surface

K = 1.0000, A4 = 4.34838E−06, A6 = −2.30274E−09
A8 = 1.34342E−12, A10 = 2.08876E−15, A12 = 0.00000E+00

15th Surface

K = 1.0000, A4 = −4.08736E−06, A6 = 2.82731E−09
A8 = −1.71368E−11, A10 = 2.81580E−14, A12 = 0.00000E+00

27th Surface

K = 1.0000, A4 = 9.77330E−06, A6 = −1.31611E−08
A8 = 7.02329E−11, A10 = −1.28887E−13, A12 = 0.00000E+00

30th Surface

K = 1.0000, A4 = −3.68898E−06, A6 = −1.92901E−08
A8 = 3.36794E−11, A10 = −8.19805E−14, A12 = 0.00000E+00

[Lens Group Data]

| Group | First surface | Focal length |
|---|---|---|
| G1 | 1 | 133.226 |
| G2 | 6 | −23.579 |
| G3 | 14 | 40.561 |
| G4 | 19 | 115.254 |
| G5 | 22 | 113.536 |
| G6 | 26 | 115.868 |
| G7 | 28 | −42.726 |

[Variable Distance Data]

| | W Infinity | M Infinity | T Infinity | W Short-distance | M Short-distance | T Short-distance |
|---|---|---|---|---|---|---|
| D5 | 2.000 | 18.194 | 30.046 | 2.000 | 18.194 | 30.046 |
| D13 | 21.479 | 6.645 | 2.000 | 21.479 | 6.645 | 2.000 |
| D18 | 9.801 | 4.462 | 1.500 | 9.801 | 4.462 | 1.500 |
| D21 | 5.195 | 13.414 | 18.760 | 4.220 | 12.328 | 17.590 |
| D25 | 2.295 | 3.824 | 2.737 | 2.742 | 4.222 | 2.950 |
| D27 | 5.890 | 2.000 | 2.087 | 6.417 | 2.689 | 3.043 |

[Conditional Expression Corresponding Value]

Conditional Expression(1) dL0t/dL1t = 0.686
Conditional Expression(2) dF0t/dF1t = 0.837
Conditional Expression(3) dA/dB = 0.793
Conditional Expression(4) dB/dE = 0.987
Conditional Expression(5) dB/dD = 0.625
Conditional Expression(6) fF1/fF2 = 0.980
Conditional Expression(7) MTF1/MTF2 = 1.223
Conditional Expression(8) |βTF1|/|βTF2| = 0.955
Conditional Expression(9) |fF|/ft = 1.706

Figure 9A:
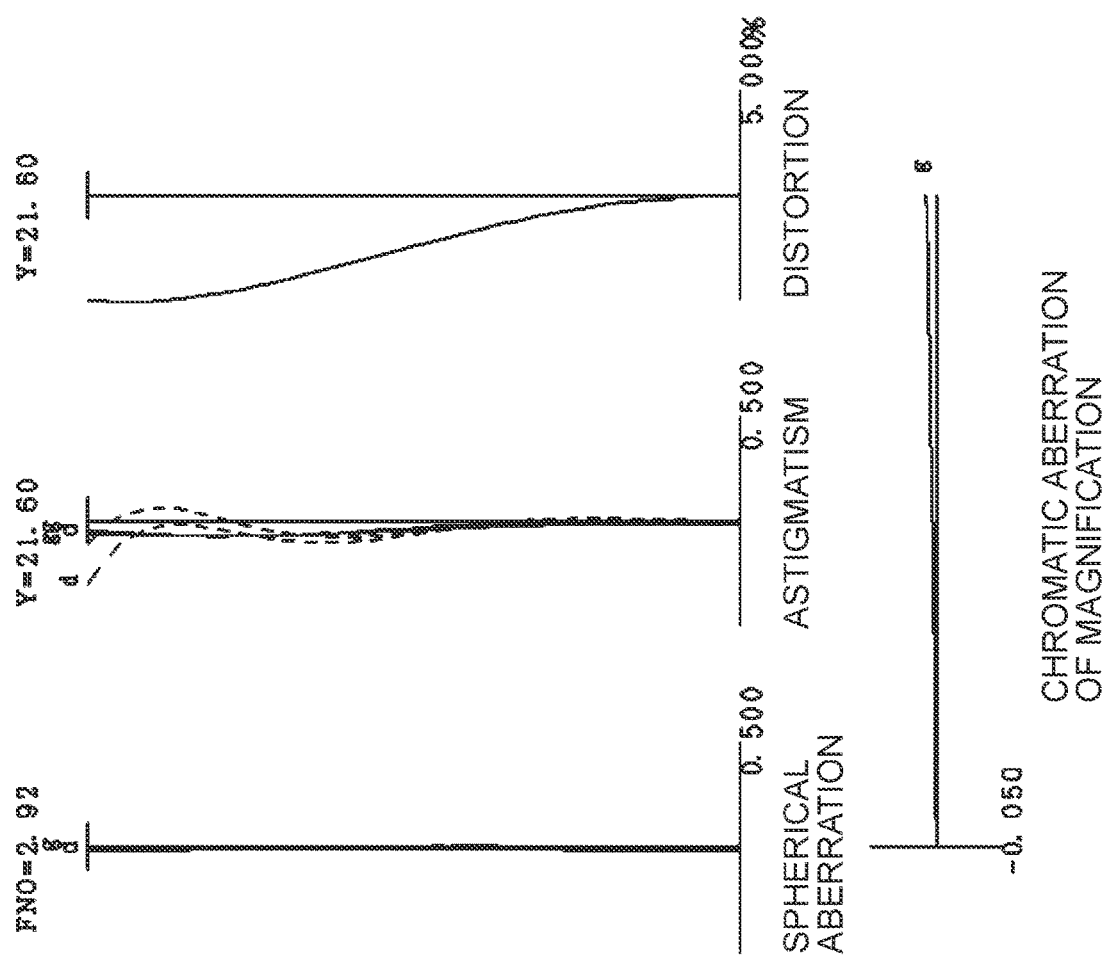
Figure 10A:
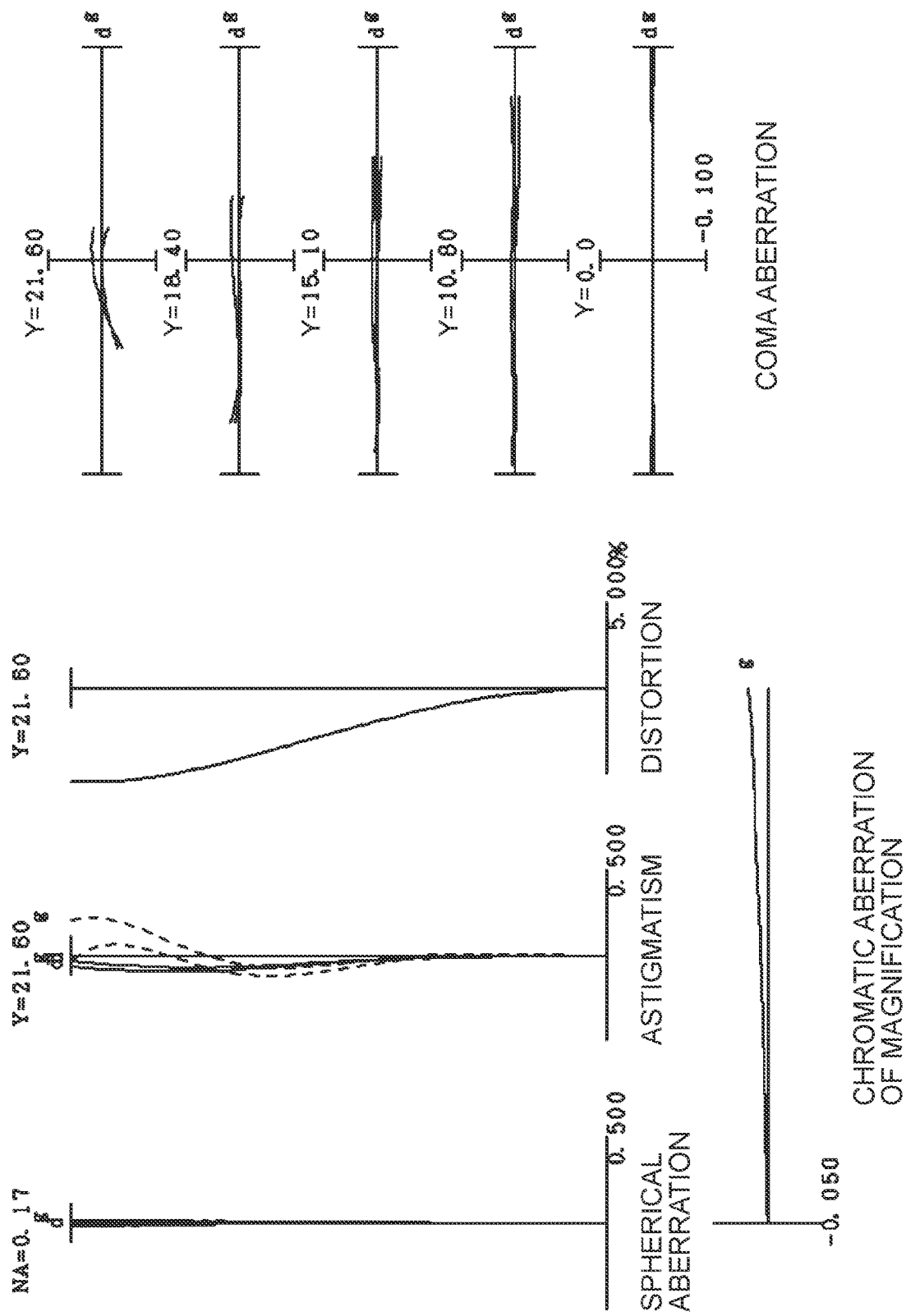
Figure 10C:
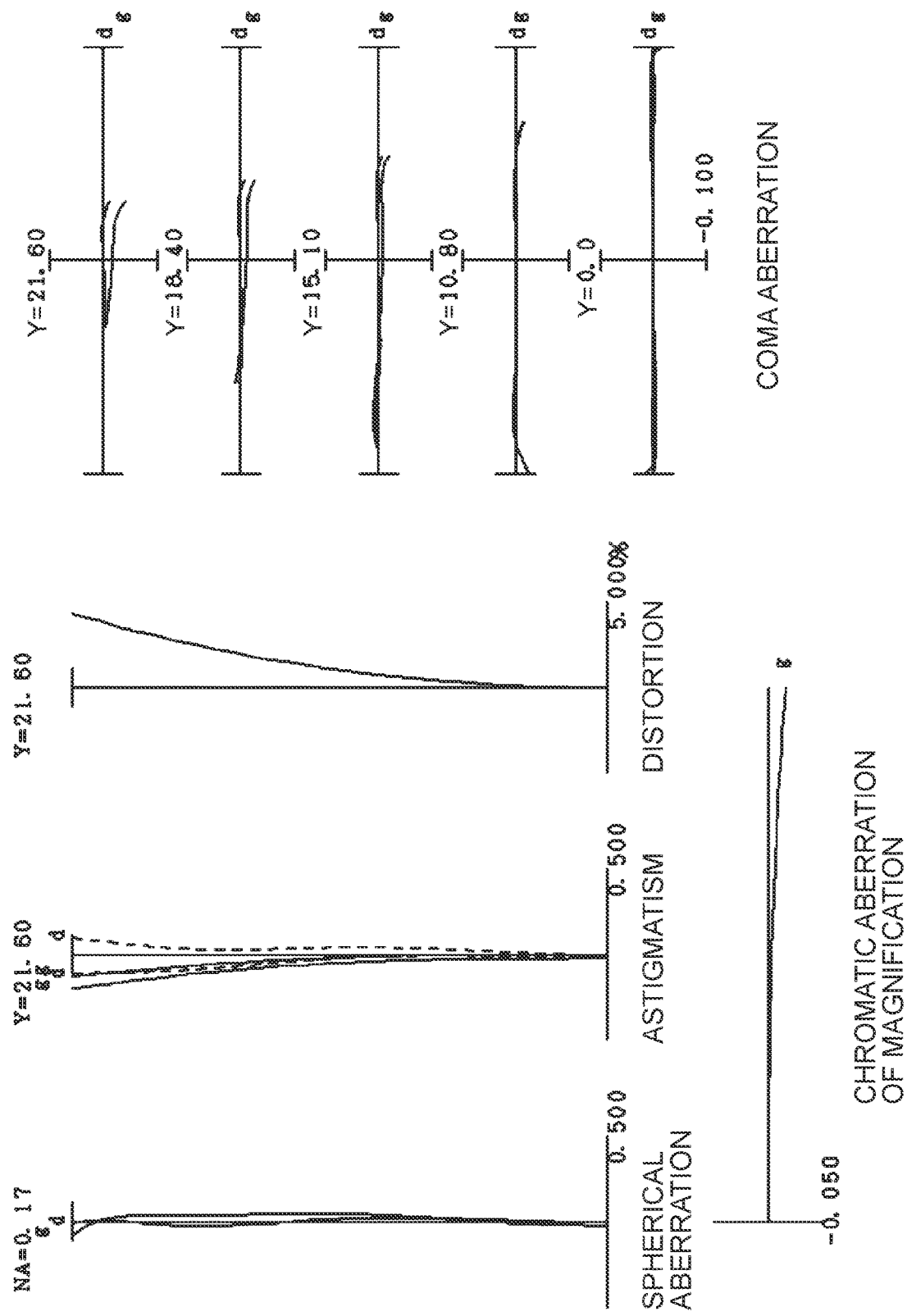

FIGS. 9A, 9B and 9C are graphs respectively showing various aberrations of the zoom optical system according to the second example upon focusing on infinity in the wide-angle end state, the intermediate focal length state and the telephoto end state. FIGS. 10A, 10B and 10C are graphs respectively showing various aberrations of the zoom optical system according to the second example upon focusing on a short-distance object in the wide-angle end state, the intermediate focal length state and the telephoto end state. The various aberration graphs show that the zoom optical system according to the second example favorably corrects the various aberrations from the wide-angle end state to the telephoto end state, has an excellent imaging performance, and also has an excellent imaging performance even upon focusing on a short-distance object.

Third Example

The third example is described with reference to FIGS. 11 to 13 and Table 3. FIG. 11 is a lens configuration diagram of a zoom optical system according to the third example. The zoom optical system ZL(3) according to the third example consists of, in order from the object: a first lens group G1 having a positive refractive power; a second lens group G2 having a negative refractive power; an aperture stop S; a third lens group G3 having a positive refractive power; a fourth lens group G4 having a positive refractive power; a fifth lens group G5 having a positive refractive power; a sixth lens group G6 having a positive refractive power; and a seventh lens group G7 having a negative refractive power. Upon zooming from the wide-angle end state (W) to the telephoto end state (T), the first to seventh lens groups G1 to G7 move in directions respectively indicated by arrows in FIG. 11, and the distances between adjacent lens groups change. A lens group that consists of the fifth lens group G5, the sixth lens group G6 and the seventh lens group G7 corresponds to a succeeding lens group GR, and has a negative refractive power as a whole.

The first lens group G1 consists of, in order from the object: a positive cemented lens that includes a negative meniscus lens L11 having a convex surface facing the object, and a biconvex positive lens L12; and a positive meniscus lens L13 having a convex surface facing the object.

The second lens group G2 consists of, in order from the object: a negative meniscus lens L21 having a convex surface facing the object; a biconcave negative lens L22; a biconvex positive lens L23; and a negative meniscus lens L24 having a concave surface facing the object. The negative meniscus lens L21 has an object-side lens surface that is an aspherical surface.

The third lens group G3 consists of, in order from the object: a positive meniscus lens L31 having a convex surface facing the object; and a biconvex positive lens L32. The aperture stop S is provided on an object-side neighborhood of the third lens group G3, and moves together with the third lens group G3 upon zooming. The positive meniscus lens L31 has an object-side lens surface that is an aspherical surface.

The fourth lens group G4 consists of a positive cemented lens that includes a negative meniscus lens L41 having a convex surface facing the object, and a biconvex positive lens L42.

The fifth lens group G5 consists of, in order from the object: a negative meniscus lens L51 having a concave surface facing the object; and a biconvex positive lens L52.

The sixth lens group G6 consists of a positive meniscus lens L61 having a concave surface facing the object. The positive meniscus lens L61 has an image-side lens surface that is an aspherical surface.

The seventh lens group G7 consists of, in order from the object: a negative meniscus lens L71 having a convex surface facing the object; a positive meniscus lens L72 having a concave surface facing the object; and a negative meniscus lens L73 having a concave surface facing the object. The negative meniscus lens L73 has an object-side lens surface that is an aspherical surface. An image surface I is disposed on the image side of the seventh lens group G7.

In this example, the fifth lens group G5 and the sixth lens group G6 are independently moved toward the object, thereby focusing from a far-distant object to a short-distance object (from an infinity object to a finite distance object). That is, the fifth lens group G5 corresponds to the first focusing lens group, and the sixth lens group G6 corresponds to the second focusing lens group. The fourth lens group G4 corresponds to the object side lens group, and the seventh lens group G7 corresponds to the image side lens group.

Although illustration is omitted in FIG. 11, the cylindrical member (for example, the cylindrical member 100 shown in FIGS. 1 and 2) is disposed between the fourth lens group G4 and the seventh lens group G7. The fifth lens group G5 and the sixth lens group G6 are disposed on the inner diameter side of the cylindrical member. The cylindrical member moves toward the object upon zooming from the wide-angle end state (W) to the telephoto end state (T). The five group drive motor and the six group drive motor fixed to the cylindrical member respectively allow the fifth lens group G5 and the sixth lens group G6 to move relatively in the optical axis direction with respect to the cylindrical member. Accordingly, upon zooming, the amount of relative movement in the optical axis direction with respect to the image surface I can be different between the fifth lens group G5 and the sixth lens group G6, and the cylindrical member. Upon zooming or focusing, the amount of relative movement in the optical axis direction with respect to the image surface I can be different between the fifth lens group G5 and the sixth lens group G6.

The following Table 3 lists values of data on the zoom optical system according to the third example.

TABLE 3

[General Data]

Zooming ratio 3.33
MTF1 = −1.344
MTF2 = −0.999
βTF1 = 0.732
βTF2 = 0.841
dA = 16.129
dB = 17.350
dD = 31.352
dE = 19.030

|  | W | M | T |
|---|---|---|---|
| f | 24.8 | 50.0 | 82.5 |
| FNO | 2.92 | 2.92 | 2.92 |
| 2ω | 85.12 | 45.44 | 28.34 |
| Ymax | 21.60 | 21.60 | 21.60 |
| TL | 150.97 | 164.85 | 185.45 |
| BF | 11.75 | 21.93 | 30.78 |

[Lens Data]

| Surface Number | R | D | nd | νd |
|---|---|---|---|---|
| Object Surface | ∞ |  |  |  |
| 1 | 454.1335 | 2.500 | 1.94594 | 17.98 |
| 2 | 158.8346 | 5.629 | 1.81600 | 46.59 |
| 3 | −1850.8518 | 0.200 |  |  |
| 4 | 62.5732 | 5.149 | 1.81600 | 46.59 |
| 5 | 111.4228 | D5(Variable) |  |  |
| 6* | 143.7538 | 2.000 | 1.81600 | 46.59 |
| 7 | 20.1321 | 9.695 |  |  |
| 8 | −48.3009 | 2.346 | 1.88300 | 40.66 |
| 9 | 156.4679 | 0.200 |  |  |
| 10 | 65.6396 | 6.565 | 1.80518 | 25.45 |
| 11 | −42.2522 | 2.354 |  |  |
| 12 | −26.3896 | 1.200 | 1.69680 | 55.52 |
| 13 | −61.8795 | D13(Variable) |  |  |

TABLE 3-continued

[General Data]

| | | | | |
|---|---|---|---|---|
| 14 | ∞ | 1.500 | | (Aperture Stop S) |
| 15* | 46.9137 | 2.985 | 1.81600 | 46.59 |
| 16 | 79.9069 | 0.200 | | |
| 17 | 56.4482 | 6.543 | 1.49782 | 82.57 |
| 18 | −69.0474 | D18(Variable) | | |
| 19 | 78.4165 | 1.300 | 1.90366 | 31.27 |
| 20 | 26.6178 | 9.263 | 1.59319 | 67.90 |
| 21 | −58.5857 | D21(Variable) | | |
| 22 | −29.0948 | 1.200 | 1.80100 | 34.92 |
| 23 | −53.3089 | 2.957 | | |
| 24 | 64.8393 | 6.500 | 1.48749 | 70.32 |
| 25 | −36.2810 | D25(Variable) | | |
| 26 | −486.6338 | 2.667 | 1.58887 | 61.13 |
| 27* | −77.9833 | D27(Variable) | | |
| 28 | 208.9420 | 1.200 | 1.90366 | 31.27 |
| 29 | 40.1016 | 3.903 | | |
| 30 | −103.6980 | 6.199 | 1.84666 | 23.80 |
| 31 | −35.7067 | 3.104 | | |
| 32* | −19.6292 | 1.500 | 1.81600 | 46.59 |
| 33 | −40.5502 | BF | | |
| Image Surface | ∞ | | | |

[Aspherical Surface Data]

6th Surface

K = 1.0000, A4 = 4.25283E−06, A6 = −2.28156E−09
A8 = −7.12258E−14, A10 = 7.16065E−15, A12 = 0.00000E+00

15th Surface

K = 1.0000, A4 = −3.75837E−06, A6 = 9.56813E−10
A8 = −1.31531E−12, A10 = 1.97978E−16, A12 = 0.00000E+00

27th Surface

K = 1.0000, A4 = 1.09037E−05, A6 = −5.09501E−11
A8 = −1.76649E−12, A10 = 1.58609E−14, A12 = 0.00000E+00

32nd Surface

K = 1.0000, A4 = 1.01091E−05, A6 = 1.61408E−08
A8 = 3.76726E−12, A10 = 1.25182E−13, A12 = 0.00000E+00

[Lens Group Data]

| Group | First surface | Focal length |
|---|---|---|
| G1 | 1 | 130.092 |
| G2 | 6 | −23.049 |
| G3 | 14 | 44.414 |
| G4 | 19 | 100.000 |
| G5 | 22 | 98.812 |
| G6 | 26 | 157.320 |
| G7 | 28 | −42.703 |

[Variable Distance Data]

| | W Infinity | M Infinity | T Infinity | W Short-distance | M Short-distance | T Short-distance |
|---|---|---|---|---|---|---|
| D5 | 2.000 | 21.323 | 36.906 | 2.000 | 21.323 | 36.906 |
| D13 | 25.662 | 7.746 | 2.000 | 25.662 | 7.746 | 2.000 |
| D18 | 9.597 | 5.312 | 1.500 | 9.597 | 5.312 | 1.500 |
| D21 | 6.192 | 11.864 | 21.415 | 5.303 | 10.833 | 20.070 |
| D25 | 2.000 | 3.105 | 2.000 | 2.411 | 3.415 | 2.346 |
| D27 | 4.901 | 4.716 | 2.000 | 5.379 | 5.438 | 2.999 |

[Conditional Expression Corresponding Value]

Conditional Expression(1) dL0t/dL1t = 0.667
Conditional Expression(2) dF0t/dF1t = 0.830
Conditional Expression(3) dA/dB = 0.930
Conditional Expression(4) dB/dE = 0.912
Conditional Expression(5) dB/dD = 0.553
Conditional Expression(6) fF1/fF2 = 0.628

TABLE 3-continued

[General Data]

Conditional Expression(7) MTF1/MTF2 = 1.346
Conditional Expression(8) |βTF1|/|βTF2| = 0.870
Conditional Expression(9) |fF|/ft = 1.907

Figure 12A:
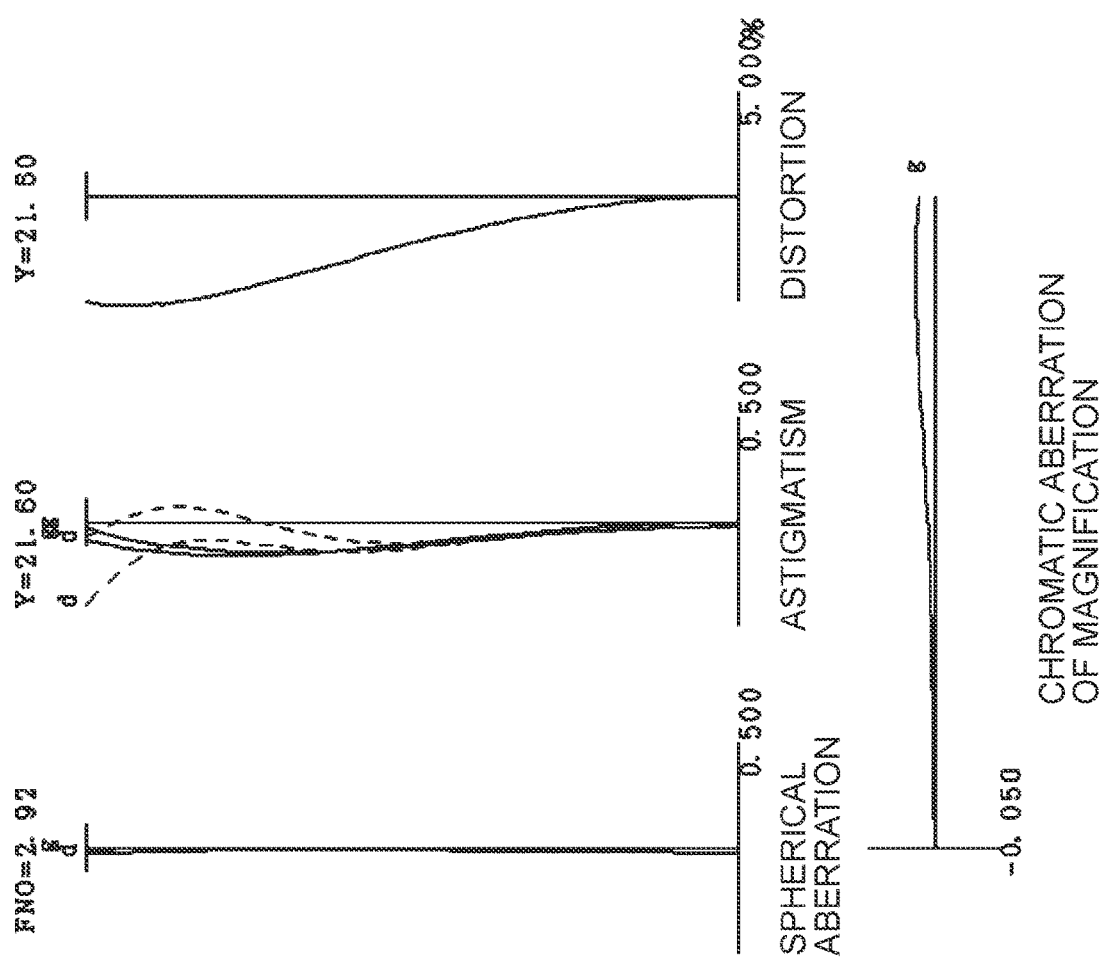
Figure 13A:
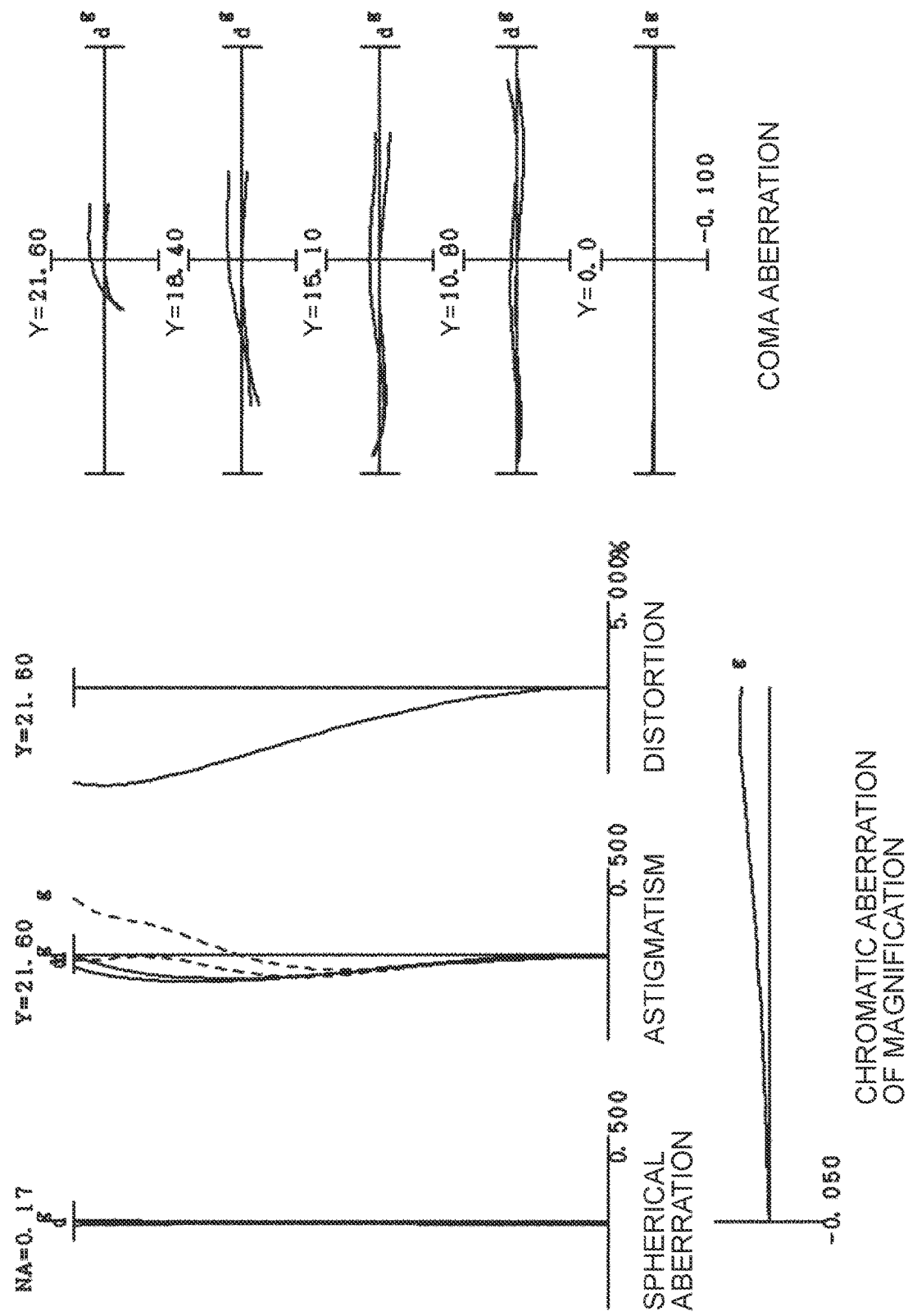

FIGS. 12A, 12B and 12C are graphs respectively showing various aberrations of the zoom optical system according to the third example upon focusing on infinity in the wide-angle end state, the intermediate focal length state and the telephoto end state. FIGS. 13A, 13B and 13C are graphs respectively showing various aberrations of the zoom optical system according to the third example upon focusing on a short-distance object in the wide-angle end state, the intermediate focal length state and the telephoto end state. The various aberration graphs show that the zoom optical system according to the third example favorably corrects the various aberrations from the wide-angle end state to the telephoto end state, has an excellent imaging performance, and also has an excellent imaging performance even upon focusing on a short-distance object.

Fourth Example

The fourth example is described with reference to FIGS. 14 to 16 and Table 4. FIG. 14 is a lens configuration diagram of a zoom optical system according to the fourth example. The zoom optical system ZL(4) according to the fourth example consists of: a first lens group G1 having a positive refractive power; a second lens group G2 having a negative refractive power; an aperture stop S; a third lens group G3 having a positive refractive power; a fourth lens group G4 having a positive refractive power; a fifth lens group G5 having a positive refractive power; and a sixth lens group G6 having a negative refractive power, these elements being disposed in order from an object. Upon zooming from the wide-angle end state (W) to the telephoto end state (T), the first to sixth lens groups G1 to G6 move in directions respectively indicated by arrows in FIG. 14, and the distances between adjacent lens groups change. A lens group that consists of the fifth lens group G5 and the sixth lens group G6 corresponds to a succeeding lens group GR, and has a negative refractive power as a whole.

The first lens group G1 consists of, in order from the object: a positive cemented lens that includes a negative meniscus lens L11 having a convex surface facing the object, and a positive meniscus lens L12 having a convex surface facing the object; and a positive meniscus lens L13 having a convex surface facing the object.

The second lens group G2 consists of, in order from the object: a negative meniscus lens L21 having a convex surface facing the object; a biconcave negative lens L22; a biconvex positive lens L23; and a negative meniscus lens L24 having a concave surface facing the object. The negative meniscus lens L21 has an object-side lens surface that is an aspherical surface.

The third lens group G3 consists of, in order from the object: a positive meniscus lens L31 having a convex surface facing the object; and a biconvex positive lens L32. The aperture stop S is provided on an object-side neighborhood of the third lens group G3, and moves together with the third lens group G3 upon zooming. The positive meniscus lens L31 has an object-side lens surface that is an aspherical surface.

The fourth lens group G4 consists of a positive cemented lens that includes a negative meniscus lens L41 having a convex surface facing the object, and a biconvex positive lens L42.

The fifth lens group G5 consists of, in order from the object: a negative meniscus lens L51 having a concave surface facing the object; a biconvex positive lens L52; and a positive meniscus lens L53 having a concave surface facing the object. The positive meniscus lens L53 has an image-side lens surface that is an aspherical surface.

The sixth lens group G6 consists of, in order from the object: a positive meniscus lens L61 having a concave surface facing the object; a biconcave negative lens L62; and a negative meniscus lens L63 having a concave surface facing the object. The negative lens L62 has an object-side lens surface that is an aspherical surface. An image surface I is disposed on the image side of the sixth lens group G6.

In this example, the fifth lens group G5 is moved toward the object, thereby focusing from a far-distant object to a short-distance object (from an infinity object to a finite distance object). That is, the fifth lens group G5 corresponds to the focusing lens group. The fourth lens group G4 corresponds to the object side lens group, and the sixth lens group G6 corresponds to the image side lens group.

Although illustration is omitted in FIG. 14, the cylindrical member (for example, the cylindrical member 100 shown in FIGS. 1 and 2) is disposed between the fourth lens group G4 and the sixth lens group G6. The fifth lens group G5 is disposed on the inner diameter side of the cylindrical member. The cylindrical member moves toward the object upon zooming from the wide-angle end state (W) to the telephoto end state (T). The five group drive motor fixed to the cylindrical member allows the fifth lens group G5 to move relatively in the optical axis direction with respect to the cylindrical member. Accordingly, upon zooming, the amount of relative movement in the optical axis direction with respect to the image surface I can be different between the fifth lens group G5 and the cylindrical member.

The following Table 4 lists values of data on the zoom optical system according to the fourth example.

TABLE 4

[General Data]

Zooming ratio 2.75
dA = 14.487
dB = 17.350
dD = 26.776
dE = 18.460

| | W | M | T |
|---|---|---|---|
| f | 24.7 | 50.0 | 67.9 |
| FNO | 2.92 | 2.92 | 2.92 |
| 2ω | 85.08 | 45.26 | 33.84 |
| Ymax | 21.60 | 21.60 | 21.60 |
| TL | 139.95 | 154.92 | 168.36 |
| BF | 11.75 | 26.42 | 30.21 |

[Lens Data]

| Surface Number | R | D | nd | νd |
|---|---|---|---|---|
| Object Surface | ∞ | | | |
| 1 | 500.0000 | 2.500 | 1.84666 | 23.80 |
| 2 | 128.5654 | 5.629 | 1.77250 | 49.62 |
| 3 | 1528.3565 | 0.200 | | |
| 4 | 51.0685 | 4.893 | 1.81600 | 46.59 |
| 5 | 84.5957 | D5(Variable) | | |
| 6* | 150.2756 | 2.000 | 1.74389 | 49.53 |
| 7 | 19.5218 | 9.332 | | |
| 8 | −70.5990 | 1.300 | 1.83481 | 42.73 |
| 9 | 68.8663 | 0.377 | | |
| 10 | 44.7171 | 5.665 | 1.78472 | 25.64 |
| 11 | −66.3119 | 4.463 | | |
| 12 | −25.4625 | 1.300 | 1.60300 | 65.44 |
| 13 | −54.4747 | D13(Variable) | | |
| 14 | ∞ | 1.500 | | (Aperture Stop S) |
| 15* | 93.5557 | 2.758 | 1.58913 | 61.15 |
| 16 | 731.3943 | 0.200 | | |
| 17 | 45.8800 | 5.212 | 1.59319 | 67.90 |
| 18 | −126.9127 | D18(Variable) | | |
| 19 | 57.2400 | 1.300 | 1.73800 | 32.33 |
| 20 | 21.3782 | 8.742 | 1.49782 | 82.57 |
| 21 | −52.7685 | D21(Variable) | | |
| 22 | −23.6692 | 1.200 | 1.73800 | 32.33 |
| 23 | −59.4644 | 0.200 | | |
| 24 | 110.3346 | 5.800 | 1.59349 | 67.00 |
| 25 | −32.1046 | 4.444 | | |
| 26 | −114.5585 | 3.326 | 1.74389 | 49.53 |
| 27* | −41.8456 | D27(Variable) | | |
| 28 | −51.0521 | 2.929 | 1.94594 | 17.98 |
| 29 | −33.3238 | 0.200 | | |
| 30* | −98.8101 | 1.500 | 1.85108 | 40.12 |
| 31 | 58.4711 | 6.329 | | |
| 32 | −25.4692 | 1.400 | 1.69680 | 55.52 |
| 33 | −42.7921 | BF | | |
| Image Surface | ∞ | | | |

[Aspherical Surface Data]

6th Surface

K = 1.0000, A4 = 4.65692E−06, A6 = −1.64542E−09
A8 = 3.72186E−13, A10 = 4.82369E−15, A12 = 0.00000E+00

15th Surface

K = 1.0000, A4 = −3.70657E−06, A6 = 3.18672E−09
A8 = −1.82835E−11, A10 = 3.59863E−14, A12 = 0.00000E+00

27th Surface

K = 1.0000, A4 = 1.13375E−05, A6 = −1.49475E−08
A8 = 6.38011E−11, A10 = −1.10074E−13, A12 = 0.00000E+00

30th Surface

K = 1.0000, A4 = −5.84233E−06, A6 = −2.49185E−08
A8 = 2.26680E−11, A10 = −7.54165E−14, A12 = 0.00000E+00

[Lens Group Data]

| Group | First surface | Focal length |
|---|---|---|
| G1 | 1 | 136.259 |
| G2 | 6 | −23.493 |
| G3 | 14 | 44.223 |
| G4 | 19 | 90.807 |
| G5 | 22 | 53.777 |
| G6 | 28 | −40.364 |

[Variable Distance Data]

| | W Infinity | M Infinity | T Infinity | W Short-distance | M Short-distance | T Short-distance |
|---|---|---|---|---|---|---|
| D5 | 2.000 | 16.966 | 30.403 | 2.000 | 16.966 | 30.403 |
| D13 | 20.342 | 6.266 | 2.000 | 20.342 | 6.266 | 2.000 |
| D18 | 10.475 | 3.778 | 2.048 | 10.475 | 3.778 | 2.048 |
| D21 | 4.711 | 14.758 | 17.000 | 4.046 | 13.957 | 16.055 |
| D27 | 5.973 | 2.030 | 2.000 | 6.639 | 2.831 | 2.945 |

[Conditional Expression Corresponding Value]

Conditional Expression(1) dL0t/dL1t = 0.679
Conditional Expression(3) dA/dB = 0.835
Conditional Expression(4) dB/dE = 0.940

TABLE 4-continued

[General Data]

Conditional Expression(5) dB/dD = 0.648
Conditional Expression(9) |fF|/ft = 0.792

Figure 16A:
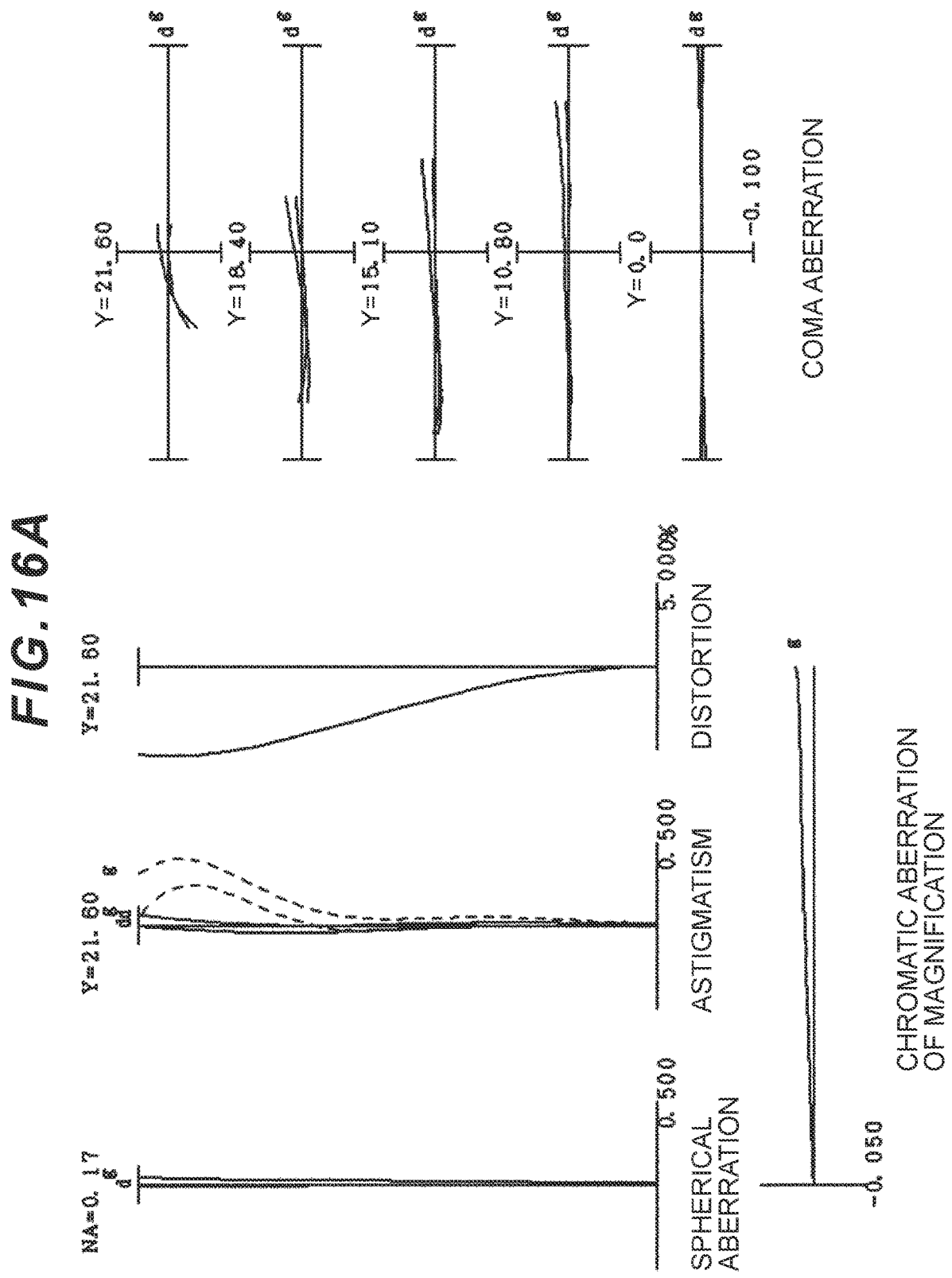
Figure 16B:
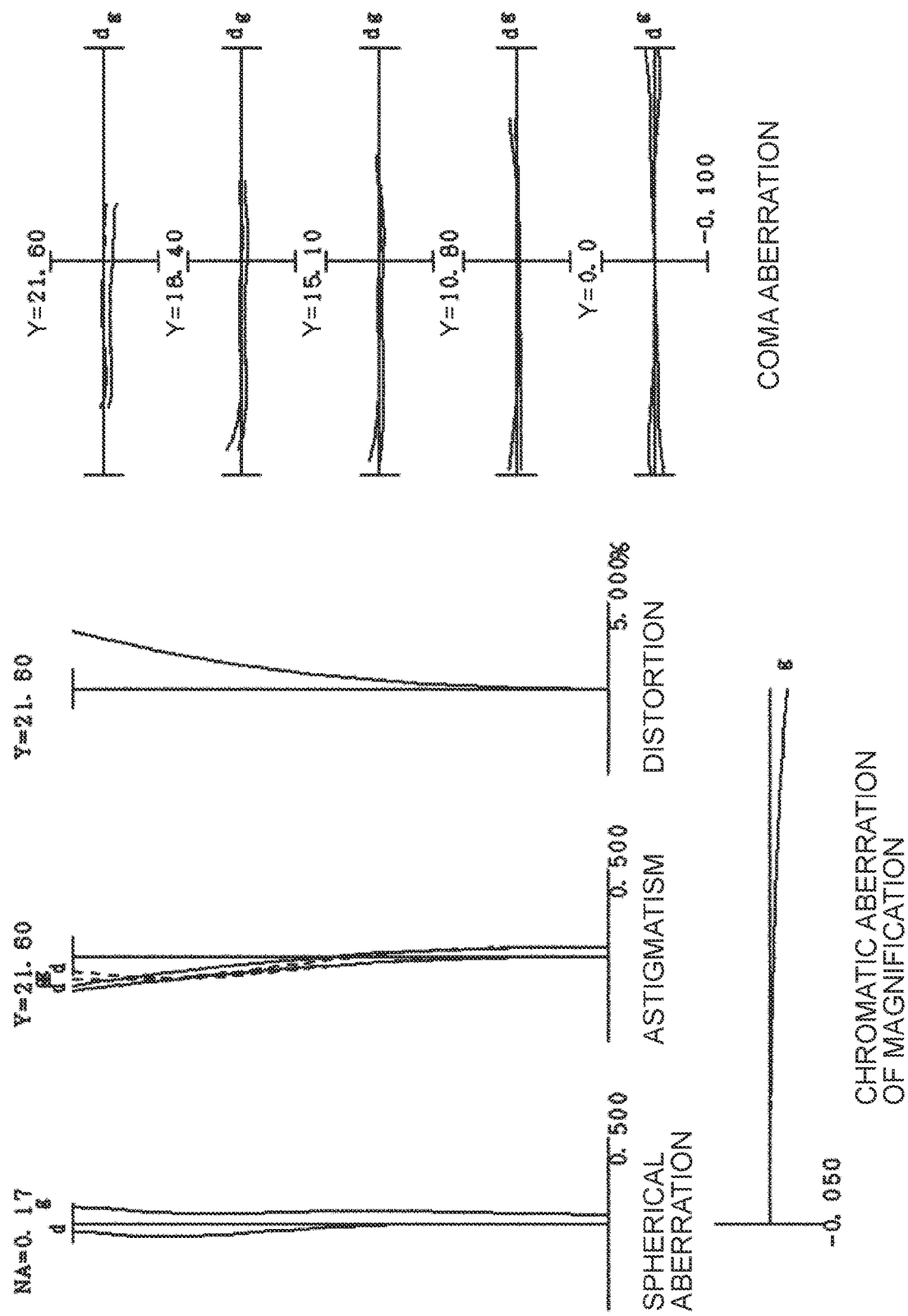

FIGS. 15A, 15B and 15C are graphs respectively showing various aberrations of the zoom optical system according to the fourth example upon focusing on infinity in the wide-angle end state, the intermediate focal length state and the telephoto end state. FIGS. 16A, 16B and 16C are graphs respectively showing various aberrations of the zoom optical system according to the fourth example upon focusing on a short-distance object in the wide-angle end state, the intermediate focal length state and the telephoto end state. The various aberration graphs show that the zoom optical system according to the fourth example favorably corrects the various aberrations from the wide-angle end state to the telephoto end state, has an excellent imaging performance, and also has an excellent imaging performance even upon focusing on a short-distance object.

Fifth Example

The fifth example is described with reference to FIGS. 17 to 19 and Table 5. FIG. 17 is a lens configuration diagram of a zoom optical system according to the fifth example. The zoom optical system ZL(5) according to the fifth example consists of, in order from the object: a first lens group G1 having a positive refractive power; a second lens group G2 having a negative refractive power; an aperture stop S; a third lens group G3 having a positive refractive power; a fourth lens group G4 having a positive refractive power; a fifth lens group G5 having a negative refractive power; and a sixth lens group G6 having a positive refractive power. Upon zooming from the wide-angle end state (W) to the telephoto end state (T), the first to sixth lens groups G1 to G6 move in directions respectively indicated by arrows in FIG. 17, and the distances between adjacent lens groups change. A lens group that consists of the fifth lens group G5 and the sixth lens group G6 corresponds to a succeeding lens group GR, and has a negative refractive power as a whole.

The first lens group G1 consists of, in order from the object: a negative cemented lens that includes a negative meniscus lens L11 having a convex surface facing the object, and a biconvex positive lens L12; and a positive meniscus lens L13 having a convex surface facing the object.

The second lens group G2 consists of, in order from the object: a negative meniscus lens L21 having a convex surface facing the object; a biconcave negative lens L22; a positive meniscus lens L23 having a convex surface facing the object; and a negative meniscus lens L24 having a concave surface facing the object. The negative meniscus lens L21 has an object-side lens surface that is an aspherical surface.

The third lens group G3 consists of, in order from the object: a positive meniscus lens L31 having a convex surface facing the object; and a biconvex positive lens L32. The aperture stop S is provided on an object-side neighborhood of the third lens group G3, and moves together with the third lens group G3 upon zooming. The positive meniscus lens L31 has an object-side lens surface that is an aspherical surface.

The fourth lens group G4 consists of, in order from the object: a biconvex positive lens L41; a negative cemented lens that includes a biconcave negative lens L42, and a biconvex positive lens L43; and a biconvex positive lens L44. The positive lens L41 has an object-side lens surface that is an aspherical surface. The positive lens L44 has an image-side lens surface that is an aspherical surface.

The fifth lens group G5 consists of, in order from the object: a positive meniscus lens L51 having a concave surface facing the object; a biconcave negative lens L52; and a biconcave negative lens L53. The negative lens L53 has an object-side lens surface that is an aspherical surface.

The sixth lens group G6 consists of a biconvex positive lens L61. An image surface I is disposed on the image side of the sixth lens group G6.

In this example, the fifth lens group G5 is moved toward the image I, thereby focusing from a far-distant object to a short-distance object (from an infinity object to a finite distance object). That is, the fifth lens group G5 corresponds to the focusing lens group. The fourth lens group G4 corresponds to the object side lens group, and the sixth lens group G6 corresponds to the image side lens group.

Although illustration is omitted in FIG. 17, the cylindrical member (for example, the cylindrical member 100 shown in FIGS. 1 and 2) is disposed between the fourth lens group G4 and the sixth lens group G6. The fifth lens group G5 is disposed on the inner diameter side of the cylindrical member. The cylindrical member moves toward the object upon zooming from the wide-angle end state (W) to the telephoto end state (T). The five group drive motor fixed to the cylindrical member allows the fifth lens group G5 to move relatively in the optical axis direction with respect to the cylindrical member. Accordingly, upon zooming, the amount of relative movement in the optical axis direction with respect to the image surface I can be different between the fifth lens group G5 and the cylindrical member.

The following Table 5 lists values of data on the zoom optical system according to the fifth example.

TABLE 5

[General Data]

Zooming ratio 2.75
dA = 31.138
dB = 17.350
dD = 29.976
dE = 21.280

| | W | M | T |
|---|---|---|---|
| f | 24.7 | 50.0 | 67.9 |
| FNO | 2.92 | 2.92 | 2.92 |
| 2ω | 85.16 | 45.24 | 34.12 |
| Ymax | 21.60 | 21.60 | 21.60 |
| TL | 134.73 | 154.61 | 169.45 |
| BF | 13.56 | 26.94 | 34.84 |

[Lens Data]

| Surface Number | R | D | nd | νd |
|---|---|---|---|---|
| Object Surface | ∞ | | | |
| 1 | 10957.4900 | 2.500 | 1.84666 | 23.80 |
| 2 | 273.2507 | 3.923 | 1.59319 | 67.90 |
| 3 | −4164.8091 | 0.200 | | |
| 4 | 97.8909 | 5.850 | 1.81600 | 46.59 |
| 5 | 1686.5488 | D5(Variable) | | |
| 6* | 500.0000 | 2.000 | 1.67798 | 54.89 |
| 7 | 19.6217 | 7.571 | | |
| 8 | −119.4257 | 1.200 | 1.59319 | 67.90 |
| 9 | 74.2767 | 0.211 | | |
| 10 | 36.8572 | 5.028 | 1.85000 | 27.03 |
| 11 | 146.1931 | 4.217 | | |
| 12 | −25.9063 | 1.200 | 1.60300 | 65.44 |

TABLE 5-continued

[General Data]

| | | | | |
|---|---|---|---|---|
| 13 | −48.3220 | D13(Variable) | | |
| 14 | ∞ | 1.500 | | (Aperture Stop S) |
| 15* | 31.8609 | 3.346 | 1.79504 | 28.69 |
| 16 | 60.3817 | 1.288 | | |
| 17 | 65.3208 | 3.503 | 1.49782 | 82.57 |
| 18 | −22831.8850 | D18(Variable) | | |
| 19* | 52.1943 | 4.361 | 1.82098 | 42.50 |
| 20 | −99.8775 | 0.663 | | |
| 21 | −484.1811 | 1.200 | 1.85478 | 24.80 |
| 22 | 19.0497 | 8.079 | 1.49782 | 82.57 |
| 23 | −86.9834 | 3.675 | | |
| 24 | 61.0249 | 5.155 | 1.80604 | 40.74 |
| 25* | −60.8291 | D25(Variable) | | |
| 26 | −310.5249 | 2.912 | 1.94594 | 17.98 |
| 27 | −59.5174 | 0.200 | | |
| 28 | −155.6589 | 1.200 | 1.77250 | 49.62 |
| 29 | 30.4299 | 6.880 | | |
| 30* | −54.7368 | 1.300 | 1.95150 | 29.83 |
| 31 | 317.1233 | D31(Variable) | | |
| 32 | 72.1520 | 4.819 | 1.83481 | 42.73 |
| 33 | −315.4491 | BF | | |
| Image Surface | ∞ | | | |

[Aspherical Surface Data]

6th Surface

K = 1.0000, A4 = 5.57412E−06, A6 = −5.71627E−09
A8 = 9.08385E−12, A10 = −4.74214E−15, A12 = 0.00000E+00

15th Surface

K = 1.0000, A4 = −5.90450E−06, A6 = 3.98445E−09
A8 = −4.29920E−11, A10 = 9.10161E−14, A12 = 0.00000E+00

19th Surface

K = 1.0000, A4 = −5.71112E−06, A6 = −6.16170E−10
A8 = 2.42198E−11, A10 = −5.71940E−14, A12 = 0.00000E+00

25th Surface

K = 1.0000, A4 = 2.37352E−06, A6 = −6.63258E−09
A8 = −2.39696E−11, A10 = 1.99908E−14, A12 = 0.00000E+00

30th Surface

K = 1.0000, A4 = −6.17314E−06, A6 = −3.26346E−08
A8 = 1.32620E−10, A10 = −6.33629E−13, A12 = 0.00000E+00

[Lens Group Data]

| Group | First surface | Focal length |
|---|---|---|
| G1 | 1 | 139.410 |
| G2 | 6 | −23.353 |
| G3 | 14 | 51.116 |
| G4 | 19 | 31.271 |
| G5 | 26 | −24.892 |
| G6 | 32 | 70.741 |

[Variable Distance Data]

| | W Infinity | M Infinity | T Infinity | W Short-distance | M Short-distance | T Short-distance |
|---|---|---|---|---|---|---|
| D5 | 2.000 | 21.443 | 31.758 | 2.000 | 21.443 | 31.758 |
| D13 | 19.908 | 6.376 | 2.000 | 19.908 | 6.376 | 2.000 |
| D18 | 9.100 | 3.184 | 2.000 | 9.100 | 3.184 | 2.000 |
| D25 | 3.162 | 2.189 | 2.000 | 3.569 | 2.602 | 2.454 |
| D31 | 3.023 | 10.499 | 12.881 | 2.616 | 10.087 | 12.426 |

[Conditional Expression Corresponding Value]

Conditional Expression(3) dA/dB = 1.795
Conditional Expression(4) dB/dE = 0.815
Conditional Expression(5) dB/dD = 0.579
Conditional Expression(9) |fF|/ft = 0.367

Figure 18C:
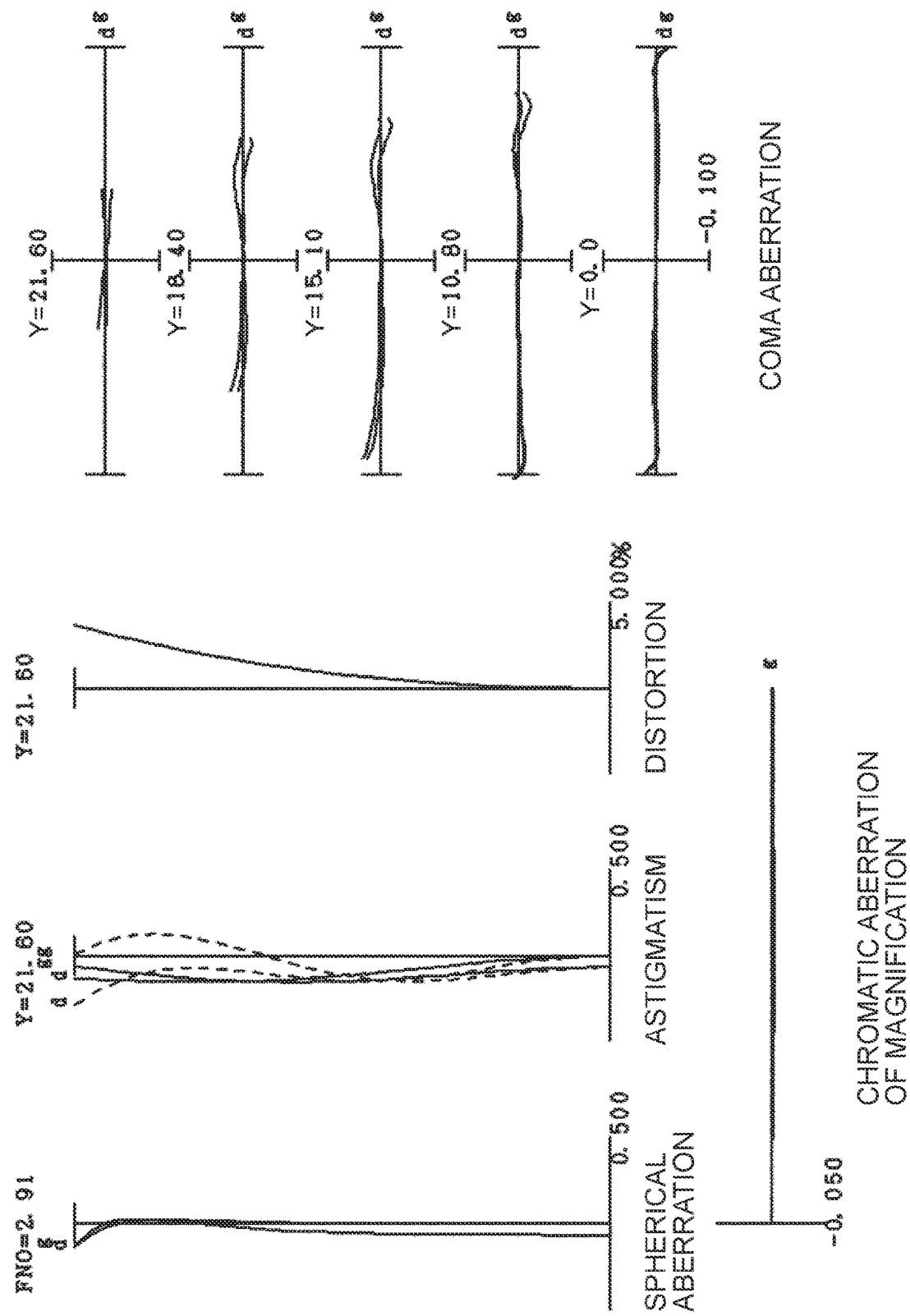
Figure 19A:
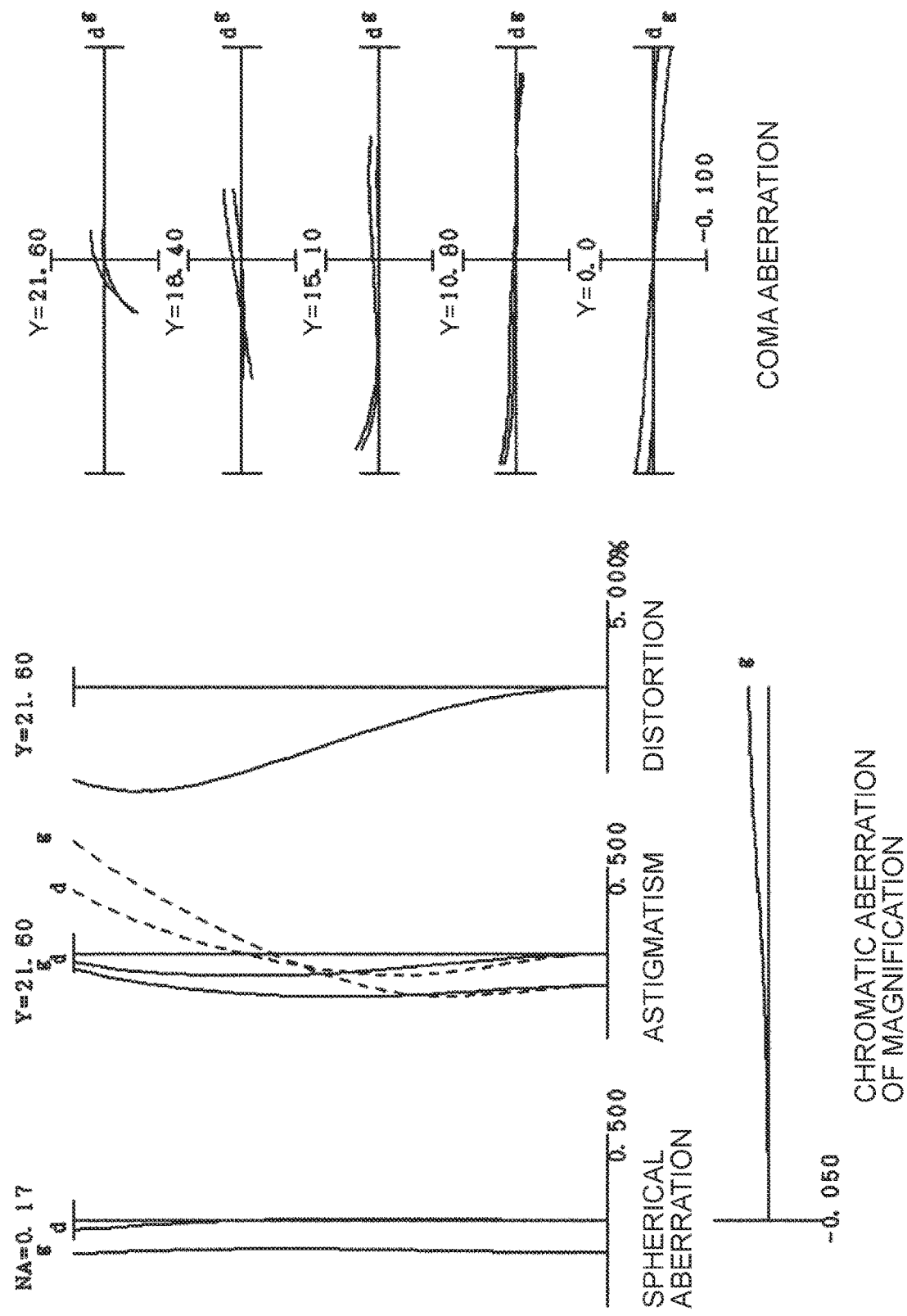

FIGS. 18A, 18B and 18C are graphs respectively showing various aberrations of the zoom optical system according to the fifth example upon focusing on infinity in the wide-angle end state, the intermediate focal length state and the telephoto end state. FIGS. 19A, 19B and 19C are graphs respectively showing various aberrations of the zoom optical system according to the fifth example upon focusing on a short-distance object in the wide-angle end state, the intermediate focal length state and the telephoto end state. The various aberration graphs show that the zoom optical system according to the fifth example favorably corrects the various aberrations from the wide-angle end state to the telephoto end state, has an excellent imaging performance, and also has an excellent imaging performance even upon focusing on a short-distance object.

Sixth Example

Figure 20:
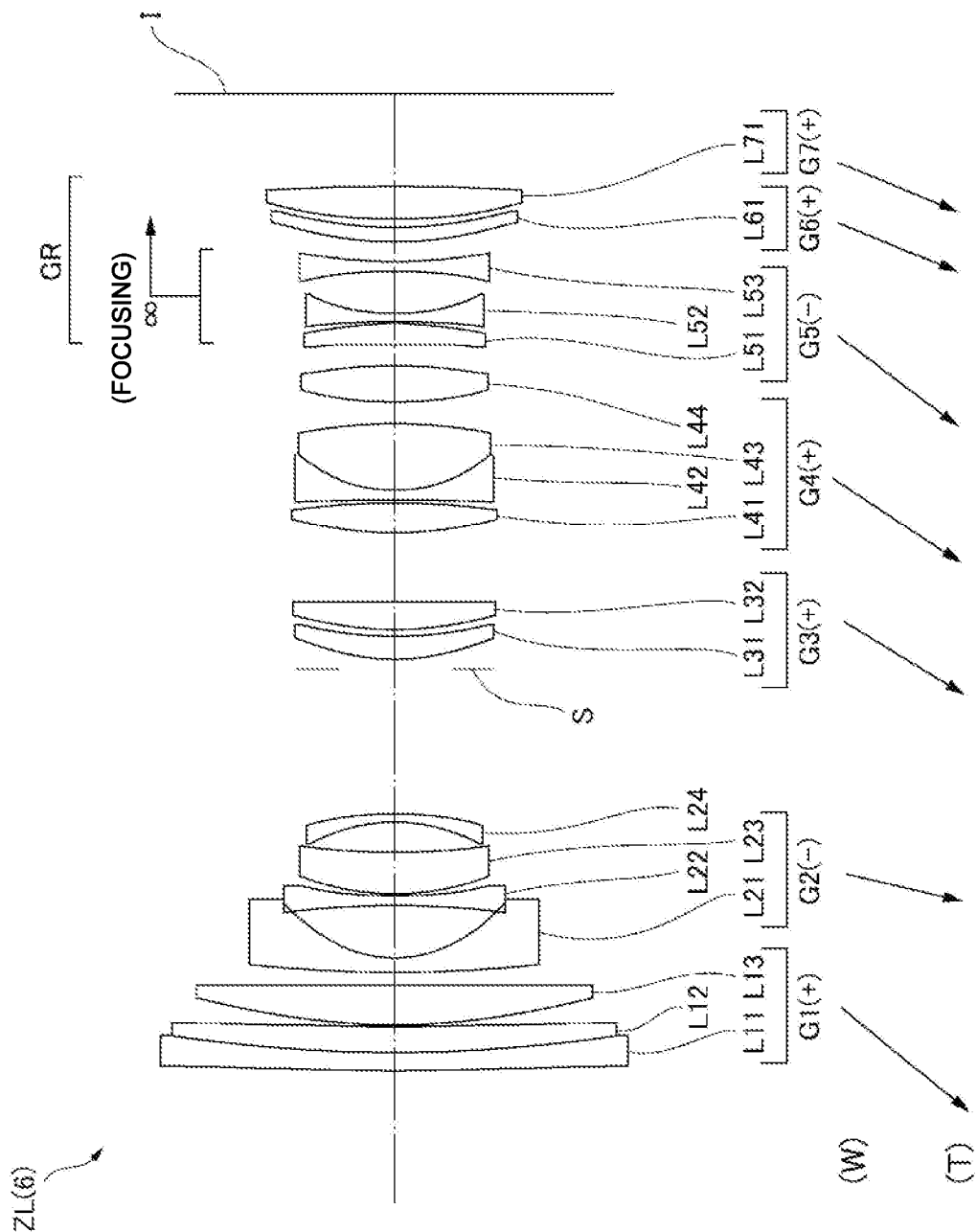
FIG. 20 is a lens configuration diagram of a zoom optical system according to a sixth example.

The sixth example is described with reference to FIGS. 20 to 22 and Table 6. FIG. 20 is a lens configuration diagram of a zoom optical system according to the sixth example. The zoom optical system ZL(6) according to the sixth example consists of, in order from the object: a first lens group G1 having a positive refractive power; a second lens group G2 having a negative refractive power; an aperture stop S; a third lens group G3 having a positive refractive power; a fourth lens group G4 having a positive refractive power; a fifth lens group G5 having a negative refractive power; a sixth lens group G6 having a positive refractive power; and a seventh lens group G7 having a positive refractive power. Upon zooming from the wide-angle end state (W) to the telephoto end state (T), the first to seventh lens groups G1 to G7 move in directions respectively indicated by arrows in FIG. 20, and the distances between adjacent lens groups change. A lens group that consists of the fifth lens group G5, the sixth lens group G6 and the seventh lens group G7 corresponds to a succeeding lens group GR, and has a negative refractive power as a whole.

The first lens group G1 consists of: a negative cemented lens that includes a negative meniscus lens L11 having a convex surface facing the object, and a positive meniscus lens L12 having a convex surface facing the object; and a positive meniscus lens L13 having a convex surface facing the object, the lenses being disposed in order from the object.

The second lens group G2 consists of, in order from the object: a negative meniscus lens L21 having a convex surface facing the object; a biconcave negative lens L22; a positive meniscus lens L23 having a convex surface facing the object; and a negative meniscus lens L24 having a concave surface facing the object. The negative meniscus lens L21 has an object-side lens surface that is an aspherical surface.

The third lens group G3 consists of, in order from the object: a positive meniscus lens L31 having a convex surface facing the object; and a biconvex positive lens L32. The aperture stop S is provided on an object-side neighborhood of the third lens group G3, and moves together with the third lens group G3 upon zooming. The positive meniscus lens L31 has an object-side lens surface that is an aspherical surface.

The fourth lens group G4 consists of, in order from the object: a biconvex positive lens L41; a negative cemented lens that includes a biconcave negative lens L42, and a biconvex positive lens L43; and a biconvex positive lens L44. The positive lens L41 has an object-side lens surface that is an aspherical surface. The positive lens L44 has an image-side lens surface that is an aspherical surface.

The fifth lens group G5 consists of, in order from the object: a positive meniscus lens L51 having a concave surface facing the object; a biconcave negative lens L52; and a biconcave negative lens L53. The negative lens L53 has an object-side lens surface that is an aspherical surface.

The sixth lens group G6 consists of a positive meniscus lens L61 having a convex surface facing the object.

The seventh lens group G7 consists of a biconvex positive lens L71. An image surface I is disposed on the image side of the seventh lens group G7.

In this example, the fifth lens group G5 is moved toward the image I, thereby focusing from a far-distant object to a short-distance object (from an infinity object to a finite distance object). That is, the fifth lens group G5 corresponds to the focusing lens group. The fourth lens group G4 corresponds to the object side lens group, and the sixth lens group G6 corresponds to the image side lens group.

Although illustration is omitted in FIG. 20, the cylindrical member (for example, the cylindrical member 100 shown in FIGS. 1 and 2) is disposed between the fourth lens group G4 and the sixth lens group G6. The fifth lens group G5 is disposed on the inner diameter side of the cylindrical member. The cylindrical member moves toward the object upon zooming from the wide-angle end state (W) to the telephoto end state (T). The five group drive motor fixed to the cylindrical member allows the fifth lens group G5 to move relatively in the optical axis direction with respect to the cylindrical member. Accordingly, upon zooming, the amount of relative movement in the optical axis direction with respect to the image surface I can be different between the fifth lens group G5 and the cylindrical member.

The following Table 6 lists values of data on the zoom optical system according to the sixth example.

TABLE 6

[General Data]

Zooming ratio 2.74
dA = 31.999
dB = 17.350
dD = 31.074
dE = 21.714

|   | W | M | T |
|---|---|---|---|
| f | 24.8 | 50.0 | 67.9 |
| FNO | 2.96 | 2.98 | 2.99 |
| 2ω | 85.16 | 45.20 | 34.12 |
| Ymax | 21.60 | 21.60 | 21.60 |
| TL | 138.57 | 158.72 | 174.45 |
| BF | 13.13 | 25.93 | 34.76 |

[Lens Data]

| Surface Number | R | D | nd | vd |
|---|---|---|---|---|
| Object Surface | ∞ | | | |
| 1 | 800.0000 | 2.500 | 1.84666 | 23.80 |
| 2 | 214.4014 | 3.846 | 1.59319 | 67.90 |
| 3 | 1317.1215 | 0.200 | | |
| 4 | 112.4262 | 5.452 | 1.81600 | 46.59 |
| 5 | 6769.9563 | D5(Variable) | | |
| 6* | 500.0000 | 2.000 | 1.67798 | 54.89 |
| 7 | 20.1483 | 7.488 | | |
| 8 | −122.7141 | 1.200 | 1.59319 | 67.90 |
| 9 | 65.7886 | 0.272 | | |
| 10 | 36.9186 | 6.199 | 1.85000 | 27.03 |
| 11 | 167.8314 | 4.151 | | |
| 12 | −26.0907 | 1.200 | 1.60300 | 65.44 |
| 13 | −47.5468 | D13(Variable) | | |

TABLE 6-continued

[General Data]

| 14 | ∞ | 1.500 | | (Aperture Stop S) |
|---|---|---|---|---|
| 15* | 34.4078 | 3.172 | 1.79504 | 28.69 |
| 16 | 61.0992 | 1.040 | | |
| 17 | 57.2334 | 3.808 | 1.49782 | 82.57 |
| 18 | −5887.8063 | D18(Variable) | | |
| 19* | 56.4489 | 4.200 | 1.82098 | 42.50 |
| 20 | −110.1792 | 0.505 | | |
| 21 | −291.5983 | 1.200 | 1.85478 | 24.80 |
| 22 | 21.3003 | 9.632 | 1.49782 | 82.57 |
| 23 | −65.8810 | 3.027 | | |
| 24 | 55.5374 | 5.156 | 1.80604 | 40.74 |
| 25* | −64.8934 | D25(Variable) | | |
| 26 | −368.5041 | 2.887 | 1.94594 | 17.98 |
| 27 | −62.4504 | 0.200 | | |
| 28 | −158.4306 | 1.200 | 1.77250 | 49.62 |
| 29 | 31.1763 | 6.060 | | |
| 30* | −91.4544 | 1.300 | 1.95150 | 29.83 |
| 31 | 81.4249 | D31(Variable) | | |
| 32 | 57.0897 | 2.149 | 1.80518 | 25.45 |
| 33 | 69.0085 | D33(Variable) | | |
| 34 | 73.7084 | 4.702 | 1.64000 | 60.19 |
| 35 | −314.5384 | BF | | |
| Image Surface | ∞ | | | |

[Aspherical Surface Data]

6th Surface

K = 1.0000, A4 = 4.89442E−06, A6 = −5.03173E−09
A8 = 9.04508E−12, A10 = −5.83062E−15, A12 = 0.00000E+00

15th Surface

K = 1.0000, A4 = −5.12384E−06, A6 = 3.61548E−09
A8 = −3.66003E−11, A10 = 7.76731E−14, A12 = 0.00000E+00

19th Surface

K = 1.0000, A4 = −5.21485E−06, A6 = −8.93869E−10
A8 = 2.28848E−11, A10 = −5.34780E−14, A12 = 0.00000E+00

25th Surface

K = 1.0000, A4 = 3.45860E−06, A6 = −6.25344E−09
A8 = −1.37950E−11, A10 = 2.51017E−14, A12 = 0.00000E+00

30th Surface k = 1.0000, A4 = −6.74203E−06, A6 = −2.42770E−08
A8 = 5.92492E−11, A10 = −3.49332E−13, A12 = 0.00000E+00

[Lens Group Data]

| Group | First surface | Focal length |
|---|---|---|
| G1 | 1 | 152.425 |
| G2 | 6 | −24.007 |
| G3 | 14 | 52.775 |
| G4 | 19 | 30.001 |
| G5 | 26 | −24.147 |
| G6 | 32 | 379.967 |
| G7 | 34 | 93.748 |

[Variable Distance Data]

|  | W Infinity | M Infinity | T Infinity | W Short-distance | M Short-distance | T Short-distance |
|---|---|---|---|---|---|---|
| D5 | 2.000 | 22.083 | 33.118 | 2.000 | 22.083 | 33.118 |
| D13 | 20.464 | 6.484 | 2.000 | 20.464 | 6.484 | 2.000 |
| D18 | 9.842 | 3.320 | 2.000 | 9.842 | 3.320 | 2.000 |
| D25 | 2.978 | 2.225 | 2.053 | 3.339 | 2.586 | 2.447 |
| D31 | 2.915 | 10.198 | 13.200 | 2.555 | 9.837 | 12.806 |
| D33 | 1.000 | 2.234 | 1.084 | 1.000 | 2.234 | 1.084 |

[Conditional Expression Corresponding Value]

Conditional Expression(3) dA/dB = 1.844
Conditional Expression(4) dB/dE = 0.799

TABLE 6-continued

[General Data]

Conditional Expression(5) dB/dD = 0.558
Conditional Expression(9) |fF|/ft = 0.356

Figure 22A:
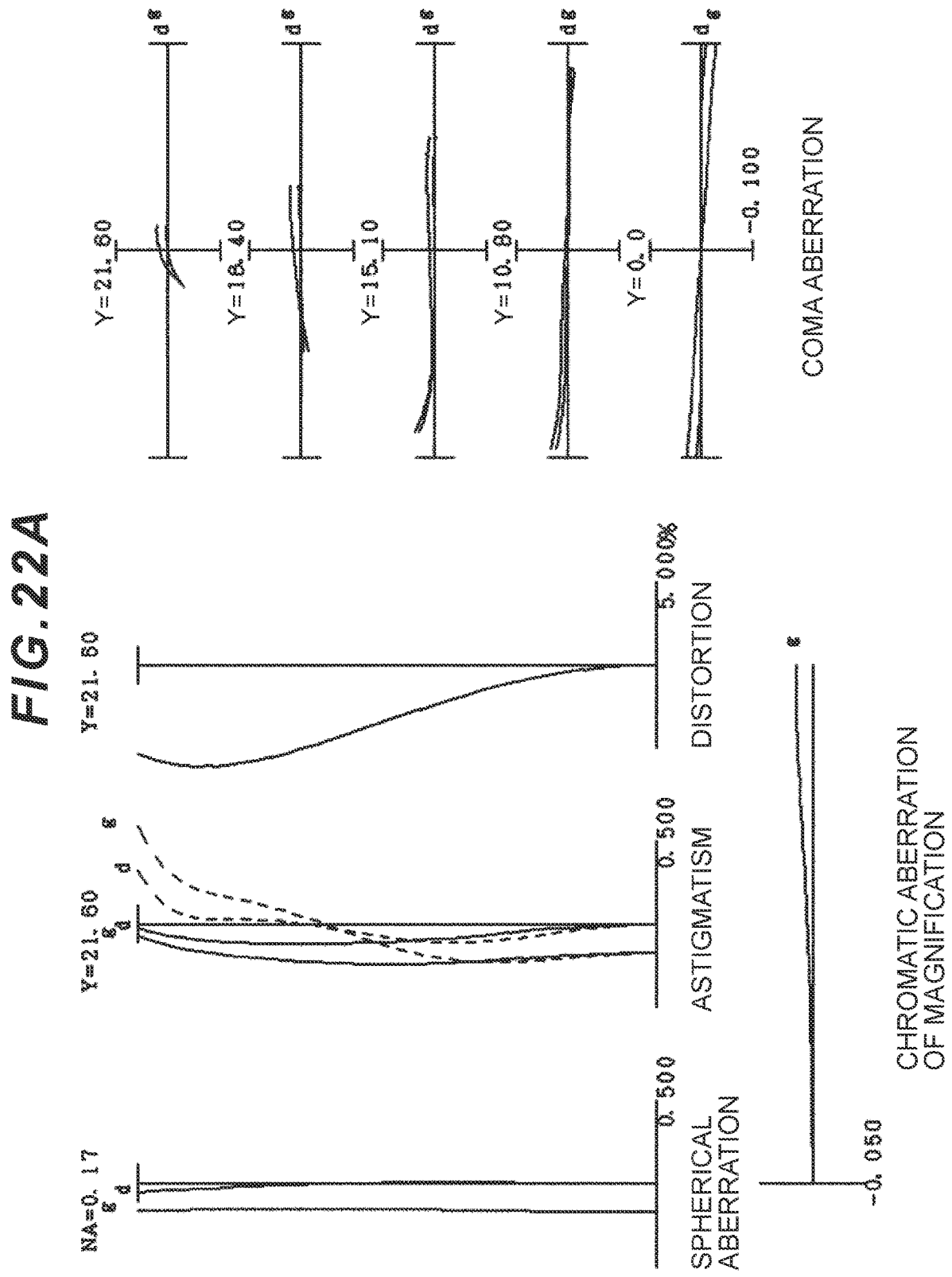
Figure 22B:
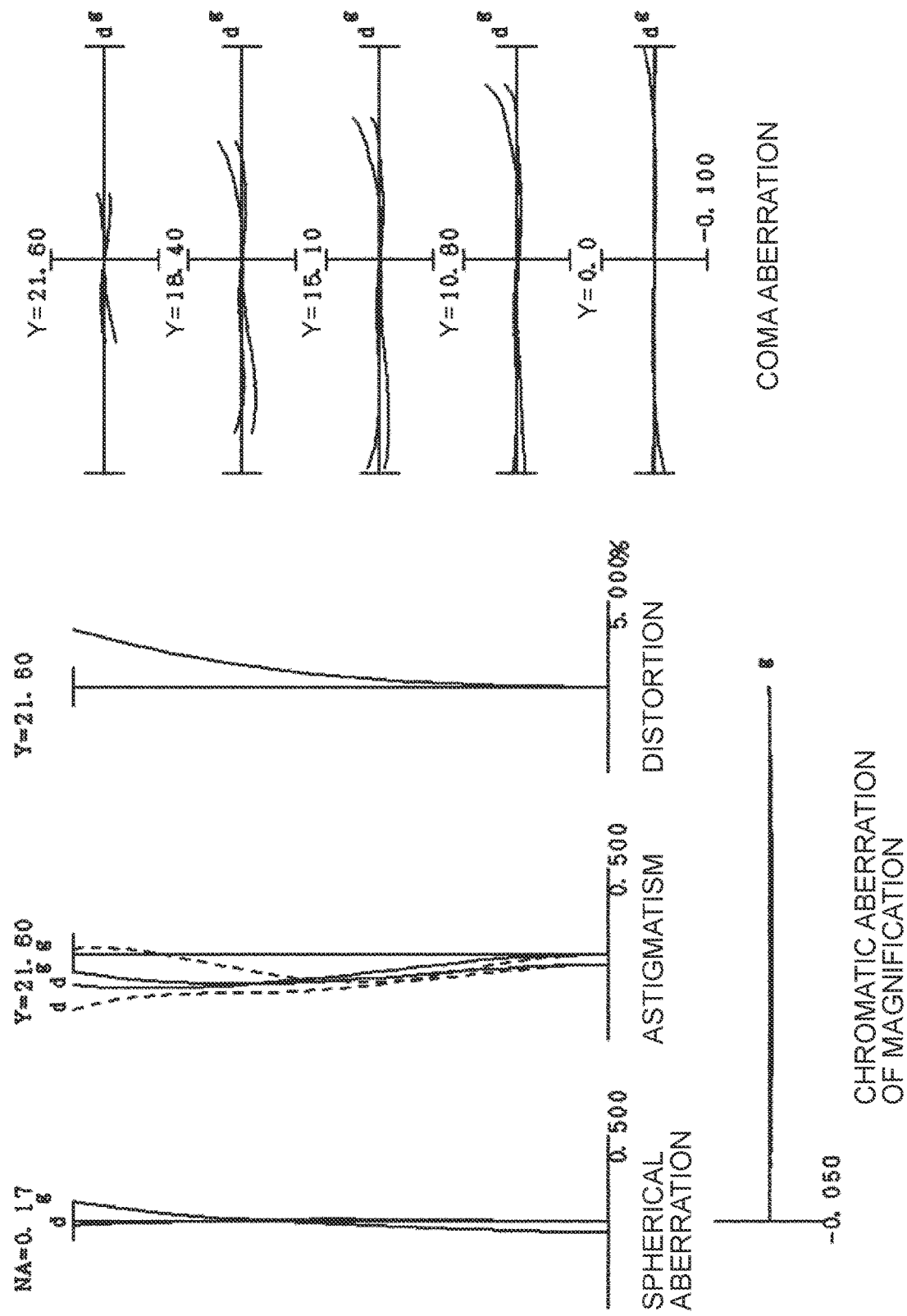

FIGS. 21A, 21B and 21C are graphs respectively showing various aberrations of the zoom optical system according to the sixth example upon focusing on infinity in the wide-angle end state, the intermediate focal length state and the telephoto end state. FIGS. 22A, 22B and 22C are graphs respectively showing various aberrations of the zoom optical system according to the sixth example upon focusing on a short-distance object in the wide-angle end state, the intermediate focal length state and the telephoto end state. The various aberration graphs show that the zoom optical system according to the sixth example favorably corrects the various aberrations from the wide-angle end state to the telephoto end state, has an excellent imaging performance, and also has an excellent imaging performance even upon focusing on a short-distance object.

Seventh Example

The seventh example is described with reference to FIGS. 23 to 25 and Table 7. FIG. 23 is a lens configuration diagram of a zoom optical system according to the seventh example. The zoom optical system ZL(7) according to the seventh example consists of, in order from the object: a first lens group G1 having a positive refractive power; a second lens group G2 having a negative refractive power; an aperture stop S; a third lens group G3 having a positive refractive power; a fourth lens group G4 having a positive refractive power; a fifth lens group G5 having a positive refractive power; a sixth lens group G6 having a positive refractive power; and a seventh lens group G7 having a negative refractive power. Upon zooming from the wide-angle end state (W) to the telephoto end state (T), the first to seventh lens groups G1 to G7 move in directions respectively indicated by arrows in FIG. 23, and the distances between adjacent lens groups change. A lens group that consists of the fifth lens group G5, the sixth lens group G6 and the seventh lens group G7 corresponds to a succeeding lens group GR, and has a positive refractive power as a whole.

The first lens group G1 consists of, in order from the object: a positive cemented lens that includes a negative meniscus lens L11 having a convex surface facing the object, and a positive meniscus lens L12 having a convex surface facing the object; and a positive meniscus lens L13 having a convex surface facing the object.

The second lens group G2 consists of, in order from the object: a negative meniscus lens L21 having a convex surface facing the object; a biconcave negative lens L22; a biconvex positive lens L23; and a negative meniscus lens L24 having a concave surface facing the object. The negative meniscus lens L21 has an object-side lens surface that is an aspherical surface.

The third lens group G3 consists of, in order from the object: a positive meniscus lens L31 having a convex surface facing the object; and a biconvex positive lens L32. The aperture stop S is provided on an object-side neighborhood of the third lens group G3, and moves together with the third lens group G3 upon zooming. The positive meniscus lens L31 has an object-side lens surface that is an aspherical surface.

The fourth lens group G4 consists of a positive cemented lens that includes a negative meniscus lens L41 having a convex surface facing the object, and a biconvex positive lens L42.

The fifth lens group G5 consists of, in order from the object: a negative meniscus lens L51 having a concave surface facing the object; and a biconvex positive lens L52.

The sixth lens group G6 consists of a positive meniscus lens L61 having a concave surface facing the object. The positive meniscus lens L61 has an image-side lens surface that is an aspherical surface.

The seventh lens group G7 consists of, in order from the object: a positive meniscus lens L71 having a concave surface facing the object; a biconcave negative lens L72; and a negative meniscus lens L73 having a concave surface facing the object. An image surface I is disposed on the image side of the seventh lens group G7. The negative lens L72 has an object-side lens surface that is an aspherical surface.

In this example, the fifth lens group G5 and the sixth lens group G6 are independently moved toward the object, thereby focusing from a far-distant object to a short-distance object (from an infinity object to a finite distance object). That is, the fifth lens group G5 corresponds to the first focusing lens group, and the sixth lens group G6 corresponds to the second focusing lens group. The fourth lens group G4 corresponds to the object side lens group, and the seventh lens group G7 corresponds to the image side lens group.

Although illustration is omitted in FIG. 23, the cylindrical member (for example, the cylindrical member 100 shown in FIGS. 1 and 2) is disposed between the fourth lens group G4 and the seventh lens group G7. The fifth lens group G5 and the sixth lens group G6 are disposed on the inner diameter side of the cylindrical member. The cylindrical member moves toward the object upon zooming from the wide-angle end state (W) to the telephoto end state (T). The five group drive motor and the six group drive motor fixed to the cylindrical member respectively allow the fifth lens group G5 and the sixth lens group G6 to move relatively in the optical axis direction with respect to the cylindrical member. Accordingly, upon zooming, the amount of relative movement in the optical axis direction with respect to the image surface I can be different between the fifth lens group G5 and the sixth lens group G6, and the cylindrical member. Upon zooming or focusing, the amount of relative movement in the optical axis direction with respect to the image surface I can be different between the fifth lens group G5 and the sixth lens group G6.

The following Table 7 lists values of data on the zoom optical system according to the seventh example.

TABLE 7

[General Data]

Zooming ratio 2.74
MTF1 = −1.328
MTF2 = −0.926
βTF1 = 0.751
βTF2 = 0.754
dA = 12.895
dB = 17.35
dD = 26.306
dE = 17.010

TABLE 7-continued

[General Data]

|  | W | M | T |
|---|---|---|---|
| f | 24.8 | 50.0 | 67.9 |
| FNO | 2.92 | 2.92 | 2.92 |
| 2ω | 85.10 | 45.24 | 33.84 |
| Ymax | 21.60 | 21.60 | 21.60 |
| TL | 139.31 | 158.27 | 168.76 |
| BF | 11.75 | 23.48 | 28.76 |

[Lens Data]

| Surface Number | R | D | nd | vd |
|---|---|---|---|---|
| Object Surface | ∞ | | | |
| 1 | 189.0188 | 2.500 | 1.84666 | 23.80 |
| 2 | 98.2637 | 5.200 | 1.75500 | 52.33 |
| 3 | 281.1360 | 0.200 | | |
| 4 | 58.7593 | 5.700 | 1.77250 | 49.62 |
| 5 | 135.0000 | D5(Variable) | | |
| 6* | 221.1138 | 2.000 | 1.74389 | 49.53 |
| 7 | 18.6091 | 9.662 | | |
| 8 | −58.7660 | 1.300 | 1.77250 | 49.62 |
| 9 | 58.7660 | 0.506 | | |
| 10 | 39.8268 | 6.400 | 1.72825 | 28.38 |
| 11 | −48.5880 | 1.773 | | |
| 12 | −26.6513 | 1.300 | 1.61800 | 63.34 |
| 13 | −70.7180 | D13(Variable) | | |
| 14 | ∞ | 1.702 | | (Aperture Stop S) |
| 15* | 71.3000 | 2.500 | 1.69370 | 53.32 |
| 16 | 121.5261 | 0.202 | | |
| 17 | 38.6117 | 5.900 | 1.59319 | 67.90 |
| 18 | −111.3842 | D18(Variable) | | |
| 19 | 66.4297 | 1.300 | 1.73800 | 32.33 |
| 20 | 19.7070 | 9.700 | 1.49782 | 82.57 |
| 21 | −49.1811 | D21(Variable) | | |
| 22 | −23.7160 | 1.200 | 1.72047 | 34.71 |
| 23 | −55.5303 | 0.200 | | |
| 24 | 103.5406 | 5.980 | 1.59349 | 67.00 |
| 25 | −32.7186 | D25(Variable) | | |
| 26 | −75.1626 | 3.736 | 1.79189 | 45.04 |
| 27* | −39.1303 | D27(Variable) | | |
| 28 | −44.6016 | 3.000 | 1.94594 | 17.98 |
| 29 | −32.9994 | 0.201 | | |
| 30* | −101.4301 | 1.500 | 1.85207 | 40.15 |
| 31 | 85.4850 | 7.927 | | |
| 32 | −25.8904 | 1.400 | 1.58913 | 61.22 |
| 33 | −45.0397 | BF | | |
| Image Surface | ∞ | | | |

[Aspherical Surface Data]

6th Surface

K = 1.0000, A4 = 5.47971E−06, A6 = −6.22095E−09
A8 = 1.44104E−11, A10 = −2.08855E−14, A12 = 2.01910E−17

15th Surface

K = 1.0000, A4 = −4.50985E−06, A6 = 2.81159E−10
A8 = −2.63745E−12, A10 = −4.80538E−15, A12 = 0.00000E+00

27th Surface

K = 1.0000, A4 = 1.09182E−05, A6 = −2.25976E−08
A8 = 1.43325E−10, A10 = −4.96895E−13, A12 = 6.77820E−16

30th Surface

K = 1.0000, A4 = −2.19229E−06, A6 = −2.44256E−08
A8 = 6.38954E−11, A10 = −1.65927E−13, A12 = 0.00000E+00

[Lens Group Data]

| Group | First surface | Focal length |
|---|---|---|
| G1 | 1 | 118.121 |
| G2 | 6 | −21.898 |
| G3 | 14 | 41.497 |
| G4 | 19 | 109.585 |
| G5 | 22 | 123.527 |
| G6 | 26 | 98.560 |
| G7 | 28 | −47.807 |

[Variable Distance Data]

|  | W Infinity | M Infinity | T Infinity | W Short-distance | M Short-distance | T Short-distance |
|---|---|---|---|---|---|---|
| D5 | 1.800 | 21.061 | 29.930 | 1.800 | 21.061 | 29.930 |
| D13 | 19.119 | 6.127 | 2.000 | 19.119 | 6.127 | 2.000 |
| D18 | 9.354 | 3.967 | 1.500 | 9.354 | 3.967 | 1.500 |
| D21 | 5.286 | 14.229 | 18.845 | 4.337 | 12.953 | 17.517 |
| D25 | 2.861 | 3.580 | 2.713 | 3.291 | 4.145 | 3.115 |
| D27 | 6.143 | 2.841 | 2.028 | 6.662 | 3.552 | 2.955 |

[Conditional Expression Corresponding Value]

Conditional Expression(1) dL0t/dL1t = 0.686
Conditional Expression(2) dF0t/dF1t = 0.869
Conditional Expression(3) dA/dB = 0.743
Conditional Expression(4) dB/dE = 1.020
Conditional Expression(5) dB/dD = 0.660
Conditional Expression(6) fF1/fF2 = 1.253
Conditional Expression(7) MTF1/MTF2 = 1.433
Conditional Expression(8) |βTF1|/|βTF2| = 0.996
Conditional Expression(9) |fF|/ft = 1.819

Figure 25A:
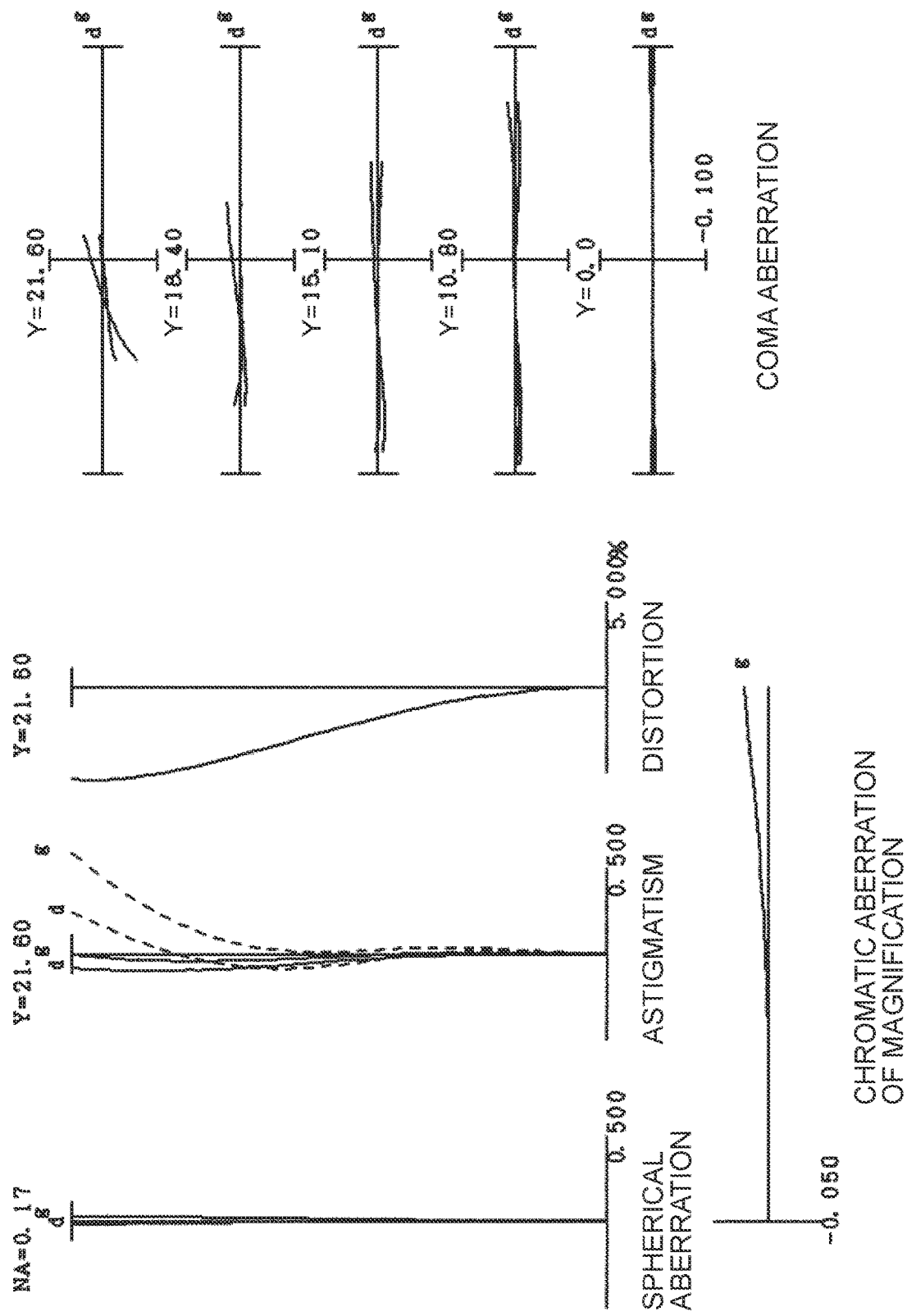
FIGS. 25A, 25B and 25C are graphs respectively showing various aberrations of the zoom optical system according to the seventh example upon focusing on a short-distance object in the wide-angle end state, the intermediate focal length state and the telephoto end state.
Figure 25B:
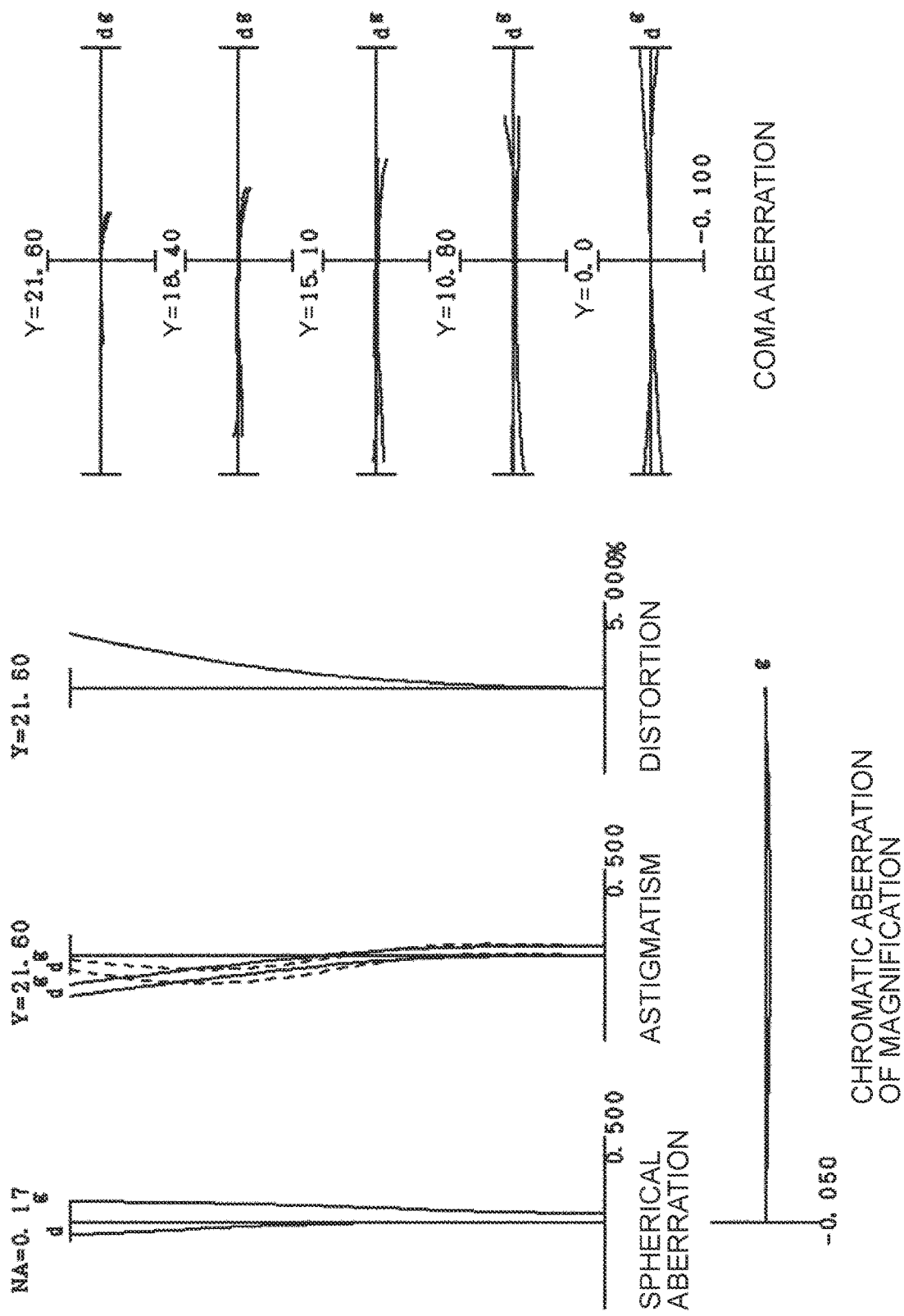
Figure 25C:
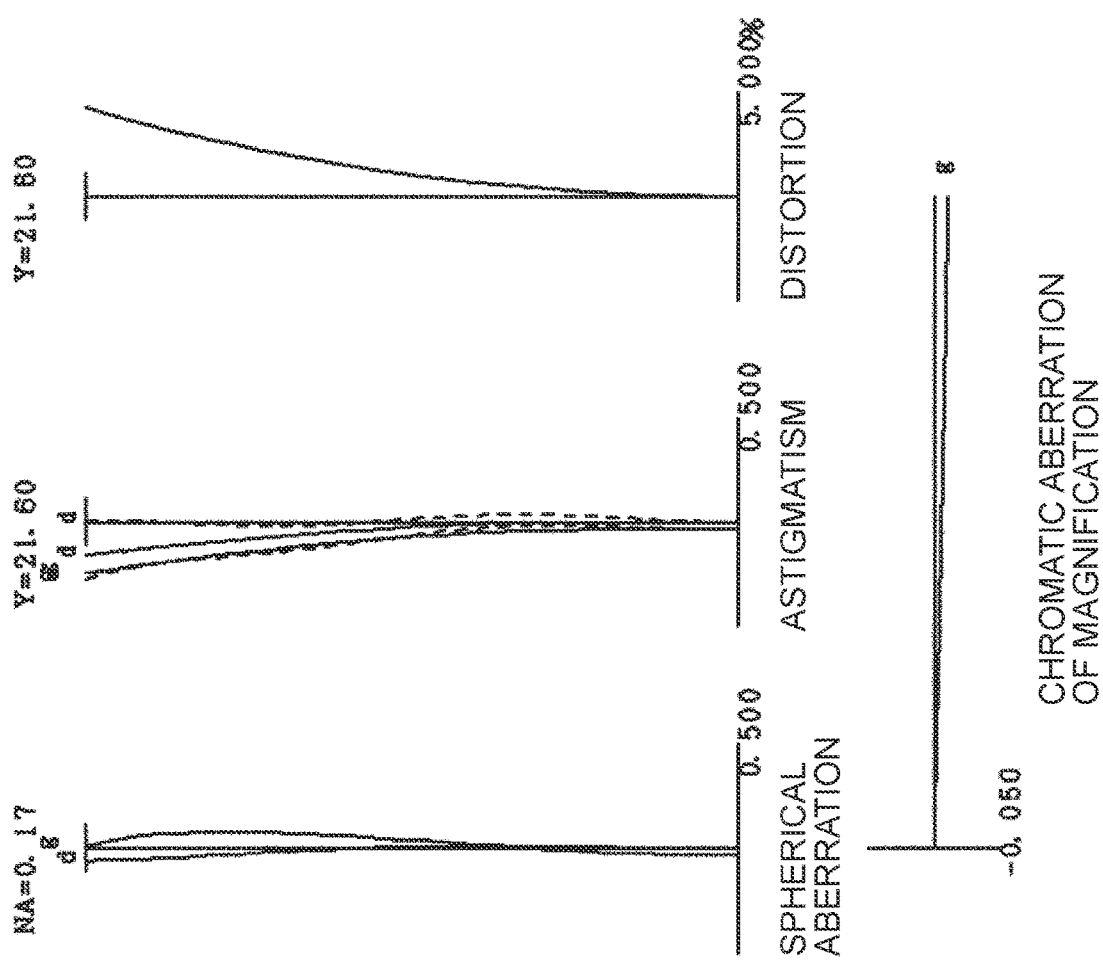

FIGS. 24A, 24B and 24C are graphs respectively showing various aberrations of the zoom optical system according to the seventh example upon focusing on infinity in the wide-angle end state, the intermediate focal length state and the telephoto end state. FIGS. 25A, 25B and 25C are graphs respectively showing various aberrations of the zoom optical system according to the seventh example upon focusing on a short-distance object in the wide-angle end state, the intermediate focal length state and the telephoto end state. The various aberration graphs show that the zoom optical system according to the seventh example favorably corrects the various aberrations from the wide-angle end state to the telephoto end state, has an excellent imaging performance, and also has an excellent imaging performance even upon focusing on a short-distance object.

Each example can achieve the zoom optical system that can achieve high-speed and highly silent autofocus without increasing the size of the lens barrel, and suppress the variation in aberrations upon zooming from the wide-angle end state to the telephoto end state, and the variation in aberrations upon focusing from the infinity object to the short-distance object.

Here, the first to seventh examples described above each show a specific example of this embodiment. This embodiment is not limited thereto.

Note that the following details can be appropriately adopted in a range without degrading the optical performance of the zoom optical system according to this embodiment.

As numerical examples of the zoom optical system, what has the six-element group configuration and what has the seven-element group configuration are described. However, the present application is not limited thereto. A zoom optical system having another group configuration (for example, an eight-element one etc.) may be configured. Specifically, a configuration may be adopted where a lens or a lens group is added on the most-object side or the most-image side of the zoom optical system. Note that the lens group indicates a portion that includes at least one lens separated by air distances changing during zooming.

The lens surface may be formed to be a spherical surface or a plane, or formed to be an aspherical surface. A case where lens surfaces that are spherical surfaces or planes is preferable because the case facilitates lens processing, and assembly and adjustment, and can prevent degradation of optical performances due to errors in processing and assembly and adjustment. Furthermore, it is preferable because degradation of depiction performance is small even in case the image surface deviates.

In a case where the lens surface is an aspherical surface, the aspherical surface may be any of an aspherical surface made by a grinding process, a glass mold aspherical surface made by forming glass into an aspherical shape with a mold, and a composite type aspherical surface made by forming resin on a surface of glass into an aspherical shape. The lens surface may be a diffractive surface. The lens may be a gradient-index lens (GRIN lens) or a plastic lens.

Preferably, the aperture stop is disposed between the second lens group and the third lens group. However, a member as an aperture stop is not necessarily provided, and a lens frame may be substituted for the role thereof.

To reduce flares and ghosts and achieve a high optical performance having a high contrast, an antireflection film having a high transmissivity over a wide wavelength region may be applied to each lens surface. Accordingly, flares and ghosts can be reduced, and high optical performances having a high contrast can be achieved.

EXPLANATION OF NUMERALS AND CHARACTERS

| | |
|---|---|
| G1 First lens group | G2 Second lens group |
| G3 Third lens group | G4 Fourth lens group |
| G5 Fifth lens group | G6 Sixth lens group |
| G7 Seventh lens group | |
| I Image surface | S Aperture stop |

The invention claimed is:

1. A zoom optical system comprising a plurality of lens groups, wherein upon zooming, distances between adjacent lens groups change, the zoom optical system comprises: a focusing lens group that moves upon focusing and an image-side lens group disposed adjacent to an image side of the focusing lens group, the focusing lens group comprises a first focusing lens group that moves upon focusing and a second focusing lens group that is disposed closer to an image than the first focusing lens group and moves upon focusing, the first focusing lends group and the second focusing lens group have positive refractive powers, the second focusing lens group consists of a single lens, and the zoom optical system satisfies the following conditional expressions:

$$0.000 < dL0t/dL1t < 1.000$$

$$0.20 < fF1/fF2 < 3.00$$

where dL0t: a distance on an optical axis between the focusing lens group and the image-side lens group upon focusing on an infinity object in a telephoto end state, dL1t: a distance on the optical axis between the focusing lens group and the image-side lens group upon focusing on a short-distance object in the telephoto end state, fF1: a focal length of the first focusing lens group, and fF2: a focal length of the second focusing lens group.

2. The zoom optical system according to claim 1, wherein the plurality of lens groups include, in order from an object: a first lens group having a positive refractive power; a second lens group having a negative refractive power; a third lens group having a positive refractive power; a fourth lens group having a positive refractive power; and a succeeding lens group, and the succeeding lens group includes the focusing lens group and the image-side lens group.

3. The zoom optical system according to claim 1, wherein the zoom optical system satisfies the following conditional expression:

$$0.20 < MTF1/MTF2 < 3.00$$

where MTF1: an absolute value of an amount of movement of the first focusing lens group upon focusing from an infinity object to the short-distance object in the telephoto end state, and MTF2: an absolute value of an amount of movement of the second focusing lens group upon focusing from the infinity object to the short-distance object in the telephoto end state.

4. The zoom optical system according to claim 1, wherein the zoom optical system satisfies the following conditional expression:

$$0.20 < |\beta TF1|/|\beta TF2| < 5.00$$

where βTF1: a lateral magnification of the first focusing lens group upon focusing on the infinity object in the telephoto end state, and βTF2: a lateral magnification of the second focusing lens group upon focusing on the infinity object in the telephoto end state.

5. The zoom optical system according to claim 1, wherein the first focusing lens group and the second focusing lens group are adjacent to each other.

6. The zoom optical system according to claim 1, wherein the focusing lens groups consist of three or less single lenses.

7. The zoom optical system according to claim 1, wherein the first focusing lens group includes a single lens having a negative refractive power.

8. The zoom optical system according to claim 1, wherein the focusing lens groups are disposed closer to an image than an aperture stop.

9. The zoom optical system according to claim 1, wherein the zoom optical system satisfies the following conditional expression:

$$0.20 < |fF|/ft < 4.00$$

where fF: a focal length of the focusing lens group having a strongest refractive power among the focusing lens groups, and ft: a focal length of the zoom optical system in the telephoto end state.

10. An optical apparatus, comprising the zoom optical system according to claim 1 mounted thereon.

11. A zoom optical system comprising a plurality of lens groups, wherein upon zooming, distances between adjacent lens groups change, the zoom optical system comprises: a focusing lens group that moves upon focusing; and a cylindrical member to which a driving apparatus for moving the focusing lens group is fixed, upon zooming, the cylindrical member moves, the focusing lens group is relatively movable with respect to the cylindrical member by the driving apparatus, an amount of movement of a lens disposed to an object side or an image side of the focusing lens group upon zooming is different from the amount of movement of the cylindrical member upon zooming, the focusing lens group comprises a first focusing lens group that moves upon focusing and a second focusing lens group that is disposed closer to an image than the first focusing lens group and moves upon focusing, the first focusing lends group and the second focusing lens group have positive refractive powers, the second focusing lens group consists of a single lens, and the zoom optical system satisfies the following conditional expression:

$$-1.000 < dA/dB < 2.000$$

where dA: an amount of movement of the second focusing lens group with respect to an image surface upon zooming from a wide-angle end state to a telephoto end state, a sign of movement toward an object being assumed to be +, and a sign of movement toward an image being assumed to be −, and dB: an amount of movement of the cylindrical member with respect to the image surface upon zooming from the wide-angle end state to the telephoto end state, a sign of movement toward the object is assumed to be +, and a sign of movement toward the image is assumed to be −.

12. The zoom optical system according to claim 11, further comprising an image-side lens group disposed adjacent to an image side of the focusing lens group, wherein
upon zooming, a distance between the focusing lens group and the image-side lens group changes, and
the zoom optical system satisfies the following conditional expression:

$$-1.000 < dB/dE < 1.500$$

where dE: an amount of movement of the image-side lens group with respect to an image surface upon zooming from the wide-angle end state to the telephoto end state, a sign of movement toward an object being assumed to be +, and a sign of movement toward an image being assumed to be −.

13. The zoom optical system according to claim 11, further comprising an object-side lens group disposed adjacent to an object side of the focusing lens group, wherein
upon zooming, a distance between the object-side lens group and the focusing lens group changes, and
the zoom optical system satisfies the following conditional expression:

$$-1.000 < dB/dD < 1.000$$

where dD: an amount of movement of the object-side lens group with respect to an image surface upon zooming from the wide-angle end state to the telephoto end state, a sign of movement toward an object being assumed to be +, and a sign of movement toward an image being assumed to be −.

14. The zoom optical system according to claim 11, wherein the driving apparatus comprises a stepping motor.

15. The zoom optical system according to claim 11, wherein
a movement trajectory of the first focusing lens group upon zooming is different from a movement trajectory of the second focusing lens group upon zooming.

16. The zoom optical system according to claim 15, wherein a first driving apparatus for moving the first focusing lens group, and a second driving apparatus for moving the second focusing lens group are fixed to the cylindrical member.

17. The zoom optical system according to claim 15, wherein a guide shaft that linearly guides the first focusing lens group and the second focusing lens group in an optical axis direction is fixed to the cylindrical member.

18. The zoom optical system according to claim 11, wherein
the plurality of lens groups include, in order from an object: a first lens group having a positive refractive power; a second lens group having a negative refractive power; a third lens group having a positive refractive power; a fourth lens group having a positive refractive power; and a succeeding lens group, and
the succeeding lens group includes the focusing lens group.

19. An optical apparatus, comprising the zoom optical system according to claim 11 mounted thereon.

20. A method for manufacturing a zoom optical system comprising a plurality of lens groups, the method comprising:
arranging the lens groups in a lens barrel such that:
upon zooming, distances between adjacent lens groups change, and
the method further comprising at least one of the following features A or B,
the feature A including:
configuring the zoom optical system to comprise a focusing lens group that moves upon focusing and an image-side lens group disposed adjacent to an image side of the focusing lens group,
the focusing lens group comprises a first focusing lens group that moves upon focusing and a second focusing lens group that is disposed closer to an image than the first focusing lens group and moves upon focusing,
the first focusing lends group and the second focusing lens group have positive refractive powers,
the second focusing lens group consists of a single lens, and
satisfying the following conditional expressions:

$$0.000 < dL0t/dL1t < 1.000$$

$$0.20 < fF1/fF2 < 3.00$$

where dL0t: a distance on an optical axis between the focusing lens group and the image-side lens group upon focusing on an infinity object in a telephoto end state,
dL1t: a distance on the optical axis between the focusing lens group and the image-side lens group upon focusing on a short-distance object in the telephoto end state,
fF 1: a focal length of the first focusing lens group, and
fF2: a focal length of the second focusing lens group, the feature B including:
configuring the zoom optical system to comprise a focusing lens group that moves upon focusing and a cylindrical member to which a driving apparatus for moving the focusing lens group is fixed,
the cylindrical member moving upon zooming,
the focusing lens group being relatively movable with respect to the cylindrical member by the driving apparatus,
an amount of movement of a lens disposed to an object side or an image side of the focusing lens group upon zooming being different from the amount of movement of the cylindrical member upon zooming, the focusing lens group comprises a first focusing lens group that moves upon focusing and a second focusing lens group that is disposed closer to an image than the first focusing lens group and moves upon focusing, the first focusing lends group and the second focusing lens group have positive refractive powers, the second focusing lens group consists of a single lens, and satisfying the following conditional expression:

$-1.000 < dA/dB < 2.000$ where dA: an amount of movement of the second focusing lens group with respect to an image surface upon zooming from a wide-angle end state to a telephoto end state, a sign of movement toward an object being assumed to be +, and a sign of movement toward an image being assumed to be −, and dB: an amount of movement of the cylindrical member with respect to the image surface upon zooming from the wide-angle end state to the telephoto end state, a sign of movement toward the object being assumed to be +, and a sign of movement toward the image being assumed to be −.

* * * * *